United States Patent
Carson et al.

(10) Patent No.: US 12,333,821 B2
(45) Date of Patent: Jun. 17, 2025

(54) SYSTEMS AND METHODS FOR ENFORCING TRAFFIC CONGESTION PRICING

(71) Applicant: Hayden AI Technologies, Inc., Oakland, CA (US)

(72) Inventors: Christopher Carson, Oakland, CA (US); Vaibhav Ghadiok, Mountain View, CA (US); Bo Shen, Fremont, CA (US)

(73) Assignee: Hayden AI Technologies, Inc., Oakland, CA (US)

( * ) Notice: Subject to any disclaimer, the term of this patent is extended or adjusted under 35 U.S.C. 154(b) by 529 days.

(21) Appl. No.: 17/658,497

(22) Filed: Apr. 8, 2022

(65) Prior Publication Data

US 2022/0351525 A1  Nov. 3, 2022

Related U.S. Application Data

(60) Provisional application No. 63/180,938, filed on Apr. 28, 2021.

(51) Int. Cl.
| | |
|---|---|
| G06V 20/58 | (2022.01) |
| G06V 20/62 | (2022.01) |
| G08G 1/01 | (2006.01) |

(52) U.S. Cl.
CPC ............ *G06V 20/58* (2022.01); *G06V 20/625* (2022.01); *G08G 1/0133* (2013.01); *G08G 1/0141* (2013.01); *G08G 1/0145* (2013.01)

(58) Field of Classification Search
CPC .... G06V 20/58; G06V 20/625; G08G 1/0133; G08G 1/0141; G08G 1/0145; G08G 1/0175; G08G 1/04; G08G 1/207
See application file for complete search history.

(56) References Cited

U.S. PATENT DOCUMENTS

| | | |
|---|---|---|
| 9,064,406 B1 | 6/2015 | Stevens et al. |
| 9,070,289 B2 | 6/2015 | Saund et al. |
| | (Continued) | |

FOREIGN PATENT DOCUMENTS

| | | |
|---|---|---|
| CN | 2277104 | 3/1998 |
| CN | 106560861 | 4/2017 |
| | (Continued) | |

OTHER PUBLICATIONS

R. ElHakim, M. Abdelwahab, A. Eldesokey and M. ElHelw, "Traffisense: A smart integrated visual sensing system for traffic monitoring," 2015 SAI Intelligent Systems Conference (IntelliSys), London, UK, 2015 (Year: 2015).*

(Continued)

*Primary Examiner* — Bobbak Safaipour
*Assistant Examiner* — Dylan J Sherrillo
(74) *Attorney, Agent, or Firm* — Chang & Hale LLP

(57) ABSTRACT

Disclosed herein are systems and methods for alleviating traffic congestion within an enforcement zone. In some embodiments, a system for alleviating traffic congestion within an enforcement zone comprises a server and a plurality of edge devices coupled to carrier vehicles deployed within the enforcement zone. The edge devices can be configured to capture videos of vehicles that may be subject to the traffic congestion pricing policy and to determine their locations, license plate numbers, and certain vehicle attributes using certain sensors on the edge devices and deep learning models running on the edge devices. The edge devices can also be configured to transmit evidence packages to the server concerning such vehicles. The server can be configured to evaluate the evidence packages received from the edge devices and prepare final evidence packages concerning the vehicles for further review and processing.

20 Claims, 15 Drawing Sheets

(56) References Cited

U.S. PATENT DOCUMENTS

| | | | |
|---|---|---|---|
| 9,600,733 B1 | 3/2017 | Wilbert et al. | |
| 9,607,214 B2* | 3/2017 | Nerayoff | G06V 20/56 |
| 9,940,524 B2* | 4/2018 | Krishnamoorthy | H04N 23/661 |
| 10,296,794 B2 | 5/2019 | Ratti | |
| 11,003,919 B1 | 5/2021 | Ghadiok et al. | |
| 11,164,014 B1 | 11/2021 | Ghadiok et al. | |
| 11,322,017 B1 | 5/2022 | Ghadiok et al. | |
| 11,361,558 B2 | 6/2022 | Seo | |
| 11,688,182 B2 | 6/2023 | Ghadiok et al. | |
| 2002/0072847 A1 | 6/2002 | Trajkovic et al. | |
| 2010/0081200 A1 | 4/2010 | Rajala et al. | |
| 2012/0148092 A1 | 6/2012 | Ni et al. | |
| 2013/0266188 A1 | 10/2013 | Bulan et al. | |
| 2014/0007762 A1 | 1/2014 | Gavish et al. | |
| 2014/0036076 A1 | 2/2014 | Nerayoff et al. | |
| 2014/0311456 A1 | 10/2014 | Richter et al. | |
| 2015/0175088 A1 | 6/2015 | Chang | |
| 2017/0177965 A1 | 6/2017 | Gordo Soldevila et al. | |
| 2017/0358025 A1 | 12/2017 | Varma et al. | |
| 2018/0172454 A1 | 6/2018 | Ghadiok et al. | |
| 2018/0240336 A1 | 8/2018 | Kareev et al. | |
| 2019/0137280 A1 | 5/2019 | Ghadiok et al. | |
| 2019/0197369 A1 | 6/2019 | Law et al. | |
| 2020/0063866 A1 | 2/2020 | Reinhart et al. | |
| 2020/0177767 A1 | 6/2020 | Kelly et al. | |
| 2020/0380270 A1 | 12/2020 | Cox et al. | |
| 2021/0043012 A1* | 2/2021 | Einecke | G07C 5/02 |
| 2021/0065074 A1* | 3/2021 | Torrealba Fuenzalida | G08G 1/0125 |
| 2021/0166145 A1 | 6/2021 | Omari et al. | |
| 2021/0209941 A1 | 7/2021 | Maheshwari et al. | |
| 2021/0237737 A1 | 8/2021 | Al-Nuaimi et al. | |
| 2021/0241003 A1 | 8/2021 | Seo | |
| 2021/0241624 A1* | 8/2021 | Kan | G07C 5/085 |
| 2022/0121860 A1 | 4/2022 | Ghadiok et al. | |
| 2022/0147745 A1 | 5/2022 | Ghadiok et al. | |

FOREIGN PATENT DOCUMENTS

| | | | | |
|---|---|---|---|---|
| CN | 110197589 | | 9/2019 | |
| CN | 110321823 | | 10/2019 | |
| CN | 110717433 | | 1/2020 | |
| CN | 111368687 | | 7/2020 | |
| CN | 111492416 | | 8/2020 | |
| CN | 111666853 | | 9/2020 | |
| JP | 4805763 | | 3/2008 | |
| KR | 100812397 | | 3/2008 | |
| KR | 20130123873 | A * | 11/2013 | B60W 40/02 |
| WO | WO 2010/081200 | | 7/2010 | |
| WO | WO 2014/007762 | | 1/2014 | |
| WO | WO 2020/063866 | | 4/2020 | |
| WO | WO 2020/177767 | | 9/2020 | |
| WO | WO 2022/099237 | | 5/2022 | |
| WO | WO 2022/232813 | | 11/2022 | |

OTHER PUBLICATIONS

W. Balid, H. Tafish and H. H. Refai, "Versatile real-time traffic monitoring system using wireless smart sensors networks," 2016 IEEE Wireless Communications and Networking Conference, Doha, Qatar, 2016 (Year: 2016).*

Selmoune, A. et al. "Influencing factors in congestion pricing acceptability: a literature review." Journal of Advanced Transportation, vol. 2020, 11 pages, Jan. 13, 2022, <https://www.hindawi.com/journals/jat/2020/4242964/> accessed on Jun. 6, 2022.

"Consulting services in Computer Vision and AI," accessed on May 8, 2023, online.

"Safety Vision Announces Smart Automated Bus Lane Enforcement (SABLETM) Solution," Safety Vision, Oct. 11, 2022, online.

Bo, T. et al., "Common phase error estimation in coherent optical OFDM systems using best-fit bounding box," Optics Express, vol. 24, No. 21, pp. 73707-23718, Oct. 2016.

Bo, T. et al., "Common Phase Estimation in Coherent OFDM System Using Image Processing Technique," IEEE Photonics Technology Letters, vol. 27, No. 15, pp. 1597-1600, Aug. 2015.

Bo, T. et al., "Image Processing Based Common Phase Estimation for Coherent Optical Orthogonal Frequency Division Multiplexing System," Optical Fiber Communication Conference, Mar. 2015.

Canizo, M. et al. "Multi-Head CNN-RNN for multi time series anomaly detection: An industrial case study," Neurocomputing, vol. 363(21), pp. 246-260, Oct. 21, 2019.

Chen, S. et al., "A Dense Feature Pyramid Network-Based Deep Learning Model for Road Marking Instance Segmentation Using MLS Point Clouds," IEEE Transactions on Geoscience and Remote Sensing, vol. 59, No. 1, pp. 784-800, Jan. 2021.

Chhaya, S. et al., "Basic Geometric Shape and Primary Colour Detection Using Image Processing On MATLAB," IJRET: International Journal of Research in Engineering and Technology, vol. 04, iss. 05, pp. 505-509, May 2015.

Clearlane, "Automated Bus Lane Enforcement System", SafeFleet, 2021, online.

Clearlane, "The Safe Fleet Automated Bus Lane Enforcement (ABLE)", SafeFleet, 2021, online.

Evanko, K. "Siemens Mobility launches first-ever mobile bus lane enforcement solution in New York," Siemens Mobility, Dec. 17, 2019, Munich, Germany.

Fan, Y. et al., "A Coarse-to-Fine Framework for Multiple Pedestrian Crossing Detection," Sensors, vol. 20, 4144, pp. 1-16, Jul. 2020.

Franklin, R. "Traffic Signal Violation Detection using Artificial Intelligence and Deep Learning," Department of Electronic & Telecommunication Engineering, RV College of Engineering, pp. 839-844, accessed on Jul. 19, 2020, Karnataka, India.

Github Repository, Our Camera, <https://github.com/Bellspringsteen/OurCamera> (last visited Sep. 25, 2023).

Glenn, J., "Adaptive Morphological Feature-Based Object Classifier for a Color Imaging System," NASA Tech Briefs, pp. 23-24, Dec. 2009.

Hsu, K., et al. "Augmented Multiple Instance Regression for Inferring Object Contours in Bounding Boxes," IEEE Transaction on Image Processing, vol. 23, No. 4, pp. 1722-1736, Apr. 2014.

Huval, B. et al. "An Empirical Evaluation of Deep Learning on Highway Driving," Stanford University, pp. 1-7 accessed on Apr. 17, 2015, online.

Liu, X. "Vehicle-Related Scene Understanding Using Deep Learning," School of Engineering, Computer and Mathematical Sciences, Auckland University of Technology, 2019, online.

Nehemiah, A. et al. "Deep Learning for Automated Driving with MATLAB," NVIDIA Technical Blog, <https://developer.nvidia.com/blog/deep-learning-automated-driving-matlab/> accessed on Jun. 4, 2023, online.

Novak, L., "Vehicle Detection and Pose Estimation for Autonomous Driving," Czech Technical University in Prague, May 2017.

Oh, J. et al., "Context-based abnormal object detection using the fully-connected conditional random fields," Pattern Recognition Letters, vol. 98, pp. 16-25, Aug. 2017.

Paquet, E. et al., "Description of shape information for 2-D and 3-D objects," Signal Processing: Image Communication, vol. 16, pp. 103-122, Sep. 2000.

Safe Fleet. "Whitepaper: Vendor Interoperability for ABLE," Safe Fleet, pp. 1-6, Apr. 2023, online.

Sengupta, S., "Semantic Mapping of Road Scenes," Oxford Brookes University, Oct. 2014.

Siemens Mobility Inc., "Ratification of Completed Procurement Actions," New York City Transit and Siemens Mobility Inc., Finance Committee Meeting, pp. 80-81, Mar. 2019.

Siemens Mobility Traffic Solutions, "Enforcement solutions for safe and efficient cities," Civil Enforcement, 2016.

Spencer, B. et al., "NYC extends Brooklyn bus lane enforcement," ITS International, Feb. 27, 2020, online.

Sullivan, T., "Transit Bus Surveillance Solutions," New York City Transit/MTA Bus, Jun. 21, 2019, Charlotte, North Carolina, USA.

Tonge, A. et al., "Traffic Rules Violation Detection using Deep Learning," 2020 4th International Conference on Electronics, Communication and Aerospace Technology (ICECA), pp. 1250-1257, Nov. 2020, Coimbatore, India.

(56) References Cited

OTHER PUBLICATIONS

Viorel, C., "Some Aspects Concerning Geometric Forms Automatically Find Images and Ordering Them Using Robot Studio Simulation," *Advanced Materials Research*, vol. 1036, pp. 760-763, Oct. 1, 2014.

Wu, C. et al., "Adjacent Lane Detection and Lateral Vehicle Distance Measurement Using Vision-Based Neuro-Fuzzy Approaches," *Journal of Applied Research and Technology*, vol. 11, pp. 251-258, Apr. 2013.

Zhao Z. et al., "Deep Reinforcement Learning Based Lane Detection and Localization," *Neurocomputing*, vol. 413, pp. 328-338, Jul. 2020.

Zhou, C. et al., "Predicting the passenger demand on bus services for mobile users," *Pervasive and Mobile Computing*, vol. 25, pp. 48-66, Jan. 2016.

\* cited by examiner

CARRIER VEHICLE 110

MUNICIPAL FLEET VEHICLE

SEMI-AUTONOMOUS VEHICLE

AUTONOMOUS VEHICLE

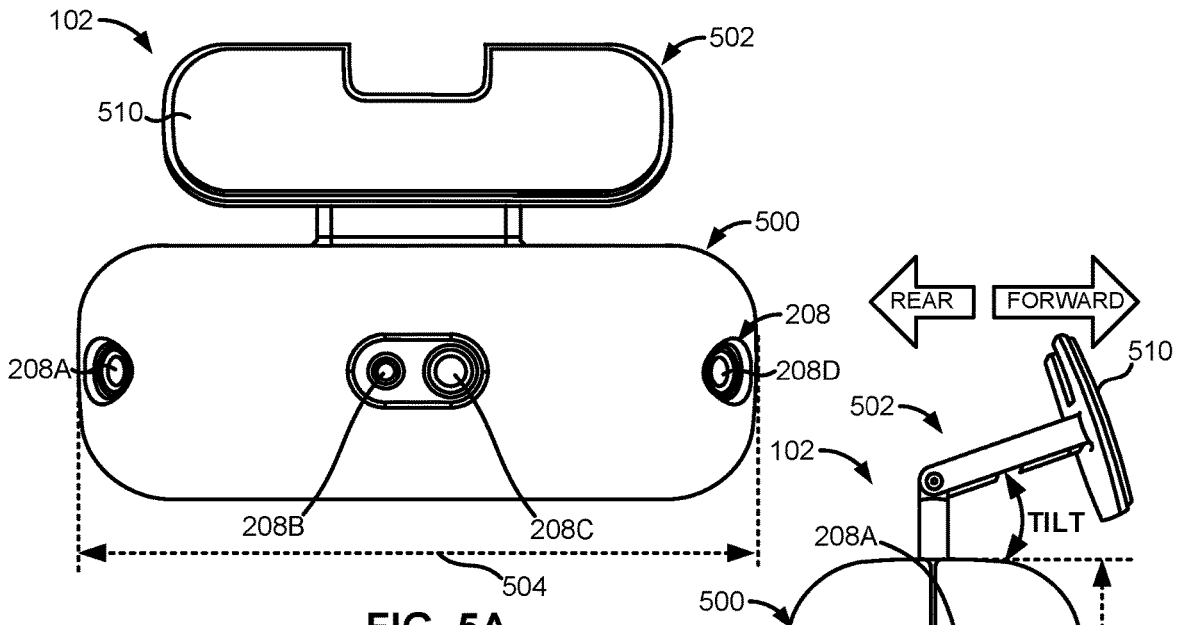
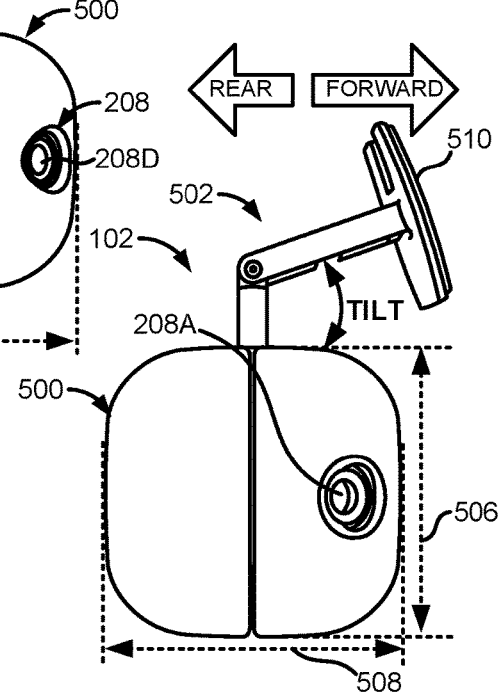
FIG. 5A
FIG. 5B
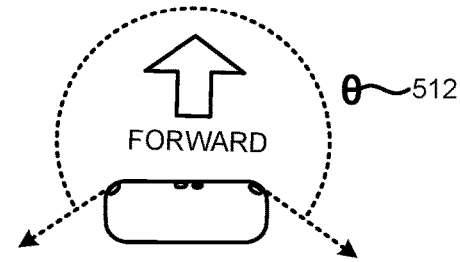
FIG. 5C
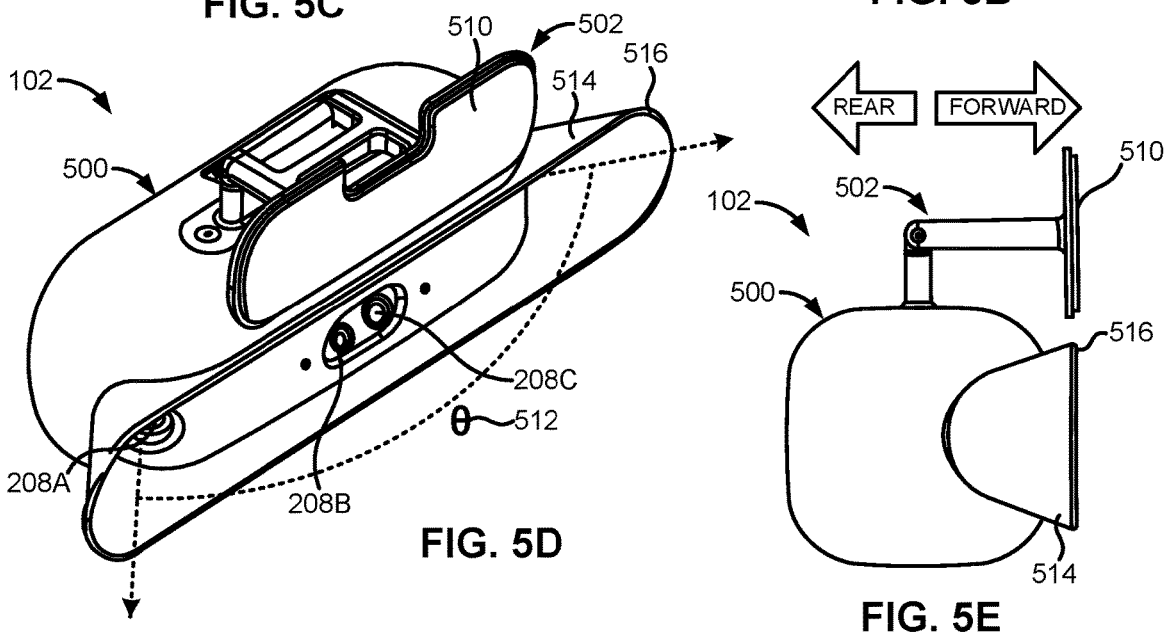
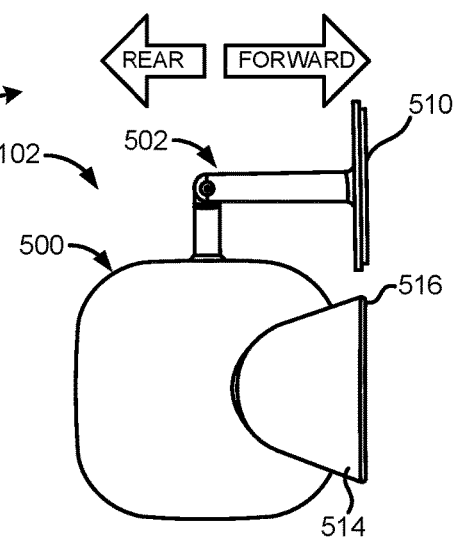
FIG. 5D
FIG. 5E

| Packet Count | GPS signal or connection to NTP server? | Local Timestamps based on local clock | GPS time/ NTP time (More accurate time) | Time Diff. | Server Rectified or Corrected Timestamp |
|---|---|---|---|---|---|
| 0 | Yes | 8:00 | 8:00 | | |
| 1 | No | 8:10 | 8:11 | 0:01 | =8:10 + 0:01 = 8:11 |
| 2 | No | 8:20 | 8:22 | 0:02 | =8:20 + 0:02 = 8:22 |
| Evidence Package | No | 8:23 | 8:25 | | =8:22+(8:23-8:20)= 8:25 |
| 3 | No | 8:30 | 8:33 | 0:03 | =8:30 + 0:03 = 8:33 |
| 4 | No | 8:40 | 8:44 | 0:04 | =8:40 + 0:04 = 8:44 |
| 5 | Yes | 8:50-->8:55 | 8:55 | 0:05 | |

FIG. 11

SYSTEMS AND METHODS FOR ENFORCING TRAFFIC CONGESTION PRICING

CROSS-REFERENCE TO RELATED APPLICATION

This application claims the benefit of U.S. Provisional Patent Application No. 63/180,938 filed on Apr. 28, 2021, the content of which is incorporated herein by reference in its entirety.

TECHNICAL FIELD

This disclosure relates generally to the field of computer-based traffic congestion management and more specifically, to systems and methods for alleviating traffic congestion within an enforcement zone.

BACKGROUND

Congestion pricing is an effective way to harness the power of the market to reduce the waste in time and energy associated with traffic congestion. Congestion pricing works by shifting single or low occupancy vehicle traffic to other transportation modes such as public transportation during peak periods or to off-peak periods. By deterring just a fraction of the vehicles from entering a congested area or traveling on a congested roadway, congestion pricing can allow traffic to flow more freely, thereby avoiding gridlock. There is a consensus among transportation experts and economists that congestion pricing represents the single most viable and sustainable approach to reducing traffic congestion.

Congestion pricing rules are typically set by a municipality's department of transportation or transportation commission. Such rules often involve establishing a restricted zone or roadway lane (e.g., a lane on a highway) and charging drivers a fee for entering the restricted zone or driving in the restricted lane.

However, traditional systems and approaches for enforcing such traffic congestion pricing rules are often beset by many challenges. These traditional systems and approaches include labor-intensive toll collection booths or checkpoints that can often end up causing their own traffic congestion problems. Moreover, while some municipalities have deployed automated camera-based solutions for enforcing congestion pricing, such surveillance cameras are often stationary and extremely error-prone since such cameras rely on snapshots of a moving vehicle usually taken from one angle. Moreover, such automated systems often require that any digital evidence of wrongdoing or a violation of the congestion pricing rules be transmitted over a network to a central server for further review and processing. However, these automated systems often do not have the capability to track the authenticity or integrity of such digital evidence packages.

Therefore, a solution is needed which addresses the above-mentioned challenges. Such a solution should be accurate and take advantage of resources currently available to a municipality or other government entity. Moreover, such a solution should reduce congestion, improve traffic safety, and enable transportation efficiency. Furthermore, such a solution should be scalable, reliable, and not be overly expensive to deploy.

SUMMARY

Disclosed herein are methods, systems, and apparatus for alleviating traffic congestion within an enforcement zone. The enforcement zone can be established in connection with a traffic congestion pricing policy. For purposes of this disclosure, the traffic congestion pricing policy can be a policy or rule that aims to alleviate traffic congestion with an enforcement zone by charging non-exempt vehicles a fee for driving within the enforcement zone during an enforcement period.

For example, disclosed is one embodiment of a method for alleviating traffic congestion within an enforcement zone, comprising: capturing one or more videos of a vehicle using at least one video image sensor of the edge device, using one or more processors of the edge device to pass video frames from the one or more videos to an object-detection neural network running on the edge device to detect at least one vehicle attribute of the vehicle from the video frames and pass the video frames to a license plate-recognition neural network running on the edge device to recognize a license plate number of the vehicle from the video frames; determining, using the one or more processors of the edge device, that the vehicle is not exempt from a policy or rule concerning the enforcement zone based in part on the at least one vehicle attribute detected and the license plate number recognized; determining, using one or more processors of the edge device, that the vehicle is at a first location within the enforcement zone during an enforcement period; transmitting, from the edge device to the server, a first evidence package including the first location, a first timestamp marking when the vehicle was detected at the first location, the license plate number, and at least a portion of the one or more videos; determining, using one or more processors of the edge device, that the vehicle is at a second location within the enforcement zone during the enforcement period; transmitting, from the edge device to the server, a second evidence package including the second location, a second timestamp marking when the vehicle was detected at the second location, the license plate number, and at least another portion of the one or more videos; and determining, at the server, that the vehicle was in motion within the enforcement zone during the enforcement period based on data and information from the first evidence package and the second evidence package.

Further disclosed is another embodiment of the method for alleviating traffic congestion within an enforcement zone, comprising: capturing a first video of a vehicle using at least one video image sensor of a first edge device coupled to a first carrier vehicle; using one or more processors of the first edge device to pass video frames from the first video to a first object-detection neural network running on the first edge device to detect at least one vehicle attribute of the vehicle from the video frames and pass the video frames to a first license plate-recognition neural network running on the first edge device to recognize a license plate number of the vehicle from the video frames; determining, using the one or more processors of the first edge device, that the vehicle is not exempt from a policy or rule concerning the enforcement zone based in part on the at least one vehicle attribute detected and the license plate number recognized; determining, using the one or more processors of the first edge device, that the vehicle is at a first location within the enforcement zone during an enforcement period; transmitting, from the first edge device to the server, a first evidence package including the first location, a first timestamp marking when the vehicle was detected at the first location, the license plate number, and at least a portion of the first video; capturing a second video of the vehicle using at least one video image sensor of a second edge device coupled to a second carrier vehicle; using one or more processors of the second edge device to pass video frames from the second video to a second object-detection neural network running on the second edge device to detect at least one vehicle attribute of the vehicle from the video frames and pass the video frames to a second license plate-recognition neural network running on the second edge device to recognize a license plate number of the vehicle from the video frames; determining, using the one or more processors of the second edge device, that the vehicle is not exempt from a policy or rule concerning the enforcement zone based in part on the at least one vehicle attribute detected and the license plate number recognized; determining, using the one or more processors of the second edge device, that the vehicle is at a second location within the enforcement zone during the enforcement period; transmitting, from the second edge device to the server, a second evidence package including the second location, a second timestamp marking when the vehicle was detected at the second location, the license plate number, and at least a portion of the second video; and determining, at the server, that the vehicle was in motion within the enforcement zone during the enforcement period based on data and information from the first evidence package and the second evidence package.

Also disclosed is one embodiment of a system for alleviating traffic congestion within an enforcement zone. The system can comprise: an edge device including video image sensors configured to capture one or more videos of a vehicle, wherein the edge device includes one or more processors programmed to: pass video frames from the one or more videos to an object-detection neural network running on the edge device to detect at least one vehicle attribute of the vehicle from the video frames and pass the video frames to a license plate-recognition neural network running on the edge device to recognize a license plate number of the vehicle from the video frames, determine that the vehicle is not exempt from a policy or rule concerning the enforcement zone based in part on the at least one vehicle attribute detected and the license plate number recognized, determine that the vehicle is at a first location within the enforcement zone during an enforcement period, transmit, to a server, a first evidence package including the first location, a first timestamp marking when the vehicle was detected at the first location, the license plate number, and at least a portion of the one or more videos, determine that the vehicle is at a second location within the enforcement zone during the enforcement period, and transmit, to the server, a second evidence package including the second location, a second timestamp marking when the vehicle was detected at the second location, the license plate number, and at least another portion of the one or more videos; and wherein the server is communicatively coupled to the edge device, wherein the server includes one or more server processors programmed to determine that the vehicle was in motion within the enforcement zone during the enforcement period based on data and information from the first evidence package and the second evidence package.

Further disclosed is another embodiment of the system for alleviating traffic congestion within an enforcement zone. The system can comprise: a first edge device including one or more video image sensors configured to capture a first video of a vehicle, wherein the first edge device includes one or more processors programmed to: pass video frames from the first video to a first object-detection neural network running on the first edge device to detect at least one vehicle attribute of the vehicle from the video frames and pass the video frames to a first license plate-recognition neural network running on the first edge device to recognize a license plate number of the vehicle from the video frames, determine that the vehicle is not exempt from a policy or rule concerning the enforcement zone based in part on the at least one vehicle attribute detected and the license plate number recognized, determine that the vehicle is at a first location within the enforcement zone during an enforcement period, and transmit, to a server, a first evidence package including the first location, a first timestamp marking when the vehicle was detected at the first location, the license plate number, and at least a portion of the first video; a second edge device including one or more video image sensors configured to capture a second video of the vehicle, wherein the second edge device includes one or more processors programmed to: pass video frames from the second video to a second object-detection neural network running on the second edge device to detect at least one vehicle attribute of the vehicle from the video frames and pass the video frames to a second license plate-recognition neural network running on the second edge device to recognize the license plate number of the vehicle from the video frames, determine that the vehicle is not exempt from a policy or rule concerning the enforcement zone based in part on the at least one vehicle attribute detected and the license plate number recognized, determine that the vehicle is at a second location within the enforcement zone during the enforcement period, and transmit, to the server, a second evidence package including the second location, a second timestamp marking when the vehicle was detected at the second location, the license plate number, and at least a portion of the second video; and wherein the server is communicatively coupled to the first edge device and the second edge device, wherein the server includes one or more server processors programmed to determine that the vehicle was in motion within the enforcement zone during the enforcement period based on data and information from the first evidence package and the second evidence package.

Also disclosed is one or more non-transitory computer-readable media comprising machine-executable instructions stored thereon, wherein the instructions, when executed by one or more processors, can cause the one or more processors to perform the steps of: capturing one or more videos of a vehicle using at least one video image sensor of an edge device; passing video frames from the one or more videos to an object-detection neural network running on the edge device to detect at least one vehicle attribute of the vehicle from the video frames and passing the video frames to a license plate-recognition neural network running on the edge device to recognize a license plate number of the vehicle from the video frames; determining that the vehicle is not exempt from a policy or rule concerning an enforcement zone based in part on the at least one vehicle attribute detected and the license plate number recognized; determining that the vehicle is at a first location within the enforcement zone during an enforcement period; transmitting, from the edge device to a server, a first evidence package including the first location, a first timestamp marking when the vehicle was detected at the first location, the license plate number, and at least a portion of the one or more videos; determining that the vehicle is at a second location within the enforcement zone during the enforcement period; transmitting, from the edge device to the server, a second evidence package including the second location, a second timestamp marking when the vehicle was detected at the second location, the license plate number, and at least another portion of the one or more videos; and determining, at the server, that the vehicle was in motion within the enforcement zone during the enforcement period based on data and information from the first evidence package and the second evidence package.

Further disclosed is one or more non-transitory computer-readable media comprising machine-executable instructions stored thereon, wherein the instructions, when executed by one or more processors, can cause the one or more processors to perform the steps of: capturing a first video of a vehicle using at least one video image sensor of a first edge device coupled to a first carrier vehicle; passing video frames from the first video to a first object-detection neural network running on the first edge device to detect at least one vehicle attribute of the vehicle from the video frames and passing the video frames to a first license plate-recognition neural network running on the first edge device to recognize a license plate number of the vehicle from the video frames; determining, at the first edge device, that the vehicle is not exempt from a policy or rule concerning an enforcement zone based in part on the at least one vehicle attribute detected and the license plate number recognized; determining, at the first edge device, that the vehicle is at a first location within the enforcement zone during an enforcement period; transmitting, from the first edge device to a server, a first evidence package including the first location, a first timestamp marking when the vehicle was detected at the first location, the license plate number, and at least a portion of the first video; capturing a second video of the vehicle using at least one video image sensor of a second edge device coupled to a second carrier vehicle; passing video frames from the second video to a second object-detection neural network running on the second edge device to detect at least one vehicle attribute of the vehicle from the video frames and passing the video frames to a second license plate-recognition neural network running on the second edge device to recognize a license plate number of the vehicle from the video frames; determining, at the second edge device, that the vehicle is not exempt from a policy or rule concerning the enforcement zone based in part on the at least one vehicle attribute detected and the license plate number recognized; determining, at the second edge device, that the vehicle is at a second location within the enforcement zone during the enforcement period; transmitting, from the second edge device to the server, a second evidence package including the second location, a second timestamp marking when the vehicle was detected at the second location, the license plate number, and at least a portion of the second video; and determining, at the server, that the vehicle was in motion within the enforcement zone during the enforcement period based on data and information from the first evidence package and the second evidence package.

In some embodiments, the enforcement zone is one lane of a roadway.

In some embodiments, the enforcement zone comprises a partial segment of a roadway but not an entire segment of the roadway.

In some embodiments, the enforcement zone comprises at least part of a carrier route of a carrier vehicle, and where at least one edge device is coupled to the carrier vehicle.

In some embodiments, the server is configured to receive boundaries of the enforcement zone and the enforcement period as a result of user inputs applied to an interactive map user interface displayed on a computing device; and transmitting, from the server to the edge device, coordinate data concerning the boundaries of the enforcement zone and the enforcement period to the edge device.

In some embodiments, the edge device is coupled to a carrier vehicle and the one or more videos are captured while both the vehicle and the carrier vehicle are in motion.

In some embodiments, determining whether a non-exempt vehicle is within the enforcement zone further comprises: calculating a separation distance representing a distance separating the edge device from a license plate of the vehicle using an image depth analysis algorithm; adding the separation distance to a present location of the edge device obtained from a positioning unit of the edge device to yield the location of the non-exempt vehicle; and comparing the location against certain boundaries of the enforcement zone to determine that the non-exempt vehicle is within the enforcement zone.

In certain embodiments, the separation distance is calculated using the image depth analysis algorithm based in part on a known size of the license plate in real-space, a known distance between a focal point of a video image sensor of the edge device and an image plane of the video image sensor, a projected size of the license plate on the image plane of the video image sensor, a known size of a calibration license plate in real space, a known calibration distance separating the calibration license plate from the focal point of the video image sensor, and a projected size of the calibration license plate on the image plane of the video image sensor.

In some embodiments, each of the evidence packages further comprises at least one of a global positioning system (GPS) timestamp obtained by the edge device from one or more GPS satellites, a network time protocol (NTP) timestamp obtained by the edge device from a NTP server, and a local timestamp obtained from a clock running locally on the edge device.

In some embodiments, both the GPS timestamp and the NTP timestamp are transmitted to the server as part of an evidence package if both the GPS timestamp and the NTP timestamp are available, and wherein only the local timestamp is transmitted to the server as part of the evidence package if the edge device loses network connection with the NTP server and a GPS signal from the GPS satellite is unavailable.

In some embodiments, the methods and systems disclosed herein further comprise: generating, using the one or more processors of the edge device, an interrupt at a rising edge of each pulse per second (PPS) signal of a GPS receiver of the edge device; and executing a time synchronization function as a result of the interrupt, wherein the time synchronization function further includes: determining whether a local clock running on the edge device is synchronized with a time received from one or more GPS satellites or determining whether the clock running locally on the edge device is synchronized with a time received from the NTP server, and synchronizing the clock running locally on the edge device to within one second of the time received from the one or more GPS satellites or the time received from the NTP server.

In some embodiments, the methods and systems disclosed herein further comprise: transmitting hashed signature packets from the edge device to the server at fixed time intervals; determining, at the server, that a timestamp received from the edge device as part of the evidence package is inaccurate; and calculating, at the server, a corrected timestamp to replace the inaccurate timestamp using the hashed signature packets.

In some embodiments, the methods and systems disclosed herein further comprise: transmitting, from the edge device to the server, a hashed signature packet along with an evidence package; and authenticating, at the server, the evidence package using a hashed signature from the hashed signature packet.

In certain embodiments, the hashed signature is generated at the edge device by applying a hash algorithm to an alphanumeric string obtained by concatenating a timestamp and data outputted by multiple electronic components running on at least one of the edge device and a carrier vehicle carrying the edge device, wherein the hashed signature packet further includes the timestamp and the data outputted by the multiple electronic components, wherein the server authenticates the evidence package by applying the same hash algorithm to the timestamp and the data outputted by the multiple electronic components to yield a reconstructed hash signature, and wherein the server compares the reconstructed hash signature against the hashed signature received from the edge device to authenticate the evidence package.

In some embodiments, the methods and systems disclosed herein further comprise: receiving, at the server, a plurality of evidence packages including the first evidence package and the second evidence package; grouping at least some of the evidence packages into a first location cluster, wherein the first evidence package is grouped into the first location cluster due to a geographic proximity of the first location to other vehicle locations within the other evidence packages included as part of the first location cluster; and grouping at least some of the other evidence packages into a second location cluster, wherein the second evidence package is grouped into the second location cluster due to a geographic proximity of the second location to other vehicle locations within the other evidence packages included as part of the second location cluster.

BRIEF DESCRIPTION OF THE DRAWINGS

FIG. 5A illustrates a front view of one embodiment of an edge device.

FIG. 5B illustrates a right side view of the embodiment of the edge device shown in FIG. 5A.

FIG. 5C illustrates a combined field of view of cameras housed within the embodiment of the edge device shown in FIG. 5A.

FIG. 5D illustrates a perspective view of another embodiment of the edge device having a camera skirt.

FIG. 5E illustrates a right side view of the embodiment of the edge device shown in FIG. 5D.

FIG. 11 is a table illustrating an example method of calculating a corrected timestamp to replace an inaccurate timestamp included as part of an evidence package.

DETAILED DESCRIPTION

Figure 1A:
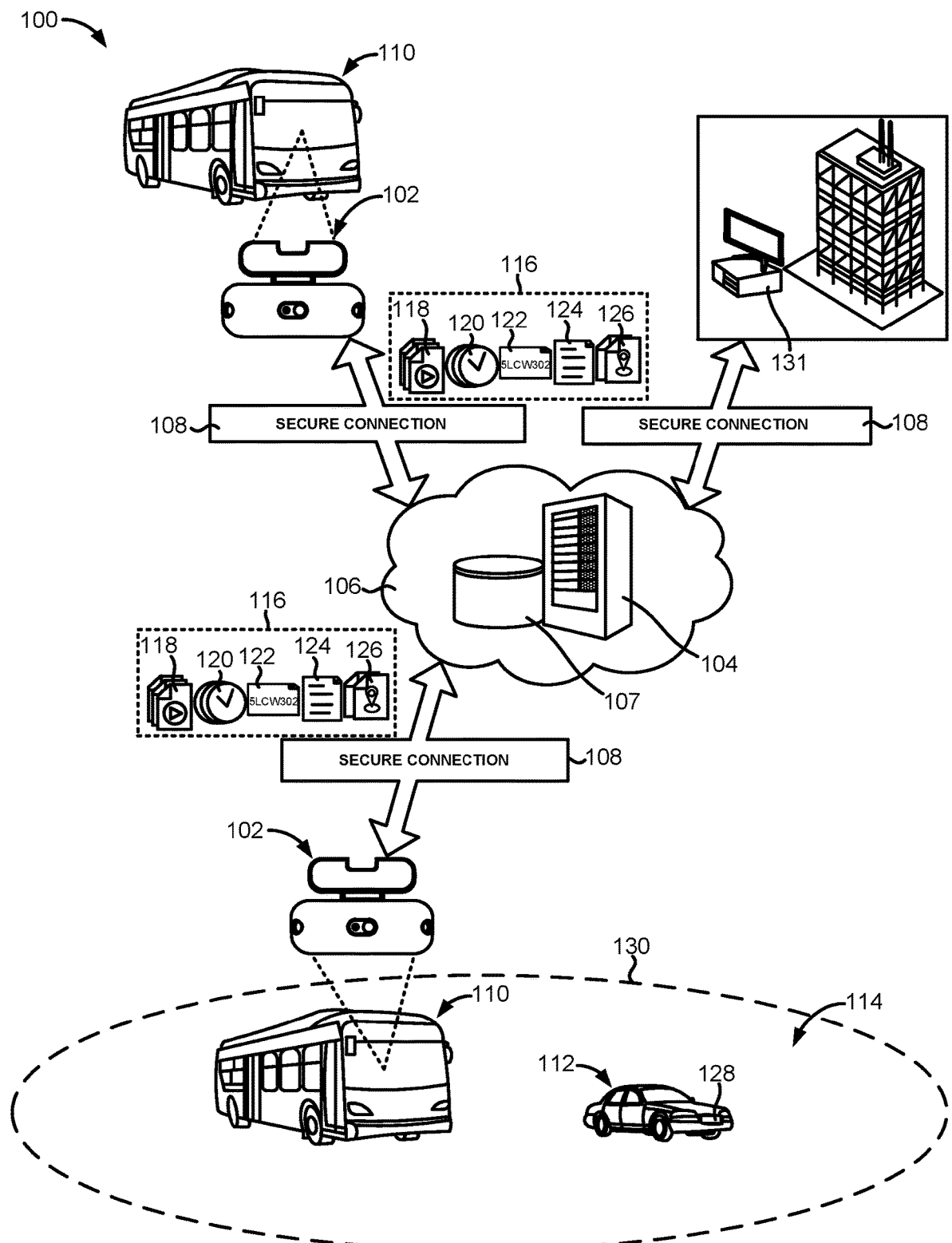
FIG. 1A illustrates one embodiment of a system for alleviating traffic congestion within an enforcement zone.

FIG. 1A illustrates one embodiment of a system 100 for alleviating traffic congestion within an enforcement zone. The system 100 can comprise a plurality of edge devices 102 communicatively coupled to or in wireless communication with a server 104 in a cloud computing environment 106.

The server 104 can comprise or refer to one or more virtual servers, virtualized computing resources, cloud computing resources, or a combination thereof. For example, the server 104 can refer to one or more servers hosted and delivered by a cloud computing platform (e.g., Amazon Web Services®, Microsoft Azure®, or Google Cloud®). In other embodiments, the server 104 can refer to one or more stand-alone servers such as a rack-mounted server, a blade server, a mainframe, a dedicated desktop or laptop computer, one or more processors or processor cores therein, or a combination thereof.

The edge devices 102 can communicate with the server 104 over one or more networks. In some embodiments, the networks can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof. The server 104 and the plurality of edge devices 102 can connect to the network using any number of wired connections (e.g., Ethernet, fiber optic cables, etc.), wireless connections established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (WiFi) (IEEE 802.11) communication protocol, an ultra-wideband (UWB) (IEEE 802.15.3) communication protocol, a ZigBee™ (IEEE 802.15.4) communication protocol, or a combination thereof.

The edge devices 102 can transmit data and files to the server 104 and receive data and files from the server 104 via secure connections 108. The secure connections 108 can be real-time bidirectional connections secured using one or more encryption protocols such as a secure sockets layer (SSL) protocol, a transport layer security (TLS) protocol, or a combination thereof. Additionally, data or packets transmitted over the secure connection 108 can be encrypted using a Secure Hash Algorithm (SHA) or another suitable encryption algorithm. Data or packets transmitted over the secure connection 108 can also be encrypted using an Advanced Encryption Standard (AES) cipher.

The server 104 can store data and files received from the edge devices 102 in one or more databases 107 in the cloud computing environment 106. In some embodiments, the database 107 can be a relational database. In further embodiments, the database 107 can be a column-oriented or key-value database. In certain embodiments, the database 107 can be stored in a server memory or storage unit 220. In other embodiments, the database 107 can be distributed among multiple storage nodes.

As will be discussed in more detail in the following sections, each of the edge devices 102 can be carried by or installed in a carrier vehicle 110 (see FIG. 4 for examples of different types of carrier vehicles 110).

For example, the edge device 102 can be secured or otherwise coupled to a windshield, window, or dashboard/deck of the carrier vehicle 110. Also, for example, the edge device 102 can be secured or otherwise coupled to a handlebar/handrail of a micro-mobility vehicle serving as the carrier vehicle 110. Alternatively, the edge device 102 can be secured or otherwise coupled to a mount or body of a UAV or drone serving as the carrier vehicle 110.

When properly coupled or secured to the windshield, window, or dashboard/deck of the carrier vehicle 110 or secured to a handrail, handlebar, or mount/body of the carrier vehicle 110, the edge device 102 can use its video image sensors 208 (see, e.g., FIG. 5A-5E) to capture videos of an external environment within a field view of the video image sensors 208. Each of the edge devices 102 can then process and analyze video frames from such videos using certain computer vision tools from a computer vision library and a plurality of deep learning models to determine whether a non-exempt vehicle 112 is driving or otherwise in motion within an enforcement zone 114 established in connection with a traffic congestion pricing rule or policy.

A non-exempt vehicle 112 can refer to a vehicle that is not exempt from the traffic congestion pricing policy. Those vehicles that are exempt can include, but are not limited to, a municipal transportation vehicle (e.g., a city bus, trolley, light-rail train, etc.), a municipal cleaning vehicle (e.g., a waste management vehicle, a street sweeper), a public safety vehicle (e.g., a law-enforcement vehicle, a fire truck, etc.), or an emergency medical vehicle (e.g., an ambulance).

The edge device 102 can transmit data, videos, and other files concerning the non-exempt vehicle 112 to the server 104 in the form of an evidence package 116. The evidence package 116 can include one or more videos 118 of the non-exempt vehicle 112, a plurality of timestamps 120 recorded by the edge device 102, a license plate number 122 of the non-exempt vehicle 112, vehicle attributes 124 of the non-exempt vehicle 112, and at least one location 126 of the non-exempt vehicle 112 within the enforcement zone 114 as determined by the edge device 102.

For example, when the non-exempt vehicle 112 is within a field-of-view of at least one of the video image sensors 208 (see, e.g., FIGS. 5A-5E) of the edge device 102, the at least one video image sensor 208 along with other video image sensors 208 of the edge device 102 can capture one or more videos 118 of the non-exempt vehicle 112. The one or more videos 118 of the non-exempt vehicle 112 can be captured while both the carrier vehicle 110 carrying the edge device 102 and the non-exempt vehicle 112 are in motion.

In one embodiment, the one or more videos 118 can be captured in the MPEG-4 Part 12 or MP4 file format. For purposes of this disclosure, references to "a video" or "the video" (for example, the video 118) can refer to any of the videos captured by any of the video image sensors 208 of the edge device 102 or a compilation video made from videos captured by some or all of the video image sensors 208 of the edge device 102.

One or more processors of the edge device 102 can be programmed to automatically identify objects from the one or more videos 118 by applying a plurality of functions from a computer vision library 310 (see, e.g., FIG. 3) to the one or more videos 118 to, among other things, read video frames from the one or more videos 118 and pass at least some of the video frames from the one or more videos 118 to a plurality of deep learning models (see, e.g., FIG. 3) running on the edge device 102.

In some embodiments, the one or more processors of the edge device 102 can also pass the video frames of the one or more videos 118 to one of the deep learning models to identify a set of vehicle attributes 124 of the non-exempt vehicle 112. The set of vehicle attributes 124 can include a color of the non-exempt vehicle 112, a make and model of the non-exempt vehicle 112, and a vehicle type of the non-exempt vehicle 112 (for example, whether the vehicle 112 is a personal vehicle or a municipal vehicle such as a fire truck, ambulance, parking enforcement vehicle, police car, etc.). This can allow the edge device 102 to at least initially identify the non-exempt vehicle 112 as being subject to the traffic congestion pricing policy or rule.

The one or more processors of the edge device 102 can also pass certain video frames showing a license plate 128 of the non-exempt vehicle 112 to a deep learning model trained for license plate recognition (LPR). The LPR deep learning model can be part of a license plate recognition engine 304 (see, e.g., FIG. 3) running on the edge device 102.

In other embodiments not shown in the figures, the license plate recognition engine 304 can be run on the server 104. In further embodiments, the license plate recognition engine 304 can be run on both the edge device 102 and the server 104.

In some embodiments, at least one of the video image sensors 208 of the edge device 102 can be a dedicated LPR camera. The edge device 102 can pass video frames captured by the LPR camera (showing the license plate 128 of the non-exempt vehicle 112) to the license plate recognition engine 304 to automatically recognize an alphanumeric string representing a license plate number 122 of the vehicle 112.

The edge device 102 can also determine a location 126 of the non-exempt vehicle 112 using, in part, a present location of the edge device 102 based on positioning data obtained from a positioning unit 210 (see, e.g., FIG. 2A) of the edge device 102. For example, the edge device 102 can estimate the location 126 of the non-exempt vehicle 112 by calculating a distance separating the non-exempt vehicle 112 from the edge device 102 and adding such a separation distance to its own present location. As will be discussed in more detail in later sections, the edge device 102 can calculate the distance separating the non-exempt vehicle 112 from the edge device 102 using video frames containing the license plate 128 of the non-exempt vehicle 112 and certain computer vision algorithms designed for distance calculation.

Once the edge device 102 has determined the location 126 of the non-exempt vehicle 112, the edge device 102 can compare the location 126 of the non-exempt vehicle 112 with certain boundaries 130 of the enforcement zone 114 to determine whether the non-exempt vehicle 112 is within the enforcement zone 114.

In alternative embodiments, the edge device 102 can also determine the location 126 of the non-exempt vehicle 112 using, in part, inertial measurement data obtained from an IMU 206 (see, e.g., FIG. 2A) and wheel odometry data 216 (see, FIG. 2A) obtained from a wheel odometer of the carrier vehicle 110.

The edge device 102 can also record or generate at least one timestamp 120 to mark the time when the non-exempt vehicle 112 was detected at the location 126 within the enforcement zone 114. In some embodiments, the edge device 102 can mark the time using several timestamps 120 including a global positioning system (GPS) timestamp and a Network Time Protocol (NTP) timestamp. The edge device 102 can record timestamps 120 from multiple sources in case one of the timestamps 120 is inaccurate. All such timestamps 120 can be included as part of the evidence package 116. Recordation and synchronization of timestamps 120 will be discussed in more detail in later sections.

The edge device 102 can use the at least one timestamp 120 to determine if the time reflected by the at least one timestamp 120 is within an enforcement period 706 (see, e.g., FIG. 7A) set by an administrator of the traffic congestion pricing policy. The enforcement period 706 can be provided by the server 104 to the edge device 102 along with the boundaries 130 of the enforcement zone 114. The edge device 102 can also query the server 104 for the enforcement period 706 or to update an enforcement period 706 stored locally on the edge device 102.

Once the edge device 102 has detected that the non-exempt vehicle 112 is at a location 126 within the boundaries 130 of the enforcement zone 114 within the enforcement period 706, the edge device 102 can transmit the evidence package 116 to the server 104.

As will be discussed in more detail in the following sections, the server 104 can make a final determination as to whether the non-exempt vehicle 112 was in motion within the enforcement zone 114 based on multiple evidence packages 116 received from the same edge device 102 or based on multiple evidence packages 116 received from multiple edge devices 102.

FIG. 1A also illustrates that the server 104 can be communicatively coupled to a computing device 131. The server 104 can transmit certain data and files to and receive certain data and files from the computing device 131. In some embodiments, the computing device 131 can be used by a user of the system 100 to set certain parameters or guidelines concerning the traffic congestion pricing policy or rule. In these and other embodiments, the computing device 131 can also be used by an administrator to review a final evidence package prepared by the server 104 based on the multiple evidence packages 116 received from the edge devices 102.

In some embodiments, the computing device 131 can be a server or computing resource of a third-party traffic violation processor. As a more specific example, the computing device 131 can be a server or computing resource of a government transportation department or a department of motor vehicles. In other examples, the computing device 131 can be a server or computing resource of a sub-contractor responsible for processing traffic violations for a municipality or other government entity.

In other embodiments, the computing device 131 can be a portable or non-portable computing device used by a user to communicate with the server 104. For example, the computing device 131 can be to a desktop computer or a laptop computer. In other embodiments, the computing device 131 can be a tablet computer or smartphone.

The server 104 can generate or render a number of graphical user interfaces (GUIs) (see, e.g., FIGS. 7A-7C) that can be displayed through a web portal, desktop application, or mobile application run on the third-party computing device 131.

In some embodiments, at least one of the GUIs can allow an administrator of the traffic congestion policy or rule to establish the boundaries 130 of the enforcement zone 114. For example, the server 104 can receive the boundaries 130 of the enforcement zone 114 in response to user inputs applied to an interactive map user interface 702 (see, e.g., FIGS. 7A-7C) included as part of a GUI displayed on the computing device 131.

In some embodiments, the system 100 can also offer an application programming interface (API) designed to allow third-parties to access data and visualizations captured or collected by the edge devices 102, the server 104, or a combination thereof.

Figure 1B:
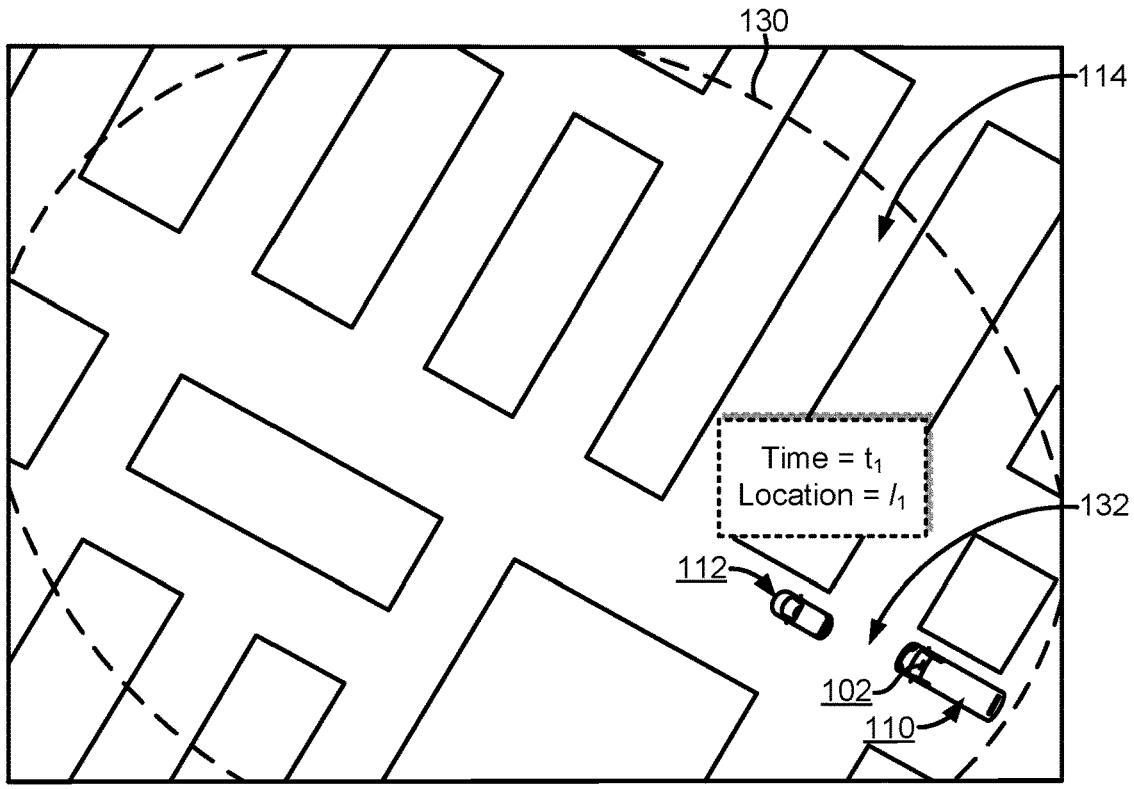
FIGS. 1B-1E illustrate multiple ways that the system of FIG. 1A can be utilized to enforce the traffic congestion pricing policy.
Figure 1C:
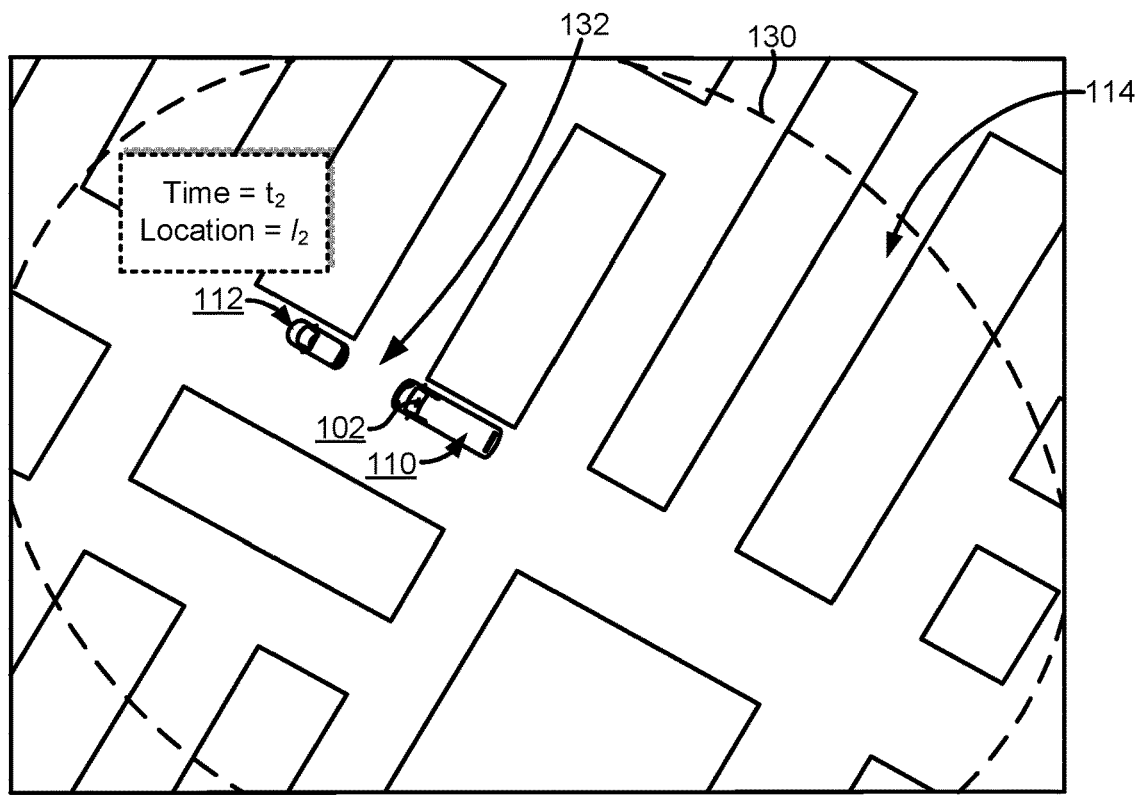

FIGS. 1B-1E illustrate two ways that the system 100 of FIG. 1A can be utilized to enforce a traffic congestion pricing policy. The first way is illustrated in FIGS. 1B and 1C where the server 104 relies on evidence packages 116 provided by one edge device 102 coupled to one carrier vehicle 110 to determine that a non-exempt vehicle 112 was in motion within the boundaries 130 of the enforcement zone 114.

Figure 1D:
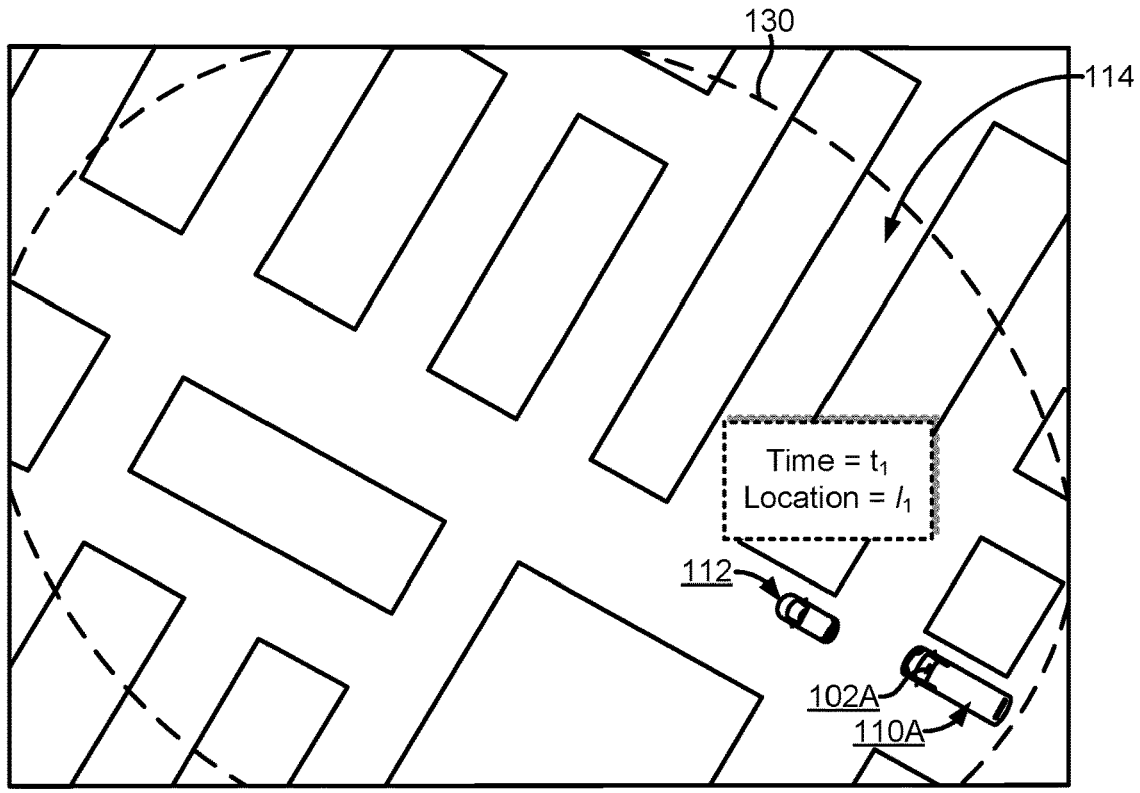
Figure 1E:
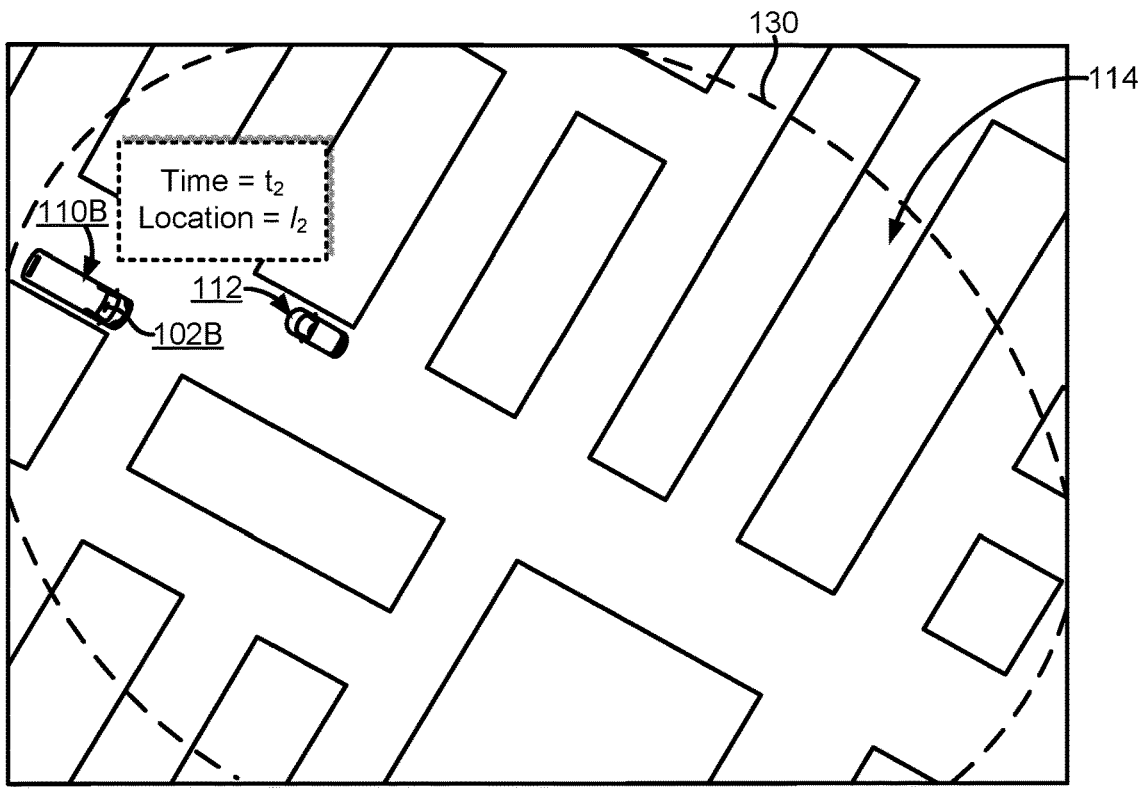

The second way is illustrated in FIGS. 1D and 1E where the server 104 relies on evidence packages 116 provided by two edge devices 102, each coupled to a carrier vehicle 110, to determine that a non-exempt vehicle 112 was in motion within the boundaries 130 of the enforcement zone 114. Both ways can be considered different embodiments of a method of enforcing a traffic congestion policy.

FIG. 1B illustrates that a non-exempt vehicle 112 can be driving on a roadway within the enforcement zone 114. For example, the roadway can be a street of a downtown area of a municipality where the entire downtown area is included as part of an enforcement zone 114. A carrier vehicle 110 having an edge device 102 coupled to a windshield or dashboard of the carrier vehicle 110 can encounter the non-exempt vehicle 112 as the carrier vehicle 110 traverses its carrier route 132.

The carrier route 132 can be a preset route or daily route traversed by the carrier vehicle 110. For example, when the carrier vehicle 110 is a municipal bus, the carrier route 132 of the carrier vehicle 110 can be a bus route. As additional examples, the carrier route 132 can be a waste collection route if the carrier vehicle 110 is a garbage/recycling truck or the carrier route 132 can be a street cleaning route if the carrier vehicle 110 is a street sweeper.

As shown in FIG. 1B, the carrier vehicle 110 can be driving behind the non-exempt vehicle 112 in the same direction as the non-exempt vehicle 112 when the carrier vehicle 110 encounters the non-exempt vehicle 112. In other embodiments not shown in FIG. 1B, the carrier vehicle 110 can be driving alongside the non-exempt vehicle in a lane adjacent to or near (but not adjacent to) the lane occupied by the non-exempt vehicle 112.

As previously discussed, in some embodiments, the edge device 102 can be configured to continuously take or capture one or more videos 118 of its surrounding environment (i.e., an environment outside of the carrier vehicle 110) as the carrier vehicle 110 traverses its carrier route 132.

In certain embodiments, the edge device 102 can only begin capturing the one or more videos 118 when the carrier vehicle 110 is within the boundaries 130 of the enforcement zone 114. In other embodiments, the edge device 102 can only begin capturing the one or more videos 118 during an enforcement period 706.

In some embodiments, the enforcement zone 114 established using the system 100 can comprise or encompass at least part of a carrier route 132 or a segment of such a carrier route 132. More specifically, the enforcement zone 114 established using the system 100 can comprise or encompass roadway(s) covered by at least part of a carrier route 132 or a segment of such a carrier route 132.

The edge device 102 can begin capturing one or more videos 118 of the non-exempt vehicle 112 as the non-exempt vehicle 112 enters the field of view of at least one video image sensor 208 of the edge device 102. The edge device 102 can periodically or continuously pass video frames from the one or more videos 118 to a plurality of deep learning models including at least an object-detection neural network 314 and a license plate-recognition (LPR) neural network 315 running on the edge device 102. The edge device 102 can also apply certain computer vision tools or functions to the video frames to process or standardize the video frames before passing such video frames to the deep learning models.

By feeding video frames to the object-detection neural network 314, the edge device 102 can obtain as outputs, predictions concerning the objects shown in the video frames. For example, the edge device 102 can identify an object shown in the video frame as a car, a truck, a bus, a bicycle, etc. The edge device 102 can also obtain as an output from the object-detection neural network 314 predictions concerning a set of vehicle attributes 124 such as a color, make and model, and vehicle type of the vehicle shown in the video frames. The vehicle attributes 124 can be used by the edge device 102 to make an initial determination as to whether the vehicle shown in the video frames is subject to the traffic congestion pricing policy (i.e., whether the vehicle is exempt or non-exempt).

The edge device 102 can also pass the video frames to an LPR neural network 315 running on the edge device 102. In the example scenario shown in FIG. 1B, at least one video frame of the videos(s) 118 captured by the edge device 102 can show the license plate 128 of the non-exempt vehicle 112 from an overtaking angle (i.e., show the back license plate of the vehicle as the vehicle is driving away). By feeding video frames into the LPR neural network 315, the edge device 102 can obtain as an output from the LPR neural network 315, a prediction concerning the license plate number 122 of the non-exempt vehicle 112.

The edge device 102 can then compare the recognized license plate number 122 against at least one of a license plate whitelist 317 and a license plate blacklist 318 stored on the edge device 102. As will be discussed in more detail in later sections, the license plate whitelist 317 can be a digital repository of license plate numbers of vehicles that are allowed to travel or otherwise be in motion within the enforcement zone 114. For example, such vehicles can be those that are not subject to the traffic congestion pricing policy such as public transportation vehicles, municipal vehicles, or vehicles of residents who live within the enforcement zone 114.

The license plate blacklist 318 can be a digital repository of license plate numbers of vehicles that have previously been identified by the edge device 102 as being subject to the traffic congestion pricing policy or that are non-exempt. For example, the license plate blacklist 318 can be populated by license plate numbers of vehicles that have previously been captured in videos 118 taken by the edge device 102 where the edge device 102 determined that such vehicles are not exempt from the traffic congestion pricing policy. The edge device 102 can add the license plate number 122 of the non-exempt vehicle 112 to the license plate blacklist 318 when the license plate number 122 does not match any of the license plate numbers in the license plate whitelist 317.

In other embodiments, the edge device 102 can query the database 107 and/or the server 104 to determine if the license plate number 122 recognized by the LPR neural network 315 is included in a license plate whitelist 317 or a license plate blacklist 318 stored in the database 107 or stored on the server 104.

The edge device 102 can make an initial determination that the vehicle traveling in front of the carrier vehicle 110 is indeed a non-exempt vehicle 112 by comparing the recognized license plate number 122 of the vehicle against at least one of the license plate whitelist 317 and the license plate blacklist 318. As previously mentioned, the edge device 102 can also use the vehicle attributes 124 predicted by the object-detection neural network 314 as part of this initial determination.

The edge device 102 can also determine whether the non-exempt vehicle 112 is within the boundaries 130 of the enforcement zone 114 based in part on the present location of the edge device 102 obtained from the positioning unit 210 (see, e.g., FIG. 2A) of the edge device 102.

For example, the edge device 102 can estimate a first location ($l_1$) of the non-exempt vehicle 112 by calculating a distance separating the non-exempt vehicle 112 from the edge device 102 and adding such a separation distance to its own present location. As a more specific example, the edge device 102 can calculate the distance separating the non-exempt vehicle 112 from the edge device 102 using video frames containing the license plate 128 of the non-exempt vehicle 112 and certain computer vision algorithms designed for distance calculation.

In alternative embodiments, the edge device 102 can simply use its own present location as the first location ($l_1$) if the non-exempt vehicle 112 is determined to be in close proximity to the carrier vehicle 110.

In certain embodiments, the edge device 102 can also determine its own present location or the location of the non-exempt vehicle 112 using, in part, inertial measurement data obtained from an IMU 206 (see, e.g., FIG. 2A) and wheel odometry data 216 (see, FIG. 2A) obtained from a wheel odometer of the carrier vehicle 110.

The edge device 102 can determine that the non-exempt vehicle 112 is within the boundaries 130 of the enforcement zone 114 by comparing the estimated first location ($l_1$) of the non-exempt vehicle 112 against geospatial coordinates of the boundaries 130 of the enforcement zone 114. Geospatial coordinate data (e.g., latitude/longitude coordinate data) concerning the boundaries 130 of the enforcement zone 114 can be received from the server 104. Such geospatial coordinate data concerning the boundaries 130 of the enforcement zone 114 can be stored locally on the edge device 102 and updated periodically based on new coordinate data received from the server 104.

The edge device 102 can also record or generate at least a first timestamp marking the time ($t_1$) when the non-exempt vehicle 112 was detected at the first location ($l_1$). The edge device 102 can mark the time using several timestamps including a global positioning system (GPS) timestamp and a Network Time Protocol (NTP) timestamp. The edge device 102 can record timestamps 120 from multiple sources in case one of the timestamps 120 is inaccurate.

The edge device 102 can then use the one or more timestamps, including at least the first timestamp, to determine if the time ($t_1$) reflected by the timestamp(s) is within the enforcement period 706 of the traffic congestion pricing policy. If the edge device 102 determines that the first location ($l_1$) is within the boundaries 130 of the enforcement zone 114 and that the time ($t_1$) is within the enforcement period 706, the edge device 102 can transmit a first evidence package to the server 104.

The first evidence package can comprise geospatial coordinate data concerning the first location ($l_1$), the various timestamps including at least the first timestamp marking the time ($t_1$) that the non-exempt vehicle 112 was detected at the first location ($l_1$), the license plate number 122 of the non-exempt vehicle 112, the detected vehicle attributes 124, and at least a portion of the one or more videos 118 captured by the edge device 102 showing the non-exempt vehicle 112 at the first location ($l_1$).

The same carrier vehicle 110 can encounter the non-exempt vehicle 112 again at a later time at a different location within the enforcement zone 114. For example, as shown in FIG. 1C, the carrier vehicle 110 can continue to drive behind the non-exempt vehicle 112 as the non-exempt vehicle 112 drives further along the same roadway.

The edge device 102 can also continue to capture video(s) 118 of the non-exempt vehicle 112 as the non-exempt vehicle 112 drives further along the same roadway. The edge device 102 can continue to feed video frames from the video(s) 118 to the object-detection neural network 314 and the LPR neural network 315 running on the edge device 102. The edge device 102 can obtain as an output from the object-detection neural network 314, vehicle attributes 124 of the non-exempt vehicle 112. The edge device 102 can also obtain as an output from the LPR neural network 315, the license plate number 122 of the non-exempt vehicle 112.

The edge device 102 can then compare the license plate number 122 against at least one of the license plate whitelist 317 and the license plate blacklist 318. Since the license plate number 122 of the non-exempt vehicle 112 was previously stored as part of the license plate blacklist 318, the edge device 102 can determine that the non-exempt vehicle 112 is not an exempt vehicle and is subject to the traffic congestion pricing policy.

The edge device 102 can then, once again, use its own present location to estimate the new location of the non-exempt vehicle 112. For example, the edge device 102 can estimate a second location ($l_2$) of the non-exempt vehicle 112 by calculating a distance separating the non-exempt vehicle 112 from the edge device 102 and adding such a separation distance to its own present location. In alternative embodiments, the edge device 102 can simply use its own present location as the second location ($l_2$) if the non-exempt vehicle 112 is determined to be in close proximity to the carrier vehicle 110. The edge device 102 can determine that the non-exempt vehicle 112 is still within the boundaries 130 of the enforcement zone 114 by comparing the estimated second location ($l_2$) of the non-exempt vehicle 112 against the coordinates of the boundaries 130 of the enforcement zone 114.

The edge device 102 can also record or generate at least a second timestamp marking the time ($t_2$) when the non-exempt vehicle 112 was detected at the second location ($l_2$). The edge device 102 can mark the time using several timestamps including a global positioning system (GPS) timestamp and a Network Time Protocol (NTP) timestamp.

The edge device 102 can then use the one or more timestamps, including at least the second timestamp, to determine if the time ($t_2$) reflected by the timestamp(s) is within the enforcement period 706 of the traffic congestion pricing policy. If the edge device 102 determines that the second location ($l_2$) is still within the boundaries 130 of the enforcement zone 114 and that the time ($t_2$) is still within the enforcement period 706, the edge device 102 can transmit a second evidence package to the server 104.

The second evidence package can comprise coordinate data concerning the second location ($l_2$), the various timestamps including at least the second timestamp marking the time ($t_2$) that the non-exempt vehicle 112 was detected at the second location ($l_2$), the license plate number 122 of the non-exempt vehicle 112, the detected vehicle attributes 124, and at least another portion of the one or more videos 118 captured by the edge device 102 showing the non-exempt vehicle 112 at the second location ($l_2$).

The server 104 can receive the first evidence package and the second evidence package from the edge device 102. The server 104 can determine that the non-exempt vehicle 112 was in motion within the enforcement zone 114 during the enforcement period 706 based on evidence contained within the first evidence package and the second evidence package.

The server 104 can determine that the non-exempt vehicle 112 was in motion by comparing at least the first location ($l_1$) with the second location ($l_2$) and comparing the first timestamp with the second timestamp. Moreover, the server 104 can also compare the license plate numbers 122 and vehicle attributes 124 contained within the two evidence packages. The server 104 can also double-check to ensure that the vehicle detected within the enforcement zone 114 was indeed a non-exempt vehicle 112 by comparing the license plate number 122 of the vehicle against a license plate whitelist 317 and license plate blacklist 318 stored on the server 104 or stored in the database 107.

Although the above-mentioned example describes the server 104 as receiving two evidence packages 116, in reality, the server 104 would receive numerous evidence packages 116 from the edge device 102 since the edge device 102 is continuously taking videos 118 of its surrounding environment and tracking the whereabouts of vehicles captured in such videos 118. The server 104 can first group the evidence packages 116 into a location cluster 1203 (see FIG. 12) based on a geographic proximity of the locations 126 contained within the evidence packages 116. The server 104 can then compare the evidence from evidence packages 116 that belong to the same location cluster 1203.

In certain embodiments, the server 104 can select one representative evidence package 1205 from each location cluster 1203 to use as part of a final evidence package 1207 (see, e.g., FIG. 12) to be transmitted to a third-party reviewer or a government agency.

FIG. 1D illustrates that a non-exempt vehicle 112 can be driving on a roadway within the enforcement zone 114. For example, the roadway can be a street of a downtown area of a municipality where the entire downtown area is included as part of an enforcement zone 114. A first carrier vehicle 110A having a first edge device 102A coupled to a windshield or dashboard of the first carrier vehicle 110A can encounter the non-exempt vehicle 112 as the first carrier vehicle 110A traverses its carrier route 132.

The carrier route 132 can be a preset route or daily route traversed by the first carrier vehicle 110A. For example, when the first carrier vehicle 110A is a municipal bus, the carrier route 132 of the first carrier vehicle 110A can be a bus route. As additional examples, the carrier route 132 can be a waste collection route if the first carrier vehicle 110A is a garbage/recycling truck or the carrier route 132 can be a street cleaning route if the first carrier vehicle 110A is a street sweeper.

As shown in FIG. 1D, the first carrier vehicle 110A can be driving behind the non-exempt vehicle 112 in the same direction as the non-exempt vehicle 112 when the first carrier vehicle 110A encounters the non-exempt vehicle 112. In other embodiments not shown in FIG. 1D, the first carrier vehicle 110A can be driving alongside the non-exempt vehicle in a lane adjacent to or near (but not adjacent to) the lane occupied by the non-exempt vehicle 112.

The first edge device 102A can be configured to continuously take or capture one or more videos 118 of its surrounding environment (i.e., an environment outside of the carrier vehicle 110) as the first carrier vehicle 110A traverses its carrier route 132.

In certain embodiments, the first edge device 102A can only begin capturing the one or more videos 118 when the first carrier vehicle 110A is within the boundaries 130 of the enforcement zone 114. In other embodiments, the first edge device 102A can only begin capturing the one or more videos 118 during an enforcement period 706.

The first edge device 102A can begin capturing one or more videos 118 of the non-exempt vehicle 112 as the non-exempt vehicle 112 enters the field of view of at least one video image sensor 208 of the first edge device 102A. The first edge device 102A can periodically or continuously pass video frames from the one or more videos 118 to a plurality of deep learning models including at least an object-detection neural network 314 and a license plate-recognition (LPR) neural network 315 running on the first edge device 102A. The first edge device 102A can also apply certain computer vision tools or functions to the video frames to process or standardize the video frames before passing such video frames to the deep learning models.

By feeding video frames to the object-detection neural network 314, the first edge device 102A can obtain as outputs, predictions concerning the objects shown in the video frames. For example, the first edge device 102A can identify an object shown in the video frame as a car, a truck, a bus, a bicycle, etc. The first edge device 102A can also obtain as an output from the object-detection neural network 314 predictions concerning a set of vehicle attributes 124 such as a color, make and model, and vehicle type of the vehicle shown in the video frames. The vehicle attributes 124 can be used by the first edge device 102A to make an initial determination as to whether the vehicle shown in the video frames is subject to the traffic congestion pricing policy (i.e., whether the vehicle is exempt or non-exempt).

The first edge device 102A can also pass the video frames to an LPR neural network 315 running on the first edge device 102A. In the example scenario shown in FIG. 1D, at least one video frame of the video(s) captured by the first edge device 102A can show the license plate 128 of the non-exempt vehicle 112 from an overtaking angle (i.e., show the back license plate of the vehicle as the vehicle is driving away). By feeding video frames into the LPR neural network 315, the first edge device 102A can obtain as an output from the LPR neural network 315, a prediction concerning the license plate number 122 of the non-exempt vehicle 112.

The first edge device 102A can then compare the recognized license plate number 122 against at least one of a license plate whitelist 317 and a license plate blacklist 318 stored on the first edge device 102A. As will be discussed in more detail in later sections, the license plate whitelist 317 can be a digital repository of license plate numbers of vehicles that are allowed to travel or otherwise be in motion within the enforcement zone 114. For example, such vehicles can be those that are not subject to the traffic congestion pricing policy such as public transportation vehicles, municipal vehicles, or vehicles of residents who live within the enforcement zone 114.

The license plate blacklist 318 can be a digital repository of license plate numbers of vehicles that have previously been identified by the first edge device 102A as being subject to the traffic congestion pricing policy or that are non-exempt. For example, the license plate blacklist 318 can be populated by license plate numbers of vehicles that have previously been captured in videos 118 taken by the first edge device 102A where the first edge device 102A determined that such vehicles are not exempt from the traffic congestion pricing policy. The first edge device 102A can add the license plate number 122 of the non-exempt vehicle 112 to the license plate blacklist 318 when the license plate number 122 does not match any of the license plate numbers in the license plate whitelist 317.

In other embodiments, the first edge device 102A can query the database 107 and/or the server 104 to determine if the license plate number 122 recognized by the LPR neural network 315 is included in a license plate whitelist 317 or a license plate blacklist 318 stored in the database 107 or stored on the server 104.

The first edge device 102A can make an initial determination that the vehicle traveling in front of the first carrier vehicle 110A is indeed a non-exempt vehicle 112 by comparing the recognized license plate number 122 of the vehicle against at least one of the license plate whitelist 317 and the license plate blacklist 318. As previously mentioned, the first edge device 102A can also use the vehicle attributes 124 predicted by the object-detection neural network 314 as part of this initial determination.

The first edge device 102A can also determine whether the non-exempt vehicle 112 is within the boundaries 130 of the enforcement zone 114 based in part on the present location of the first edge device 102A obtained from the positioning unit 210 (see, e.g., FIG. 2A) of the first edge device 102A.

For example, the first edge device 102A can estimate a first location ($l_1$) of the non-exempt vehicle 112 by calculating a distance separating the non-exempt vehicle 112 from the first edge device 102A and adding such a separation distance to its own present location. As a more specific example, the first edge device 102A can calculate the distance separating the non-exempt vehicle 112 from the first edge device 102A using video frames containing the license plate 128 of the non-exempt vehicle 112 and certain computer vision algorithms designed for distance calculation.

In alternative embodiments, the first edge device 102A can simply use its own present location as the first location ($l_1$) if the non-exempt vehicle 112 is determined to be in close proximity to the first carrier vehicle 110A.

In certain embodiments, the first edge device 102A can also determine its own present location or the location of the non-exempt vehicle 112 using, in part, inertial measurement data obtained from an IMU 206 (see, e.g., FIG. 2A) and wheel odometry data 216 (see, FIG. 2A) obtained from a wheel odometer of the first carrier vehicle 110A.

The first edge device 102A can determine that the non-exempt vehicle 112 is within the boundaries 130 of the enforcement zone 114 by comparing the estimated first location ($l_1$) of the non-exempt vehicle 112 against the coordinates of the boundaries 130 of the enforcement zone 114. As previously discussed, coordinate data concerning the boundaries 130 of the enforcement zone 114 can be received from the server 104. Such coordinate data concerning the boundaries 130 of the enforcement zone 114 can be stored locally on the first edge device 102A and updated periodically based on new coordinate data received from the server 104.

The first edge device 102A can also record or generate at least a first timestamp marking the time ($t_1$) when the non-exempt vehicle 112 was detected at the first location ($l_1$). The first edge device 102A can mark the time using several timestamps including a global positioning system (GPS) timestamp and a Network Time Protocol (NTP) timestamp. The first edge device 102A can record timestamps from multiple sources in case one of the timestamps 120 is inaccurate.

The first edge device 102A can then use the one or more timestamps, including at least the first timestamp, to determine if the time ($t_1$) reflected by the timestamp(s) is within the enforcement period 706 of the traffic congestion pricing policy. If the first edge device 102A determines that the first location ($l_1$) is within the boundaries 130 of the enforcement zone 114 and that the time ($t_1$) is within the enforcement period 706, the first edge device 102A can transmit a first evidence package to the server 104.

The first evidence package can comprise coordinate data concerning the first location ($l_1$), the various timestamps including at least the first timestamp marking the time ($t_1$) that the non-exempt vehicle 112 was detected at the first location ($l_1$), the license plate number 122 of the non-exempt vehicle 112, the detected vehicle attributes 124, and at least a portion of the video(s) captured by the first edge device 102A showing the non-exempt vehicle 112 at the first location ($l_1$).

Another carrier vehicle (e.g., a second carrier vehicle 110B) can encounter the same non-exempt vehicle 112 at a later time at a different location within the enforcement zone 114. For example, as shown in FIG. 1E, the second carrier vehicle 110B can encounter the non-exempt vehicle 112 at another location along the same roadway.

In some embodiments, the second carrier vehicle 110B and the first carrier vehicle 110A can be part of the same fleet or part of the same government agency/department. For example, the second carrier vehicle 110B and the first carrier vehicle 110A can both be city buses. In other embodiments, the second carrier vehicle 110B can belong to a different fleet or government agency/department as the first carrier vehicle 110A. For example, the first carrier vehicle 110A can be a city bus and the second carrier vehicle 110B can be a garbage truck.

The second carrier vehicle 110B having a second edge device 102B coupled to a windshield or dashboard of the second carrier vehicle 110B can encounter the non-exempt vehicle 112 as the second carrier vehicle 110B traverses its carrier route 132.

As shown in FIG. 1D, the first carrier vehicle 110A can be driving in a direct opposite the non-exempt vehicle 112 in a lane adjacent to the lane occupied by the non-exempt vehicle 112 when the second carrier vehicle 110B encounters the non-exempt vehicle 112. In other embodiments not shown in FIG. 1E, the second carrier vehicle 110A can be driving behind the non-exempt vehicle 112 in the same direction as the non-exempt vehicle 112. In further embodiments (also not shown in FIG. 1E), the second carrier vehicle 110A can be driving alongside the non-exempt vehicle 112 in a lane adjacent to or near (but not adjacent to) the lane occupied by the non-exempt vehicle 112 in the same direction as the non-exempt vehicle 112.

The second edge device 102B can be configured to continuously take or capture one or more videos 118 of its surrounding environment (i.e., an environment outside of the carrier vehicle 110) as the second carrier vehicle 110B traverses its carrier route 132.

In certain embodiments, the second edge device 102B can only begin capturing the one or more videos 118 when the second carrier vehicle 110A is within the boundaries 130 of the enforcement zone 114. In other embodiments, the second edge device 102B can only begin capturing the one or more videos 118 during an enforcement period 706.

The second edge device 102A can begin capturing one or more videos 118 of the non-exempt vehicle 112 as the non-exempt vehicle 112 enters the field of view of at least one video image sensor 208 of the second edge device 102B. The second edge device 102B can periodically or continuously pass video frames from the one or more videos 118 to a plurality of deep learning models including at least an object-detection neural network 314 and a license plate-recognition (LPR) neural network 315 running on the second edge device 102B. The object-detection neural network 314 running on the second edge device 102B can be the same as the object-detection neural network 314 running on the first edge device 102A. The LPR neural network 315 running on the second edge device 102B can be the same as the LPR neural network 315 running on the first edge device 102A.

The second edge device 102B can also apply certain computer vision tools or functions to the video frames to process or standardize the video frames before passing such video frames to the deep learning models.

By feeding video frames to the object-detection neural network 314, the second edge device 102B can obtain as outputs, predictions concerning the objects shown in the video frames. For example, the second edge device 102B can identify an object shown in the video frame as a car, a truck, a bus, a bicycle, etc. The second edge device 102B can also obtain as an output from the object-detection neural network 314 predictions concerning a set of vehicle attributes 124 such as a color, make and model, and vehicle type of the vehicle shown in the video frames. The vehicle attributes 124 can be used by the second edge device 102B to make an initial determination as to whether the vehicle shown in the video frames is subject to the traffic congestion pricing policy (i.e., whether the vehicle is exempt or non-exempt).

The second edge device 102B can also pass the video frames to an LPR neural network 315 running on the second edge device 102B. In the example scenario shown in FIG. 1E, at least one video frame of the video(s) captured by the second edge device 102B can show the license plate 128 of the non-exempt vehicle 112 from an incoming angle (i.e., show the front license plate of the vehicle as the vehicle approaches the second carrier vehicle 110B). By feeding video frames into the LPR neural network 315, the second edge device 102B can obtain as an output from the LPR neural network 315, a prediction concerning the license plate number 122 of the non-exempt vehicle 112.

The second edge device 102B can then compare the recognized license plate number 122 against at least one of a license plate whitelist 317 and a license plate blacklist 318 stored on the second edge device 102B. As will be discussed in more detail in later sections, the license plate whitelist 317 can be a digital repository of license plate numbers of vehicles that are allowed to travel or otherwise be in motion within the enforcement zone 114. For example, such vehicles can be those that are not subject to the traffic congestion pricing policy such as public transportation vehicles, municipal vehicles, or vehicles of residents who live within the enforcement zone 114.

The license plate blacklist 318 can be a digital repository of license plate numbers of vehicles that have previously been identified by the second edge device 102B as being subject to the traffic congestion pricing policy or that are non-exempt. For example, the license plate blacklist 318 can be populated by license plate numbers of vehicles that have previously been captured in videos 118 taken by the second edge device 102B where the second edge device 102B determined that such vehicles are not exempt from the traffic congestion pricing policy. The second edge device 102B can add the license plate number 122 of the non-exempt vehicle 112 to the license plate blacklist 318 when the license plate number 122 does not match any of the license plate numbers in the license plate whitelist 317.

In other embodiments, the second edge device 102B can query the database 107 and/or the server 104 to determine if the license plate number 122 recognized by the LPR neural network 315 is included in a license plate whitelist 317 or a license plate blacklist 318 stored in the database 107 or stored on the server 104.

The second edge device 102B can make an initial determination that the vehicle traveling toward the second carrier vehicle 110B is indeed a non-exempt vehicle 112 by comparing the recognized license plate number 122 of the vehicle against at least one of the license plate whitelist 317 and the license plate blacklist 318. As previously mentioned, the second edge device 102B can also use the vehicle attributes 124 predicted by the object-detection neural network 314 as part of this initial determination.

The second edge device 102B can also determine whether the non-exempt vehicle 112 is within the boundaries 130 of the enforcement zone 114 based in part on the present location of the second edge device 102B obtained from the positioning unit 210 (see, e.g., FIG. 2A) of the second edge device 102B.

For example, the second edge device 102B can estimate a second location ($l_2$) of the non-exempt vehicle 112 by calculating a distance separating the non-exempt vehicle 112 from the second edge device 102B and adding such a separation distance to its own present location. As a more specific example, the second edge device 102B can calculate the distance separating the non-exempt vehicle 112 from the second edge device 102B using video frames containing the license plate 128 of the non-exempt vehicle 112 and certain computer vision algorithms designed for distance calculation.

In alternative embodiments, the second edge device 102B can simply use its own present location as the second location ($l_2$) if the non-exempt vehicle 112 is determined to be in close proximity to the second carrier vehicle 110B.

In certain embodiments, the second edge device 102B can also determine its own present location or the location of the non-exempt vehicle 112 using, in part, inertial measurement data obtained from an IMU 206 (see, e.g., FIG. 2A) and wheel odometry data 216 (see, FIG. 2A) obtained from a wheel odometer of the first carrier vehicle 110B.

The second edge device 102B can determine that the non-exempt vehicle 112 is within the boundaries 130 of the enforcement zone 114 by comparing the estimated second location ($l_2$) of the non-exempt vehicle 112 against the coordinates of the boundaries 130 of the enforcement zone 114. As previously discussed, coordinate data concerning the boundaries 130 of the enforcement zone 114 can be received from the server 104. Such coordinate data concerning the boundaries 130 of the enforcement zone 114 can be stored locally on the second edge device 102B and updated periodically based on new coordinate data received from the server 104.

The second edge device 102B can also record or generate at least a second timestamp marking the time ($t_2$) when the non-exempt vehicle 112 was detected at the second location ($l_2$). The second edge device 102B can mark the time using several timestamps including a global positioning system (GPS) timestamp and a Network Time Protocol (NTP) timestamp. The second edge device 102B can record timestamps from multiple sources in case one of the timestamps 120 is inaccurate.

The second edge device 102B can then use the one or more timestamps, including at least the second timestamp, to determine if the time ($t_2$) reflected by the timestamp(s) is within the enforcement period 706 of the traffic congestion pricing policy. If the second edge device 102B determines that the second location ($l_2$) is within the boundaries 130 of the enforcement zone 114 and that the time ($t_2$) is within the enforcement period 706, the second edge device 102B can transmit a second evidence package to the server 104.

The second evidence package can comprise coordinate data concerning the second location ($l_2$), the various timestamps including at least the second timestamp marking the time ($t_2$) that the non-exempt vehicle 112 was detected at the second location ($l_2$), the license plate number 122 of the non-exempt vehicle 112, the detected vehicle attributes 124, and at least a portion of the video(s) captured by the second edge device 102B showing the non-exempt vehicle 112 at the second location ($l_2$).

The server 104 can receive the first evidence package from the first edge device 102A and the second evidence package from the second edge device 102B. The server 104 can determine that the non-exempt vehicle 112 was in motion within the enforcement zone 114 during the enforcement period 706 based on evidence contained within the first evidence package and the second evidence package.

The server 104 can determine that the non-exempt vehicle 112 was in motion by comparing at least the first location ($l_1$) with the second location ($l_2$) and comparing the first timestamp with the second timestamp. Moreover, the server 104 can also compare the license plate numbers 122 and vehicle attributes 124 contained within the two evidence packages. The server 104 can also double-check to ensure that the vehicle detected within the enforcement zone 114 was indeed a non-exempt vehicle 112 by comparing the license plate number 122 of the vehicle against a license plate whitelist 317 and license plate blacklist 318 stored on the server 104 or stored in the database 107.

Although the above-mentioned example describes the server 104 as receiving two evidence packages 116, in reality, the server 104 would receive numerous evidence packages 116 from a plurality of edge devices 102 since the edge devices 102 are continuously taking videos 118 of their surrounding environments and tracking the whereabouts of vehicles captured in such videos 118. The server 104 can first group the evidence packages 116 into a location cluster 1203 (see FIG. 12) based on a geographic proximity of the locations 126 contained within the evidence packages 116. The server 104 can then compare the evidence from evidence packages 116 that belong to the same location cluster 1203.

In certain embodiments, the server 104 can select one representative evidence package 1205 from each location cluster 1203 to use as part of a final evidence package 1207 (see, e.g., FIG. 12) to be transmitted to a third-party reviewer or a government agency.

Figure 2A:
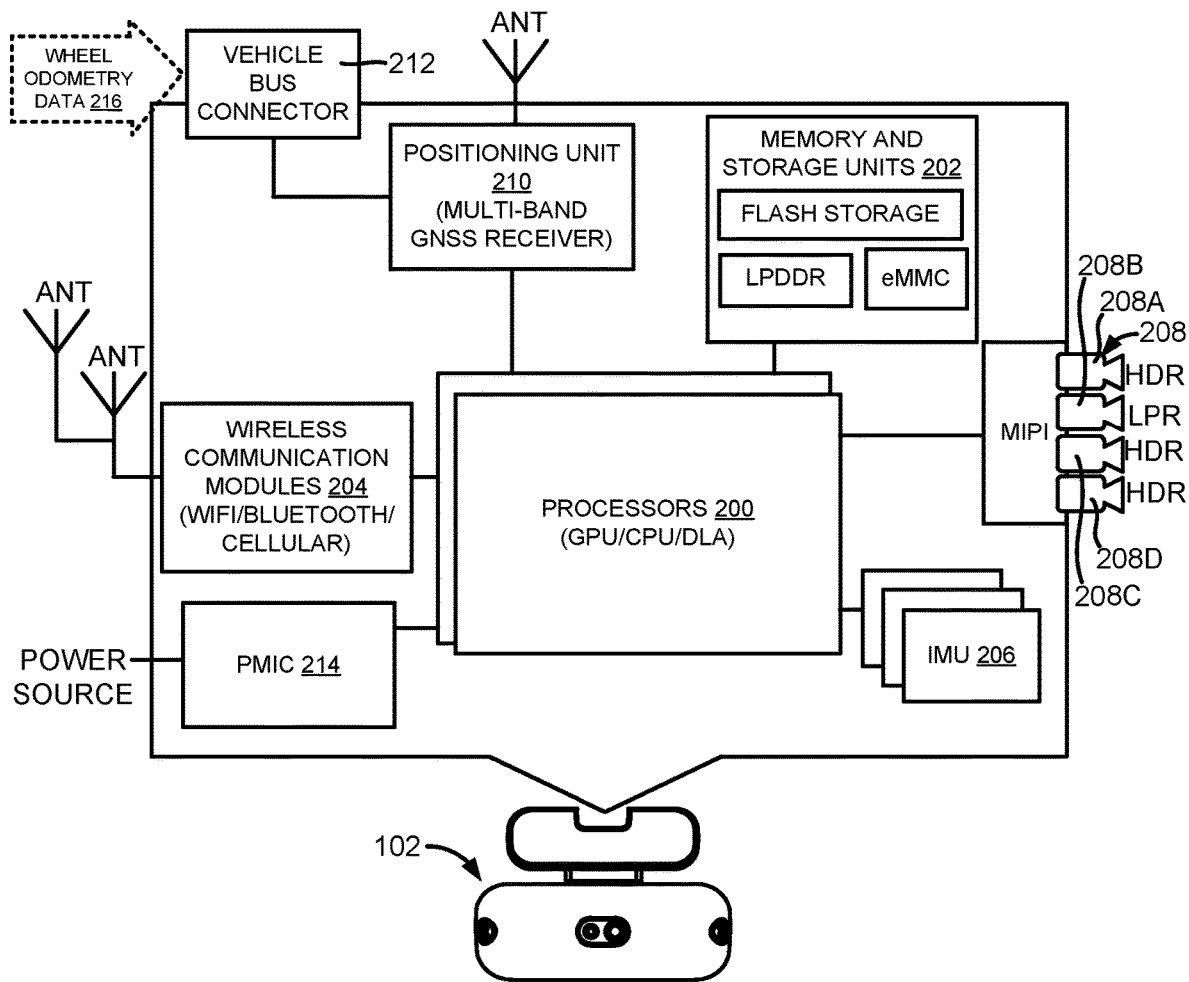
FIG. 2A illustrates one embodiment of an edge device of the system.

FIG. 2A illustrates one embodiment of an edge device 102 of the system 100. The edge device 102 can be any of the edge devices disclosed herein. For purposes of this disclosure, any references to the edge device 102 can also be interpreted as a reference to a specific component, processor, module, chip, or circuitry within the edge device 102.

As shown in FIG. 2A, the edge device 102 can comprise a plurality of processors 200, memory and storage units 202, wireless communication modules 204, inertial measurement units (IMUs) 206, and video image sensors 208. The edge device 102 can also comprise a positioning unit 210, a vehicle bus connector 212, and a power management integrated circuit (PMIC) 214. The components of the edge device 102 can be connected to one another via high-speed buses or interfaces.

The processors 200 can include one or more central processing units (CPUs), graphical processing units (GPUs), Application-Specific Integrated Circuits (ASICs), field-programmable gate arrays (FPGAs), or a combination thereof. The processors 200 can execute software stored in the memory and storage units 202 to execute the methods or instructions described herein.

For example, the processors 200 can refer to one or more GPUs and CPUs of a processor module configured to perform operations or undertake calculations at a terascale. As a more specific example, the processors 200 of the edge device 102 can be configured to perform operations at 21 tera operations (TOPS). The processors 200 of the edge device 102 can be configured to run multiple deep learning models or neural networks in parallel and process data from multiple sensors such as the plurality of high-resolution video image sensors 208. More specifically, the processor module can be a Jetson Xavier NX™ module developed by NVIDIA Corporation. The processors 200 can comprise at least one GPU having a plurality of processing cores (e.g., between 300 and 400 processing cores) and tensor cores, at least one CPU (e.g., at least one 64-bit CPU having multiple processing cores), and a deep learning accelerator (DLA) or other specially-designed circuitry optimized for deep learning algorithms (e.g., an NVDLA™ engine developed by NVIDIA Corporation).

In some embodiments, at least part of the GPU's processing power can be utilized for object detection and license plate recognition. In these embodiments, at least part of the DLA's processing power can be utilized for object detection and/or lane line detection. Moreover, at least part of the CPU's processing power can be used for simultaneous localization and mapping. The CPU's processing power can also be used to run other functions and maintain the operation of the edge device 102.

The memory and storage units 202 can comprise volatile memory and non-volatile memory or storage. For example, the memory and storage units 202 can comprise flash memory or storage such as one or more solid-state drives, dynamic random access memory (DRAM) or synchronous dynamic random access memory (SDRAM) such as low-power double data rate (LPDDR) SDRAM, and embedded multi-media controller (eMMC) storage. For example, the memory and storage units 202 can comprise a 512 gigabyte (GB) SSD, an 8 GB 128-bit LPDDR4× memory, and 16 GB eMMC 5.1 storage device. Although FIG. 2A illustrates the memory and storage units 202 as separate from the processors 200, it should be understood by one of ordinary skill in the art that the memory and storage units 202 can be part of a processor module comprising at least some of the processors 200. The memory and storage units 202 can store software, firmware, data (including video and image data), tables, logs, databases, or a combination thereof.

The wireless communication modules 204 can comprise at least one of a cellular communication module, a WiFi communication module, a Bluetooth® communication module, or a combination thereof. For example, the cellular communication module can support communications over a 5G network or a 4G network (e.g., a 4G long-term evolution (LTE) network) with automatic fallback to 3G networks. The cellular communication module can comprise a number of embedded SIM cards or embedded universal integrated circuit cards (eUICCs) allowing the device operator to change cellular service providers over-the-air without needing to physically change the embedded SIM cards. As a more specific example, the cellular communication module can be a 4G LTE Cat-12 cellular module.

The WiFi communication module can allow the edge device 102 to communicate over a WiFi network such as a WiFi network provided by the carrier vehicle 110, a municipality, a business, or a combination thereof. The WiFi communication module can allow the edge device 102 to communicate over one or more WiFi (IEEE 802.11) commination protocols such as the 802.11n, 802.11ac, or 802.11ax protocol.

The Bluetooth® module can allow the edge device 102 to communicate with other edge devices or client devices over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules 204 can comprise a combined WiFi and Bluetooth® module.

Each of the IMUs 206 can comprise a 3-axis accelerometer and a 3-axis gyroscope. For example, the 3-axis accelerometer can be a 3-axis microelectromechanical system (MEMS) accelerometer and a 3-axis MEMS gyroscope. As a more specific example, the IMUs 206 can be a low-power 6-axis IMU provided by Bosch Sensortec GmbH.

The edge device 102 can comprise one or more video image sensors 208. In one example embodiment, the edge device 102 can comprise a plurality of video image sensors 208. As a more specific example, the edge device 102 can comprise four video image sensors 208 (e.g., a first video image sensor 208A, a second video image sensor 208B, a third video image sensor 208C, and a fourth video image sensor 208D). At least one of the video image sensors 208 can be configured to capture video at a frame rate of between 1 frame per second and 120 frames per second (FPS) (e.g., about 30 FPS). In other embodiments, at least one of the video image sensors 208 can be configured to capture video at a frame rate of between 20 FPS and 80 FPS.

At least one of the video image sensors 208 (e.g., the second video image sensor 208B) can be a license plate recognition (LPR) camera having a fixed-focal or varifocal telephoto lens. In some embodiments, the LPR camera can comprise one or more infrared (IR) filters and a plurality of IR light-emitting diodes (LEDs) that allow the LPR camera to operate at night or in low-light conditions. The LPR camera can capture video images at a minimum resolution of 1920×1080 (or 2 megapixels (MP)). The LPR camera can also capture video at a frame rate of between 1 frame per second and 120 FPS. In other embodiments, the LPR camera can also capture video at a frame rate of between 20 FPS and 80 FPS.

The other video image sensors 208 (e.g., the first video image sensor 208A, the third video image sensor 208C, and the fourth video image sensor 208D) can be ultra-low-light high-dynamic range (HDR) image sensors. The HDR image sensors can capture video images at a minimum resolution of 1920×1080 (or 2MP). The HDR image sensors can also capture video at a frame rate of between 1 frame per second and 120 FPS. In certain embodiments, the HDR image sensors can also capture video at a frame rate of between 20 FPS and 80 FPS. In some embodiments, the video image sensors 208 can be or comprise ultra-low-light CMOS image sensors provided by Sony Semiconductor Solutions Corporation.

The video image sensors 208 can be connected to the processors 200 via a high-speed camera interface such as a Mobile Industry Processor Interface (MIPI) camera serial interface.

In alternative embodiments, the video image sensors 208 can refer to built-in video image sensors of the carrier vehicle 110. For example, the video images sensors 208 can refer to one or more built-in cameras included as part of the carrier vehicle's Advanced Driver Assistance Systems (ADAS).

The edge device 102 can also comprise a high-precision automotive-grade positioning unit 210. The positioning unit 210 can comprise a multi-band global navigation satellite system (GNSS) receiver configured to concurrently receive signals from a GPS satellite navigation system, a GLONASS satellite navigation system, a Galileo navigation system, and a BeiDou satellite navigation system. For example, the positioning unit 210 can comprise a multi-band GNSS receiver configured to concurrently receive signals from at least two satellite navigation systems including the GPS satellite navigation system, the GLONASS satellite navigation system, the Galileo navigation system, and the BeiDou satellite navigation system. In other embodiments, the positioning unit 210 be configured to receive signals from all four of the aforementioned satellite navigation systems or three out of the four satellite navigation systems. For example, the positioning unit 210 can be a ZED-F9K dead reckoning module provided by u-blox holding AG.

The positioning unit 210 can provide positioning data that can allow the edge device 102 to determine its own location at a centimeter-level accuracy. The positioning unit 210 can also provide positioning data that can be used by the edge device 102 to determine the location of the non-exempt vehicle 112. For example, the edge device 102 can use positioning data concerning its own location to substitute for the location of the non-exempt vehicle 112. The edge device 102 can also use positioning data concerning its own location to estimate or approximate the location of the non-exempt vehicle 112.

In other embodiments, the edge device 102 can determine the location of the non-exempt vehicle 112 by recognizing an object or landmark (e.g., a bus stop sign) near the non-exempt vehicle 112 with a known geolocation associated with the object or landmark. In these embodiments, the edge device 102 can use the location of the object or landmark as the location of the non-exempt vehicle 112. In further embodiments, the location of the non-exempt vehicle 112 can be determined by factoring in a distance calculated between the edge device 102 and the vehicle 112 based on a size of the license plate shown in one or more video frames of the video captured by the edge device 102 and a lens parameter of one of the video images sensors 208 (e.g., a zoom factor of the lens).

FIG. 2A also illustrates that the edge device 102 can comprise a vehicle bus connector 212. For example, the vehicle bus connector 212 can allow the edge device 102 to obtain wheel odometry data 216 from a wheel odometer of the carrier vehicle 110 carrying the edge device 102. For example, the vehicle bus connector 212 can be a J1939 connector. The edge device 102 can take into account the wheel odometry data 216 to determine the location of the vehicle 112 (see, e.g., FIG. 1B).

FIG. 2A illustrates that the edge device can comprise a PMIC 214. The PMIC 214 can be used to manage power from a power source. In some embodiments, the edge device 102 can be powered by a portable power source such as a battery. In other embodiments, the edge device 102 can be powered via a physical connection (e.g., a power cord) to a power outlet or direct-current (DC) auxiliary power outlet (e.g., 12V/24V) of the carrier vehicle 110.

Figure 2B:
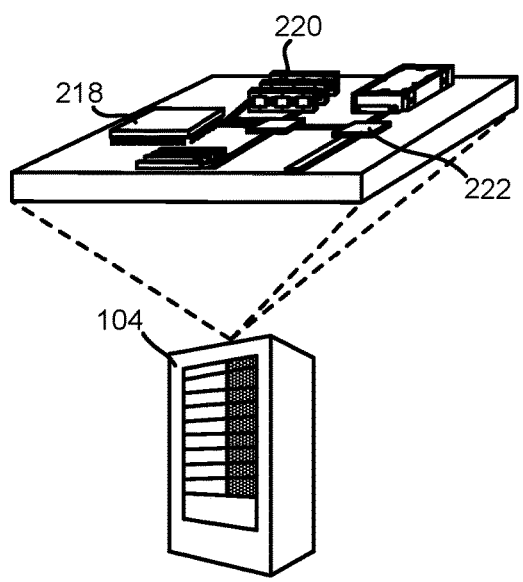
FIG. 2B illustrates one embodiment of a server of the system.

FIG. 2B illustrates one embodiment of the server 104 of the system 100. As previously discussed, the server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more physical servers or dedicated computing resources or nodes such as a rack-mounted server, a blade server, a mainframe, a dedicated desktop or laptop computer, one or more processors or processors cores therein, or a combination thereof.

For purposes of the present disclosure, any references to the server 104 can also be interpreted as a reference to a specific component, processor, module, chip, or circuitry within the server 104.

For example, the server 104 can comprise one or more server processors 218, server memory and storage units 220, and a server communication interface 222. The server processors 218 can be coupled to the server memory and storage units 220 and the server communication interface 222 through high-speed buses or interfaces.

The one or more server processors 218 can comprise one or more CPUs, GPUs, ASICs, FPGAs, or a combination thereof. The one or more server processors 218 can execute software stored in the server memory and storage units 220 to execute the methods or instructions described herein. The one or more server processors 218 can be embedded processors, processor cores, microprocessors, logic circuits, hardware FSMs, DSPs, or a combination thereof. As a more specific example, at least one of the server processors 218 can be a 64-bit processor.

The server memory and storage units 220 can store software, data (including video or image data), tables, logs, databases, or a combination thereof. The server memory and storage units 220 can comprise an internal memory and/or an external memory, such as a memory residing on a storage node or a storage server. The server memory and storage units 220 can be a volatile memory or a non-volatile memory. For example, the server memory and storage units 220 can comprise nonvolatile storage such as NVRAM, Flash memory, solid-state drives, hard disk drives, and volatile storage such as SRAM, DRAM, or SDRAM.

The server communication interface 222 can refer to one or more wired and/or wireless communication interfaces or modules. For example, the server communication interface 222 can be a network interface card. The server communication interface 222 can comprise or refer to at least one of a WiFi communication module, a cellular communication module (e.g., a 4G or 5G cellular communication module), and a Bluetooth®/BLE or other-type of short-range communication module. The server 104 can connect to or communicatively couple with each of the edge devices 102 via the server communication interface 222. The server 104 can transmit or receive packets of data using the server communication interface 222.

Figure 3:
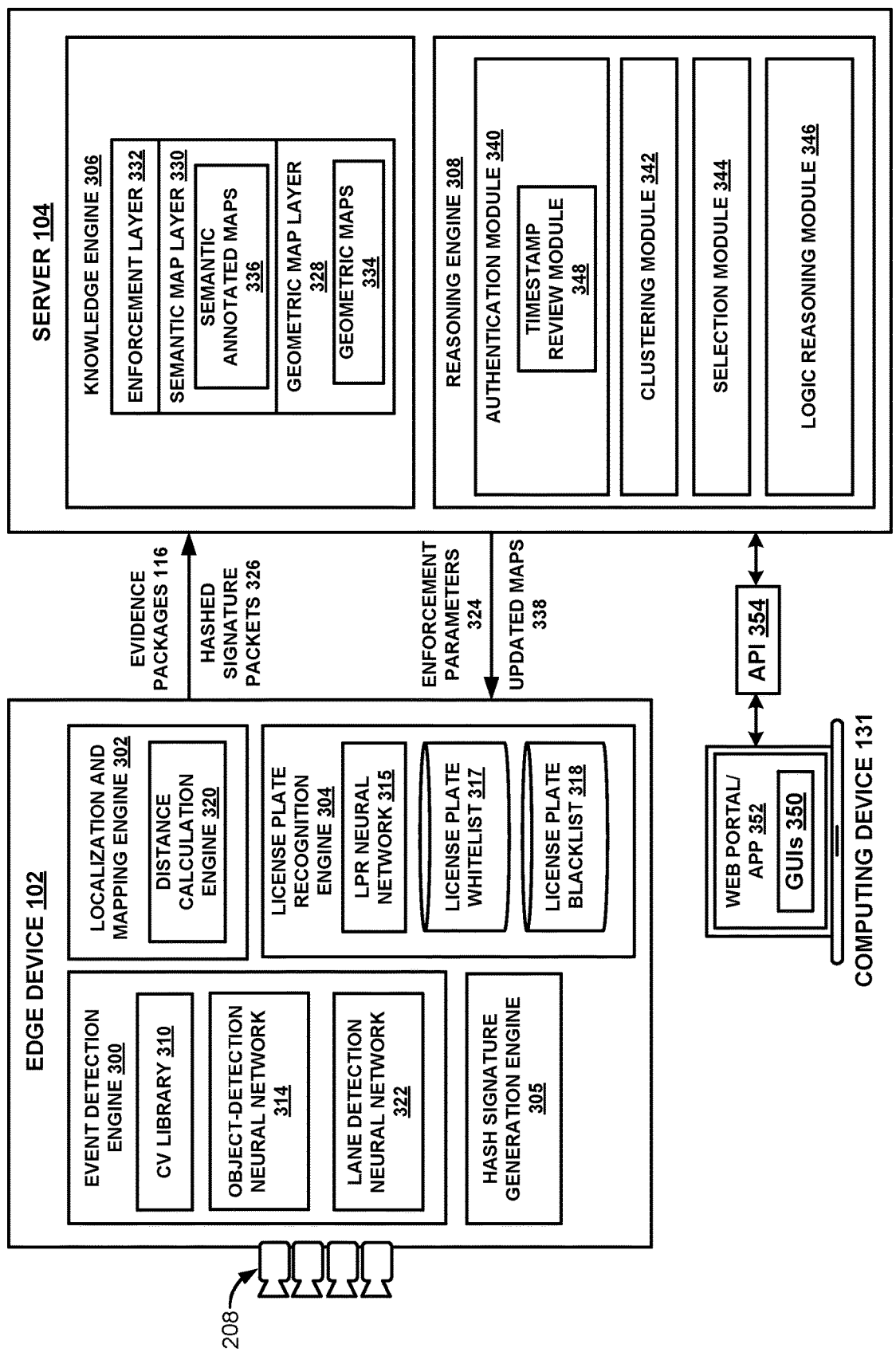
FIG. 3 illustrates various modules and engines of the edge device and server.

FIG. 3 illustrates certain modules and engines of the edge device 102 and the server 104. In some embodiments, the edge device 102 can comprise at least an event detection engine 300, a localization and mapping engine 302, a license plate recognition engine 304, and a hash signature generation engine 305. In these and other embodiments, the server 104 can comprise at least a knowledge engine 306 and a reasoning engine 308.

Software instructions run on the edge device 102, including any of the engines and modules disclosed herein, can be written in the Java® programming language, C++ programming language, the Python® programming language, the Golang™ programming language, or a combination thereof. Software instructions run on the server 104, including any of the engines and modules disclosed herein, can be written in the Ruby® programming language (e.g., using the Ruby on Rails® web application framework), Python® programming language, or a combination thereof.

As previously discussed, the edge device 102 (including the first edge device 102A, the second edge device 102B, or any other edge devices 102 coupled to a carrier vehicle 110) can continuously capture videos 118 (see, e.g., FIG. 1A) of an external environment surrounding the edge device 102. For example, the video image sensors 208 of the edge device 102 can capture everything that is within a combined field of view 512 (see, e.g., FIG. 5C) of the video image sensors 208. The video image sensors 208 of the edge device 102 can capture videos 118 of the external environment surrounding the edge device 102 while the edge device 102 is coupled to a carrier vehicle 110 and the carrier vehicle 110 is in motion (for example, while the carrier vehicle 110 is traversing its daily carrier route 132). For example, the video image sensors 208 of the edge device 102 can capture videos 118 of vehicles driving near the carrier vehicle 110 including any non-exempt vehicles 112 driving near the carrier vehicle 110.

The event detection engine 300 can then retrieve or grab video frames from a shared camera memory. The shared camera memory can be an onboard memory (e.g., non-volatile memory) of the edge device 102 for storing videos captured by the video image sensors 208. Since the video image sensors 208 are capturing approximately 30 video frames per second, the video frames are stored in the shared camera memory prior to being analyzed by the event detection engine 300. In some embodiments, the video frames can be grabbed using a video frame grab function such as the GStreamer tool.

The event detection engine 300 can then call a plurality of functions from a computer vision library 310 to read or otherwise obtain frames from the videos 118 captured by the edge devices 102 and enhance the video frames by resizing, cropping, or rotating such frames. For example, the event detection engine 300 can crop and resize the video frame to optimize the video frame for analysis by one or more deep learning models or convolutional neural networks running on the edge device 102. For example, the event detection engine 300 can crop and resize the video frame to match the pixel width and height of the training video frames used to train a neural network running on the edge device 102. Also, for example, the event detection engine 300 can crop and resize the video frame such that the aspect ratio of the video frame matches the aspect ratio of the training video frames.

In some embodiments, the computer vision library 310 can be the OpenCV® library maintained and operated by the Open Source Vision Foundation. In other embodiments, the computer vision library 310 can be or comprise functions from the TensorFlow® software library, the SimpleCV® library, or a combination thereof.

The event detection engine 300 can then pass or feed video frames captured by the video image sensors 208 of the edge device 102 to an object-detection neural network 314 running on the edge device 102. By passing and feeding video frames to the object-detection neural network 314, the event detection engine 300 of the edge device 102 can obtain as outputs from the object-detection neural network 314 predictions concerning the objects shown in the video frames. For example, the event detection engine 300 can obtain, as outputs, an object class and a confidence score for the object detected.

In some embodiments, the object-detection neural network 314 can be configured or trained such that only certain vehicle-related objects are supported by the object-detection neural network 314. For example, the object-detection neural network 314 can be configured or trained such that the object classes supported only include cars, trucks, buses, etc. Also, for example, the object-detection neural network 314 can be configured or trained such that the object classes supported also include bicycles, scooters, and other types of wheeled mobility vehicles. In some embodiments, the object-detection neural network 314 can be configured or trained such that the object classes supported also comprise non-vehicle classes such as pedestrians, landmarks, street signs, fire hydrants, bus stops, and building façades.

In some embodiments, the object-detection neural network 314 can be configured to detect up to 60 objects per video frame. Although the object-detection neural network 314 can be configured to accommodate numerous object classes, one advantage of limiting the number of object classes is to reduce the computational load on the processors of the edge device 102, shorten the training time of the neural network, and make the neural network more efficient.

The object-detection neural network 314 can comprise a plurality of convolutional layers and fully connected layers trained for object detection (and, in particular, vehicle detection). In one embodiment, the object-detection neural network 314 can be an open source neural network or convolutional neural network trained for object detection. For example, the object-detection neural network 314 can be a modified instance of the DetectNet deep neural network.

In other embodiments, the object-detection neural network 314 can be the You Only Look Once Lite (YOLO Lite) object detection model.

In some embodiments, the object-detection neural network 314 can also identify or predict certain attributes of the detected objects. For example, the object-detection neural network 314 can identify or predict a set of attributes of an object identified as a vehicle such as the color of the vehicle, the make and model of the vehicle, and the vehicle type (e.g., whether the vehicle is a personal vehicle or a public service vehicle). The vehicle attributes 124 can be used by the event detection engine 300 to make an initial determination as to whether the vehicle shown in the video frames is subject to the traffic congestion pricing policy (that is, whether the vehicle is exempt or non-exempt).

The object-detection neural network 314 can be trained, at least in part, from video frames of videos captured by the edge device 102 or other edge devices 102 deployed in the same municipality or coupled to other carrier vehicles 110 in the same carrier fleet. The object-detection neural network 314 can be trained, at least in part, from video frames of videos captured by the edge device 102 or other edge devices at an earlier point in time. Moreover, the object-detection neural network 314 can be trained, at least in part, from video frames from one or more open-sourced training sets or datasets.

As shown in FIG. 3, the edge device 102 can also comprise a license plate recognition engine 304. The license plate recognition engine 304 can be configured to recognize license plate numbers of vehicles in the video frames. For example, the license plate recognition engine 304 can pass video frames or images captured by a dedicated LPR camera of the edge device 102 (e.g., the second video image sensor 208B of FIGS. 2A, 5A, and 5D) to a license plate recognition (LPR) neural network 315 running on the edge device 102.

The LPR neural network 315 can be specifically trained to recognize license plate numbers 122 from video frames or images. Alternatively, or additionally, the license plate recognition engine 304 can also pass video frames or images captured by one of the HDR image sensors (e.g., the first video image sensor 208A, the third video image sensor 208C, or the fourth video image sensor 208D) to the LPR neural network 315 to recognize license plate numbers 122 from such video frames or images.

The video frames or images can show the license plate number 122 of a vehicle (e.g., the non-exempt vehicle 112) from an overtaking angle (i.e., where the video frame or image shows the back license plate of the vehicle as the vehicle is driving away from a carrier vehicle 110) or an incoming angle (i.e., where the video frame or image shows the front license plate of the vehicle as the vehicle is driving toward the carrier vehicle 110).

In some embodiments, the LPR neural network 315 can be an open-source neural network trained for license plate recognition. In certain embodiments, the LPR neural network 315 can be a version of the OpenALPR™ license plate recognition model or a modified version of the OpenALPR™ license plate recognition model.

By feeding video frames or images into the LPR neural network 315, the edge device 102 can obtain as an output from the LPR neural network 315, a prediction concerning the license plate number of a vehicle such as the license plate number 122 of the non-exempt vehicle 112. The prediction can be in the form of an alphanumeric string representing the license plate number 122.

In some embodiments, the LPR neural network 315 can be run on the server 104 and the license plate recognition engine 304 can be configured to transmit video frames or images containing license plates 128 of vehicles to the server 104 and receiving predictions from the server 104 concerning the license plate numbers 122.

The edge device 102 can compare the recognized license plate number 122 against at least one of a license plate whitelist 317 and a license plate blacklist 318 stored on the edge device 102. The license plate whitelist 317 can be a digital repository of license plate numbers of vehicles that are not subject to the traffic congestion pricing policy. For example, the license plate whitelist 317 can be a digital repository of license plate numbers of vehicles that are allowed to travel or otherwise be in motion within the enforcement zone 114 without restrictions such as public transportation vehicles, municipal or governmental vehicles, or vehicles of residents who live within the enforcement zone 114.

The license plate blacklist 318 can be a digital repository of license plate numbers of vehicles that have previously been identified by the edge device 102 as being subject to the traffic congestion pricing policy or that are not exempt from the traffic congestion pricing policy. For example, the license plate blacklist 318 can be populated by license plate numbers of vehicles that have previously been captured in videos 118 taken by the edge device 102 where the edge device 102 determined that such vehicles are not exempt from the traffic congestion pricing policy. The edge device 102 can add the license plate number 122 of the non-exempt vehicle 112 to the license plate blacklist 318 when the license plate number 122 does not match any of the license plate numbers in the license plate whitelist 317.

In other embodiments, the license plate whitelist 317, the license plate blacklist 318, or a combination thereof can be stored on the server 104, the database 107, or a combination thereof. In these embodiments, the edge device 102 can query the database 107, the server 104, or a combination thereof to determine if the license plate number 122 recognized by the LPR neural network 315 is included in the license plate whitelist 317 or a license plate blacklist 318.

The event detection engine 300 can make an initial determination that a vehicle captured in one of the videos 118 (e.g., a vehicle driving in front of or next to a carrier vehicle 110) is indeed a non-exempt vehicle 112 by comparing the recognized license plate number 122 of the vehicle against at least one of the license plate whitelist 317 and the license plate blacklist 318. The event detection engine 300 can also use the vehicle attributes 124 predicted by the object-detection neural network 314 as part of this initial determination. For example, the event detection engine 300 can determine that a vehicle captured in the videos 118 is exempt based on a color of the vehicle or the make and model of the vehicle.

Once the event detection engine 300 has made an initial determination that the vehicle is a non-exempt vehicle 112 subject to the traffic congestion pricing policy, the localization and mapping engine 302 can determine whether the non-exempt vehicle 112 is within the boundaries 130 of the enforcement zone 114 based in part on the present location of the edge device 102 obtained from at least one of the positioning unit 210 (see, e.g., FIG. 2A) of the edge device 102, inertial measurement data obtained from the IMUs 206 of the edge device 102, and wheel odometry data 216 obtained from the wheel odometer of the carrier vehicle 110 carrying the edge device 102.

In some embodiments, the localization and mapping engine 302 can use its own present location to estimate a location 126 of the non-exempt vehicle 112. For example, the localization and mapping engine 302 can use its own present location to represent the location 126 of the non-exempt vehicle 112 if the non-exempt vehicle 112 is captured in one or more videos 118 of the edge device 102 and if the localization and mapping engine 302 determines that the present location of the edge device 102 (and the carrier vehicle 110 carrying the edge device 102) is far from the boundaries 130 of the enforcement zone 114 or of sufficient distance from the boundaries 130 of the enforcement zone 114 (e.g., at least 1000 meters, at least 500 meters, etc. from the boundaries 130 of the enforcement zone 114).

In other embodiments, a distance calculation engine 320 of the localization and mapping engine 320 can estimate a location 126 of the non-exempt vehicle 112 by calculating a distance separating the non-exempt vehicle 112 from the edge device 102 and adding such a separation distance to its own present location. As a more specific example, the distance calculation engine 320 can calculate the distance separating the non-exempt vehicle 112 from the edge device 102 using video frames containing the license plate 128 of the non-exempt vehicle 112 and certain computer vision algorithms (e.g., image depth analysis algorithms) designed for distance calculation. Calculating the distance separating the non-exempt vehicle 112 from the edge device 102 will be discussed in relation to FIG. 9.

In additional embodiments, the localization and mapping engine 302 can determine the location 126 of the non-exempt vehicle 112 by recognizing an object or landmark (e.g., a bus stop sign) near the non-exempt vehicle 112 with a known geolocation associated with the object or landmark.

The localization and mapping engine 302 can determine that the non-exempt vehicle 112 is within the boundaries 130 of the enforcement zone 114 by comparing the location 126 of the non-exempt vehicle 112 against the coordinates of the boundaries 130 of the enforcement zone 114. As previously discussed, data or information concerning the boundaries 130 of the enforcement zone 114 can be received from the server 104. For example, the knowledge engine 306 of the server 104 can receive data or information concerning the boundaries 130 of the enforcement zone 114 as a result of user inputs applied to an interactive map user interface (UI) 702 displayed on a computing device 131.

Such data or information (e.g., coordinate data) concerning the boundaries 130 of the enforcement zone 114 can be stored locally on the edge device 102 and updated periodically based on new data or information received from the server 104.

The edge device 102 can also record or generate at least a plurality of timestamps 120 marking the time when the non-exempt vehicle 112 was detected at the location 126. For example, the localization and mapping engine 320 of the edge device 102 can mark the time using a global positioning system (GPS) timestamp 1002 (see FIG. 10). Moreover, the edge device 102 can mark the time using a Network Time Protocol (NTP) timestamp (see also, FIG. 10). Furthermore, the edge device 102 can mark the time using a local timestamp 1006 based on a local clock running on the edge device 102. The edge device 102 can record the timestamps 120 from multiple sources to ensure that such timestamps 120 are synchronized with one another in order to maintain the accuracy of such timestamps 120.

Figure 7A:
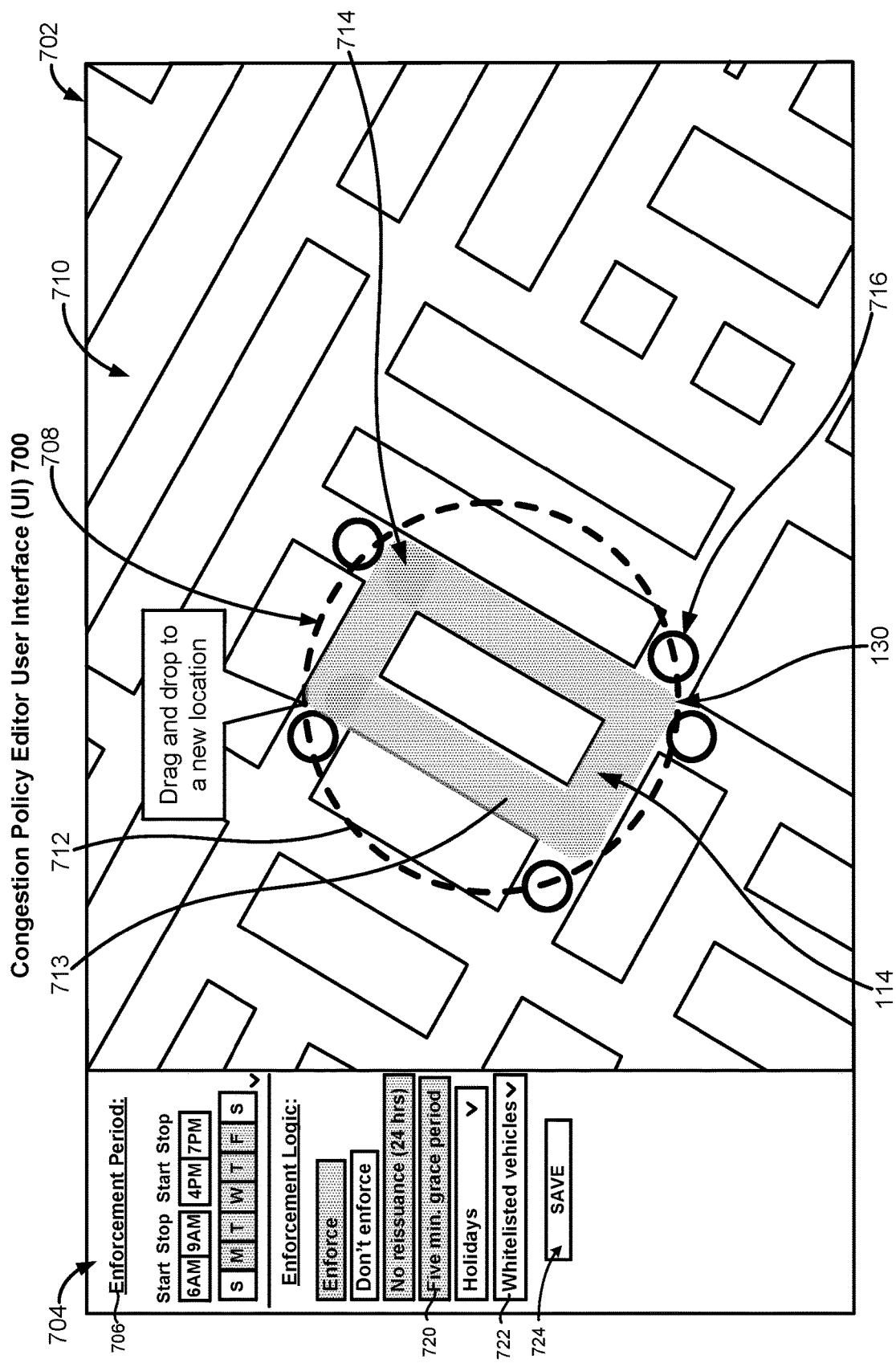
FIG. 7A illustrates one embodiment of a congestion policy editor user interface (UI) that can be used by a user to establish the enforcement zone and an enforcement period in connection with the traffic congestion pricing policy.

The edge device 102 can then use the one or more timestamps 120 to determine if the time reflected by the one or more timestamps 120 is within an enforcement period 706 of the traffic congestion pricing policy (see FIG. 7A). As will be discussed in more detail in relation to FIG. 7A, the enforcement period 706 can be set by a user via the interactive map UI 702. The edge device 102 can receive the enforcement period 706 along with coordinate data concerning the boundaries 130 of the enforcement zone 114 from the server 104. As shown in FIG. 3, the server 104 can transmit a set of enforcement parameters 324 comprising coordinate data concerning the boundaries 130 of the enforcement zone 114 and the enforcement period 706 to the edge device 102.

In some embodiments, the set of enforcement parameters 324 can be transmitted as a JavaScript Object Notation (JSON) file. In other embodiments, the set of enforcement parameters 324 can also be transmitted as an extensible markup language (XML) file or a comma-separated values (CSV) file.

In some embodiments, the event detection engine 300 can also pass or feed video frames to a lane detection neural network 322 running on the edge device 102. By passing and feeding video frames to the lane detection neural network 322, the event detection engine 300 can detect one or more roadway lanes shown in the video frames. For example, the lane detection neural network 322 can bound the lanes shown in the video frames in polygons 808 (see FIG. 8B). The lane detection neural network 322 can also output image coordinates associated with the polygons 808 bounding such lanes.

As will be discussed in more detail in relation to FIGS. 8A and 8B, the object-detection neural network 314 can bound a vehicle detected within a video frame with a vehicle bounding box 800. The object-detection neural network 314 can also output image coordinates associated with the vehicle bounding box 800. The image coordinates associated with the vehicle bounding box 800 can be compared with the image coordinates associated with the polygons 808 to determine an amount of overlap between the vehicle bounding box 800 and at least one of the polygons 808. This can be used by the event detection engine 300 to determine if a certain vehicle detected within the video frames is actually driving in a particular lane shown in the video frames.

Lane detection is needed when the enforcement zone 114 set by a user includes one or more lanes of a roadway but not all lanes of the roadway. For example, FIG. 7C illustrates a scenario where the enforcement zone 114 includes one lane 718 of a roadway 713 but not all lanes of the roadway 713.

The event detection engine 300 can translate the image coordinates of the vehicle bounding box 800 and the image coordinates of the polygons 808 into a uniform coordinate domain or shared coordinate domain before comparing the image coordinates of the vehicle bounding box 800 to the image coordinates of the polygons 808.

In some embodiments, the lane detection neural network 322 can be an open-source neural network or convolutional neural network trained for lane detection. For example, the lane detection neural network 322 can be the Segnet deep neural network or a modified version of the Segnet deep neural network.

In certain embodiments, the lane detection neural network 322 can be trained using an open-source dataset designed specifically for lane detection. For example, the dataset can be the CULane dataset. In other embodiments, the lane detection neural network 322 can also be trained using video frames obtained from deployed edge devices 102. Moreover, the lane detection neural network 322 can also be trained to detect lane markings. For example, the lane markings can comprise lane lines, text markings, markings indicating a crosswalk, markings indicating turn lanes, dividing line markings, or a combination thereof. In these embodiments, the lane detection neural network 322 can be trained using an open-source dataset designed specifically for detecting lane markings. As a more specific example, the dataset can be the Apolloscape dataset.

As will be discussed in more detail in relation to FIG. 8B, when the enforcement zone 114 comprises one lane 718 of a roadway 713 (but not all lanes of the roadway 713), the edge device 102 can detect the lane 718 by feeding or passing video frames capturing the roadway 713 into the lane detection neural network 322. The localization and mapping engine 302 of the edge device 102 can also use its own present location to determine where it is relative to the lane 718. If the video frames capture a non-exempt vehicle 112 driving in the lane 718, the event detection engine 300 can determine that the non-exempt vehicle 112 is within the boundaries 130 of the enforcement zone 114 (i.e., driving in the lane 718) based on the amount of overlap between the vehicle bounding box 800 bounding the non-exempt vehicle 112 and the polygon 808 bounding the lane 718.

If the edge device 102 determines that the location 126 of the non-exempt vehicle 112 is within the boundaries 130 of the enforcement zone 114 and that the time marked by the timestamps 120 is within the enforcement period 706, the edge device 102 can generate an evidence package 116 to be transmitted to the server 104. The evidence package 116 can comprise geospatial coordinate data (e.g., latitude and longitude in decimal degrees) concerning the location 126 of the non-exempt vehicle 112, the various timestamps 120, the license plate number 122 recognized by the LPR neural network 315, the vehicle attributes 124 detected by the object-detection neural network 314, at least a portion of the one or more videos 118 captured by the edge device 102, and a hashed signature packet 326.

In some embodiments, the hashed signature packet 326 can be generated by the hash signature generation engine 305. The hash signature generation engine 305 can be configured to generate a hashed signature packet 326 each time that an evidence package 116 is generated by the edge device 102. The hashed signature packet 326 can be included as part of the evidence package 116 for transmission to the server 104. The hash signature generation engine 305 can also be configured to generate hashed signature packets 326 at fixed intervals (e.g., every minute, every 5 minutes, every 10 minutes, etc.) for transmission to the server 104.

The hashed signature packet 326 included with the evidence package 116 can be used to authenticate the evidence package 116. As will be discussed in more detail in relation to FIG. 10, the hashed signature packet 326 included with the evidence package 116 along with the hashed signature packets 326 transmitted at fixed intervals to the server 104 can serve as elapsed time signatures that can be used by the server 104 to derive a more accurate timestamp if the timestamp(s) 120 included as part of the evidence package 116 is determined to be inaccurate.

Figure 10:
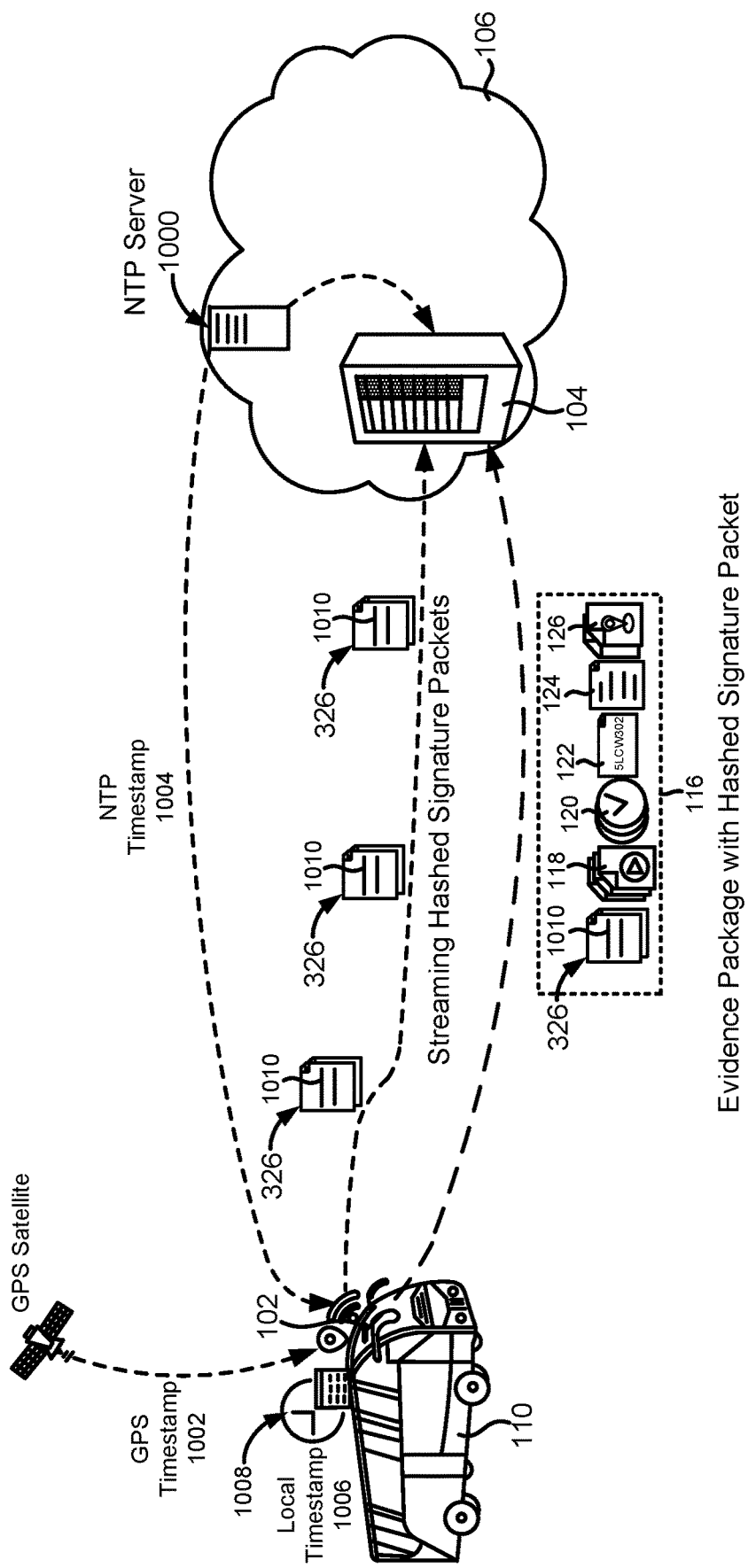
FIG. 10 illustrates that the edge device can mark the time when a non-exempt vehicle was detected using a plurality of timestamps.

The hashed signature packets 326 can be data packets that comprise a hashed signature 1010 unique to a status of at least one of the edge device 102 and the carrier vehicle 110 carrying the edge device 102 at the time that one of the data packets is sent to the server 104 (see FIG. 10). As will be discussed in more detail in relation to FIG. 10, the hashed signature packets 326 can be constructed by concatenating a timestamp marking a present date/time and data gathered from several electronic components running on the edge device 102, the carrier vehicle 110 carrying the edge device 102, or a combination thereof. For example, the data can be from a present odometer reading of the carrier vehicle 110, one or more present IMU readings from the IMU 206 of the edge device 102, one or more present parameters from a Controller Area Network (CAN) bus of the carrier vehicle 110, or a combination thereof.

In embodiments where the enforcement zone 114 comprises a lane 718 of a roadway 713 but not the entire roadway 713 (see FIG. 7C), the evidence package 116 can also comprise data concerning the amount of overlap between the vehicle bounding box 800 bounding the non-exempt vehicle 112 and the polygon 808 bounding the lane 718.

FIG. 3 also illustrates that the server 104 can comprise a knowledge engine 306 and a reasoning engine 308. The knowledge engine 306 and the reasoning engine 308 can refer to software modules running on the server 104 for administering and enforcing a traffic congestion pricing policy.

As will be discussed in more detail in relation to FIGS. 7A-7C, the knowledge engine 306 of the server 104 can receive data and information concerning at least the boundaries 130 of the enforcement zone 114 and an enforcement period 706 associated with the enforcement zone 114 as a result of user inputs applied to one or more graphical user interface (GUIs) 350 displayed on a computing device 131. The GUIs 350 can be provided as part of a web portal or software application 352 (e.g., a desktop application or a mobile application) running on the computing device 131. The GUIs 350 can include at least an interactive map UI 702 rendered as part of a congestion policy editor UI 700 (see FIG. 7A).

The computing device 131 can be used by a user (e.g., an administrator or employee of a municipal/governmental transportation department) to establish the enforcement zone 114 and the enforcement period 706. The computing device 131 can transmit certain data and files to and receive certain data and files from the server 104. The computing device 131 can also be used by a user of the system 100 to set additional parameters or guidelines concerning the traffic congestion pricing policy.

In some embodiments, the computing device 131 can also be used by the user (e.g., the administrator or employee of the municipal/governmental transportation department) to review a final evidence package 1207 (see FIG. 12) prepared by the server 104 from multiple evidence packages 116 received from the edge devices 102.

In other embodiments, the computing device 131 can be a portable or non-portable computing device. For example, the computing device 131 can be a desktop computer or a laptop computer. In other embodiments, the computing device 131 can be a tablet computer or smartphone.

In some embodiments, the computing device 131 can communicate with the server 104 via an application programming interface (API) 354. The API 354 can also allow the computing device 131 to view certain data, videos, or information on the edge devices 102, the server 104, or a combination thereof.

As shown in FIG. 3, the server 104 can transmit a set of enforcement parameters 324 concerning the enforcement zone 114 to all of the edge devices 102. The server 104 can transmit the enforcement parameters 324 in response to the user setting the boundaries 130 of the enforcement zone 114 and the enforcement period 706 (including any enforcement grace period 720) via the congestion policy editor UI 700 (see FIG. 7A).

For example, the enforcement parameters 324 can include geospatial coordinate data (e.g., latitude and longitude in decimal degrees) concerning the boundaries 130 of the enforcement zone 114 and date/time values concerning the enforcement period 706 (including any enforcement grace period 720).

In some embodiments, the enforcement parameters 324 can be saved as a JSON file. In other embodiments, the enforcement parameters 324 can be saved as an XML file or a CSV file.

The knowledge engine 306 can comprise a geometric map layer 328, a semantic map layer 330, and an enforcement layer 332. The semantic map layer 330 can be built on top of the geometric map layer 328. The enforcement layer 332 can be built on top of the semantic map layer 330.

The geometric map layer 328 can comprise a plurality of geometric maps 334. The geometric maps 334 can be georeferenced maps obtained from one or more mapping databases or mapping services. For example, the geometric maps 334 can be obtained from a web mapping server along with data from a geographic information system (GIS) database. For example, the geometric map layer 328 can comprise geometric maps 334 obtained from an open-source mapping database or server or a proprietary mapping service. For example, the geometric maps 334 can comprise one or more maps provided by Google Maps™, Esri™ ArcGIS maps, or a combination thereof. The geometric maps 334 can also be obtained from one or more government mapping databases or government GIS maps. The geometric maps 334 of the geometric map layer 328 can comprise a plurality of high-definition (HD) maps, traditional standard-definition maps, or a combination thereof.

The semantic map layer 330 can be built on top of the geometric map layer 328. The semantic map layer 330 can add semantic objects to the geometric maps 334 to create semantic annotated maps 336 stored as part of the semantic map layer 330. The semantic objects, in this context, can refer to 2D and 3D objects such as curbs, intersections, sidewalks, lane markings or boundaries, traffic signs, traffic lights, and other curbside municipal assets (e.g., fire hydrants, parking meters, etc.) with semantic labels associated therewith.

In some embodiments, the knowledge engine 306 can receive the semantic objects or labels from the edge devices 102. For example, the knowledge engine 306 can receive the semantic objects or labels from at least one of the event detection engine 300 and the localization mapping engine 302 of the edge devices 102. The event detection engine 300 can apply one or more semantic segmentation functions from the computer vision library 310 to automatically annotate video images captured by the edge device 102 at a pixel-level with semantic labels.

The semantic map layer 330 can also take into account sensor data obtained from the sensors of the edge devices 102 including video images, GPS coordinates, and IMU data. In this manner, the semantic annotated maps 336 of the semantic map layer 330 can be accurate to within a few centimeters rather than a few meters.

The semantic annotated maps 336 can be updated periodically or continuously as the knowledge engine 306 receives new mapping data, positioning data, and/or semantic labels from the various edge devices 102. The server 104 can also transmit or deploy revised or updated maps (including updated semantic annotated maps 336) to the edge devices 102. For example, the server 104 can transmit or deploy revised or updated maps 338 periodically or when an update has been made to the existing semantic annotated maps 336. The updated semantic annotated maps 336 can be used by the edge device 102 to more accurately localize itself (i.e., to determine its own present location) in order to determine the location 126 of a non-exempt vehicle 112. Ensuring that the edge devices 102 have access to updated semantic annotated maps 336 reduces the likelihood that the edge devices 102 inaccurately determine the location 126 of a non-exempt vehicle 112.

The enforcement layer 332 can be built on top of the semantic map layer 330. The enforcement layer 332 can comprise data or information concerning the enforcement zone 114 and the enforcement period 706 related to the traffic congestion pricing policy. For example, the enforcement layer 332 can comprise data or information concerning all roadways 713 and intersections 714 included as part of the enforcement zone 114, all lane(s) 718 included as part of the enforcement zone 114 (if not all lanes of a roadway 713 are part of the enforcement zone 114), all start and stop times associated with the enforcement period 706, and all enforcement grace periods 720 (see FIG. 7A). As will be discussed in more detail in relation to FIGS. 7A-7C, the enforcement layer 332 can be generated or updated via user inputs applied to the interactive map UI 702.

Although FIGS. 1A-1E and 7A-7C illustrate one enforcement zone 114, it is contemplated by this disclosure that the enforcement layer 332 can store data and information concerning multiple enforcement zones 114. For example, the enforcement layer 332 can store data and information concerning different enforcement zones 114 in different municipalities or different enforcement zones 114 within the same municipality. Moreover, each such enforcement zone 114 can have its own enforcement period 706 associated with the enforcement zone 114.

As shown in FIG. 3, the reasoning engine 308 of the server 104 can comprise an authentication module 340, a clustering module 342, a selection module 344, and a logic reasoning module 346. The reasoning engine 308 can determine that the non-exempt vehicle 112 was in motion within the enforcement zone 114 during the enforcement period 706 based on data and information contained within evidence packages 116 received from edge devices 102. Although FIG. 3 illustrates the server 104 receiving evidence packages 116 from one edge device 102, it is contemplated by this disclosure that the server 104 can receive evidence packages 116 from multiple edge devices 102. For example, each such edge device 102 can be coupled to a carrier vehicle 110 and multiple carrier vehicles 110 can be deployed within one or more enforcement zones 114 at any given time.

In some embodiments, the authentication module 340 of the reasoning engine 308 can authenticate the evidence packages 116 and hashed signature packets 326 received from the edge devices 102. The evidence packages 116 and the hashed signature packets 326 can be authenticated by the server 104 to ensure that the evidence packages 116 and the hashed signature packets 326 have not been tampered with.

As previously discussed, the hash signature generation engine 305 of the edge device 102 can be configured to generate and transmit hashed signature packets 326 to the server 104 at fixed intervals (e.g., every minute, every 5 minutes, every 10 minutes, etc.). The hash signature generation engine 305 can also generate a hashed signature packet 326 each time that an evidence package 116 is generated by the edge device 102. The hashed signature packet 326 can then be transmitted as part of or along with the evidence package 116 to the server 104.

Each of the hashed signature packets 326 can comprise a hashed signature 1010 (see FIG. 10). As will be discussed in more detail in relation to FIG. 10, the hashed signature 1010 can be generated by applying a hash algorithm to an alphanumeric string obtained by concatenating or linking together a timestamp marking a present date/time and data outputted by multiple electronic components running on the edge device 102, the carrier vehicle 110 carrying the edge device 102, or a combination thereof.

For example, the hashed signature 1010 can be generated on the edge device 102 by applying a hash algorithm to an alphanumeric or numeric string obtained by concatenating or linking together a timestamp marking a present date/time, a present odometer reading of the carrier vehicle 110, one or more present IMU readings from the IMU 206 of the edge device 102, one or more present parameters from a Controller Area Network (CAN) bus of the carrier vehicle 110, or a combination thereof.

In some embodiments, the hash algorithm can be the SHA-2 or SHA-256 cryptographic algorithm or function. In other embodiments, the hash algorithm can be the message-digest 5 (MD5) algorithm or function.

In addition to the hashed signature 1010, each of the hashed signature packets 326 can also comprise the timestamp recorded by the edge device 102 and the data outputted by the multiple electronic components (e.g., the odometer on the carrier vehicle 110, the IMU value(s) from the IMU 206, values(s) from the CAN bus, etc.). Upon receiving the hashed signature packet 326, the authentication module 340 can authenticate the hashed signature packet 326 by applying the same hash algorithm (the hash algorithm used by the edge devices 102) to the timestamp and the data outputted by the multiple electronic components (e.g., the odometer on the carrier vehicle 110, the IMU value(s) from the IMU 206, value(s) from the CAN bus, etc.) to yield a reconstructed hash signature. The authentication module 340 can then compare the reconstructed hash signature against the hashed signature 1010 received as part of the hashed signature packet 326 as part of the authentication process. If the reconstructed hash signature differs from the hashed signature 1010, the server 104 can discard the hashed signature packet 326 or the evidence package 116 containing the hashed signature packet 326 as being inauthentic.

The authentication module 340 can authenticate each hashed signature packet 326 received from the edge device 102 and each evidence package 116 containing a hashed signature packet 326 received from the edge device 102 in the aforementioned manner.

One technical problem faced by the applicants is how to ensure the authenticity of evidence packages 116 received from the edge devices 102 deployed in the field. One technical solution discovered and developed by the applicants is to include a hashed signature packet 326 with each of the evidence packages 116. The hashed signature packet 326 can include a hashed signature 1010 generated by applying a hash algorithm to an alphanumeric string obtained by concatenating or linking together a timestamp marking a present date/time and data outputted by multiple electronic components running on the edge device 102, the carrier vehicle 110, or a combination thereof. The hashed signature packet 326 can also include the timestamp recorded by the edge device 102 and the data outputted by the multiple electronic components (i.e., the inputs used to generate the hashed signature 1010 on the edge device 102). Upon receiving the hashed signature packet 326 of the evidence package 116, the authentication module 340 can authenticate the hashed signature packet 326 by applying the same hash algorithm (the hash algorithm used by the edge devices 102) to the timestamp and the data outputted by the multiple electronic components (e.g., the odometer on the carrier vehicle 110, the IMU value(s) from the IMU 206, value(s) from the CAN bus, etc.) to yield a reconstructed hash signature. The authentication module 340 can then compare the reconstructed hash signature against the hashed signature 1010 received as part of the hashed signature packet 326. If the reconstructed hash signature differs from the hashed signature 1010, the server 104 can discard the evidence package 116 containing the hashed signature packet 326 as being inauthentic.

The authentication module 340 can further comprise a timestamp review module 348. The timestamp review module 348 can be configured to assess the accuracy of timestamps 120 received as part of the evidence packages 116. Each of the evidence packages 116 can comprise one or more timestamps 120.

The one or more timestamps 120 can include a global positioning system (GPS) timestamp 1002 obtained by the edge device 102 from a GPS satellite, a network time protocol (NTP) timestamp 1004 obtained by the edge device 102 from an NTP server, and a local timestamp 1006 representing a time recorded using a local clock running on the edge device 102 (see FIG. 10). The timestamp review module 348 can review the one or more timestamps 120 received as part of the evidence package 116 for accuracy. One technical problem faced by the applicants is that the edge device 102 is occasionally unable to obtain a GPS timestamp 1002 or an NTP timestamp 1004 when the carrier vehicle 110 carrying the edge device 102 drives into an area where there is no network connection or the GPS signal becomes unavailable. In these circumstances, the edge device 102 can record a number of local timestamps 1006 based on the local clock running on the edge device 102. However, this local clock can deviate from the more accurate clocks kept by the NTP server and the GPS satellites thereby affecting the accuracy of the local timestamps 1006. One technical solution discovered and developed by the applicants is to have the server 104 calculate a corrected timestamp to replace an inaccurate local timestamp based on the hashed signature packets 326 received periodically from the edge device 102.

For example, as will be discussed in more detail in relation to FIGS. 10 and 11, in situations where the edge device 102 is unable to receive a GPS signal and is also not connected to the NTP server 1000, the edge device 102 can continue to transmit hashed signature packets 326 with local timestamps 1006 at fixed intervals. In this example, when the edge device 102 is once again able to receive the GPS signal or is once again connected to the NTP server 1000, the edge device 102 can compare a newly received NTP timestamp 1004 or GPS timestamp 1002 against a current local timestamp 1006. If the local timestamp 1006 differs from either the NTP timestamp 1004 or the GPS timestamp 1002, the edge device 102 can record a time difference 1104, which is a difference in time between the local timestamp 1006 and the more accurate GPS timestamp 1002 or NTP timestamp 1004, and transmit the time difference 1104 along with the local timestamp 1006, the GPS timestamp 1002, and the NTP timestamp 1004 to the server 104 as part of a hashed signature packet 326. Upon receiving the hashed signature packet 326 with the time difference 1104, the timestamp review module 348 can review the previous series of hashed signature packets 326 received from this particular edge device 102 and determine when the edge device 102 lost connection to the NTP server 1000 or the GPS satellites. The timestamp review module 348 can use a previously received GPS timestamp or a previously received NTP timestamp as a starting point to calculate a number of corrected timestamps 1100 to replace the inaccurate local timestamps 1006. For example, the timestamp review module 348 can calculate the corrected timestamps 1100 based on the time difference 1104 received from the edge device 102 and the number of recently received hashed signature packets 326 where only a local timestamp 1006 was included.

The corrected timestamps 1100 can be important if one or more evidence packages 116 were transmitted from the edge device 102 to the server 104 during the period that the edge device 102 lost connection with the NTP server 1000 and was unable to receive GPS signals. The corrected timestamps 1100 can ensure the temporal accuracy of the evidence packages 116 transmitted during this period as the timestamp review module 348 can replace any inaccurate local timestamps 1006 included in such evidence packages 116 with the more accurate corrected timestamps 1100.

As shown in FIG. 3, the reasoning engine 308 can also comprise a clustering module 342, a selection module 344, and a logic reasoning module 346. The clustering module 342 can be configured to group the evidence packages 116 received from the edge devices 102 into location clusters 1203 based on a geographic proximity of the locations 126 of the non-exempt vehicle 112 determined by the edge devices 102 relative to one another. The clustering module 342 can group the evidence packages 116 based on a proximity threshold such as 10 meters, 20 meters, 50 meters, etc. The clustering module 342 can group the evidence packages 116 using a spatial clustering algorithm or a location-based clustering algorithm (e.g., K-means clustering algorithm, DBSCAN clustering algorithm, etc.). For example, when the proximity threshold is 10 meters, the clustering module 342 can group one or more evidence packages 116 into a location cluster 1203 where the location(s) 126 of the non-exempt vehicle 112 from such evidence packages 116 are all within 10 meters of one another.

The proximity threshold can be adjusted based on the amount of evidence packages 116 received. For example, the proximity threshold can be increased (e.g., from 10 meters to 50 meters) when the amount of evidence packages 116 received by the server 104 from the edge devices 102 increases.

As will be discussed in more detail in relation to FIG. 12, the clustering module 342 can group the evidence packages 116 into location clusters 1203 at the end of an enforcement cycle 1201. For example, the enforcement cycle 1201 can be every 24 hours, every eight hours, every four hours, every hour, etc. By only reviewing evidence packages 116 at the end of an enforcement cycle 1201 (e.g., every 24 hours), the server 104 can ensure that the same non-exempt vehicle 112 is not deemed to be in violation of the traffic congestion pricing policy multiple times in one enforcement cycle 1201.

As previously discussed in relation to FIGS. 1B and 1C, the server 104 can receive at least a first evidence package and a second evidence package from one edge device 102 coupled to a carrier vehicle 110. The clustering module 342 can group the first evidence package along with other evidence packages 116 into a first location cluster based on the first location of the non-exempt vehicle 112 contained within the first evidence package and its proximity to other locations of the non-exempt vehicle 112 contained within the other evidence packages 116. In addition, the clustering module 342 can group the second evidence package along with several other evidence packages 116 into a second location cluster based on the second location of the non-exempt vehicle 112 contained within the second evidence package and its proximity to other locations of the non-exempt vehicle 112 contained within the several other evidence packages 116.

Moreover, as previously discussed in relation to FIGS. 1D and 1E, the server 104 can also receive at least a first evidence package from a first edge device 102A coupled to a first carrier vehicle 110A and a second evidence package from a second edge device 102B coupled to a second carrier vehicle 110B. The clustering module 342 can group the first evidence package along with other evidence packages 116 into a first location cluster based on the first location of the non-exempt vehicle 112 contained within the first evidence package and its proximity to other locations of the non-exempt vehicle 112 contained within the other evidence packages 116. In addition, the clustering module 342 can group the second evidence package along with several other evidence packages 116 into a second location cluster based on the second location of the non-exempt vehicle 112 contained within the second evidence package and its proximity to other locations of the non-exempt vehicle 112 contained within the several other evidence packages 116.

The selection module 344 can be configured to select one representative evidence package 1205 from each location cluster 1203 to be included as part of a final evidence package 1207. The final evidence package 1207 can be transmitted to one or more computing devices for further processing or review. For example, at least one of the computing devices can be a computing device of a government entity or transportation department responsible for administering the traffic congestion pricing policy. The government entity or transportation department can review the final evidence package 1207 and levy fines or fees on the non-exempt vehicles 112 for driving within the enforcement zone 114 during the enforcement period 706. As another example, at least one of the computing devices can be a computing device of a third-party entity responsible for administering the traffic congestion pricing policy on behalf of a government entity or transportation department.

The selection module 344 can select a representative evidence package 1205 from each location cluster 1203 based on the video frames included in the evidence packages 116 grouped in the location cluster 1203. The representative evidence package 1205 can be selected based in part on whether video frames included as part of the evidence packages 116 show the non-exempt vehicle 112 and the license plate 128 of the non-exempt vehicle 112 as being unobstructed by other objects in the video frames. For example, the selection module 344 can select one of the evidence packages 116 from the location cluster 1203 as the representative evidence package 1205 if at least one video frame from such an evidence package 116 shows the non-exempt vehicle 112 and the license plate 128 of the non-exempt vehicle 112 with the most clarity or the least amount of obstruction (by other objects in the video frames) relative to the video frames from the other evidence packages 116 in the location cluster 1203. The selection module 344 can also pass the representative evidence packages 1205 to the logic reasoning module 346 for further processing and analysis.

The logic reasoning module 346 can be configured to use logic (e.g., logic operators) to evaluate the evidence (i.e., the data and information) within the evidence packages 116 concerning the non-exempt vehicle 112. In some embodiments, the logic reasoning module 346 can begin the evaluation by determining whether the non-exempt vehicle 112 was detected at a minimum of two different locations within the enforcement zone 114 at two different times. For example, one way that the logic reasoning module 346 can do this is to ensure that there are at least two location clusters 1203 associated with the non-exempt vehicle 112 such that the non-exempt vehicle 112 was detected by one or more edge devices 102 at two different locations separated at least by the proximity threshold. The logic reasoning module 346 can also check the geospatial coordinates of the locations to ensure that they are within the boundaries 130 of the enforcement zone 114.

The logic reasoning module 346 can also compare the data and information from a first representative evidence package from the first location cluster against the data and information from a second representative evidence package from the second location cluster. For example, the logic reasoning module 346 can compare the timestamps 120 from the two representative evidence packages to ensure that they are in fact different. Moreover, the logic reasoning module 346 can compare the timestamps 120 to ensure that they are all within the enforcement period 706.

Also, the logic reasoning module 346 can compare the license plate numbers 122 from the two representative evidence packages to ensure that they match. Furthermore, the logic reasoning module 346 can double-check that the vehicle detected within the enforcement zone 114 was indeed a non-exempt vehicle 112 by comparing the license plate numbers 122 from the representative evidence packages against a license plate whitelist 317, a license plate blacklist 318, or a combination thereof.

Once the logic reasoning module 346 has filtered out any false positive detections and determined that the various representative evidence packages show the non-exempt vehicle 112 in motion within the enforcement zone 114 during the enforcement period 706, the logic reasoning module 346 can package the representative evidence packages into a final evidence package 1207 for transmission to one or more computing devices for further review or processing. For example, at least one of the computing devices can be a computing device of a government entity or transportation department responsible for administering the traffic congestion pricing policy. As another example, at least one of the computing devices can be a computing device of a third-party entity responsible for administering the traffic congestion pricing policy on behalf of a government entity or transportation department.

Figure 4:
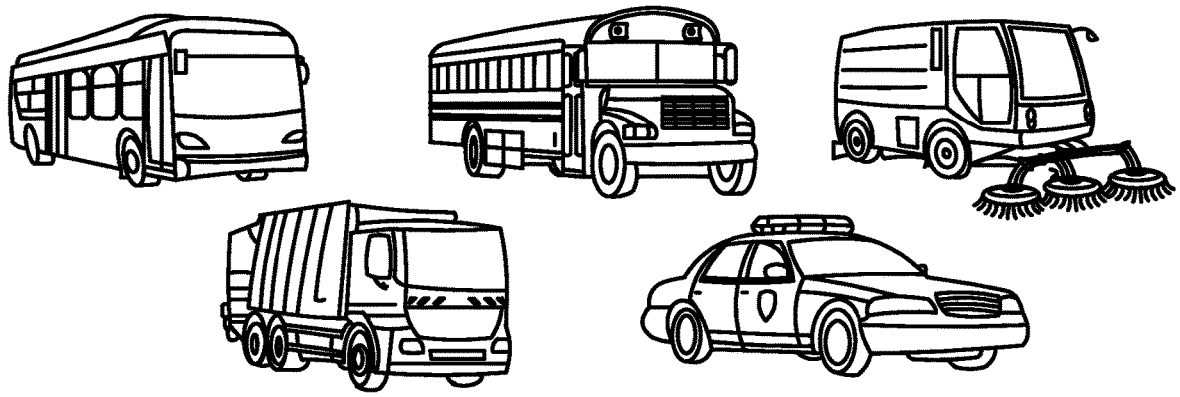
FIG. 4 illustrates different examples of carrier vehicles used to carry the edge device.
Figure 4:
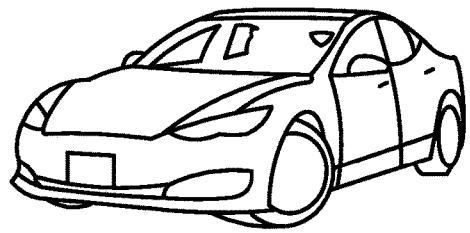
Figure 4:
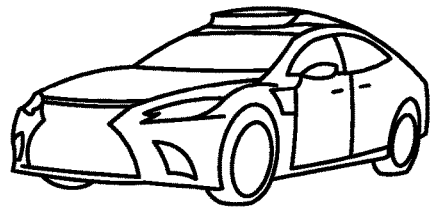

FIG. 4 illustrates that, in some embodiments, the carrier vehicle 110 can be a municipal fleet vehicle. For example, the carrier vehicle 110 can be a transit vehicle such as a municipal bus, train, or light-rail vehicle, a school bus, a street sweeper, a sanitation vehicle (e.g., a garbage truck or recycling truck), a traffic or parking enforcement vehicle, or a law enforcement vehicle (e.g., a police car or highway patrol car), a tram or light-rail train.

In other embodiments, the carrier vehicle 110 can be a semi-autonomous vehicle such as a vehicle operating in one or more self-driving modes with a human operator in the vehicle. In further embodiments, the carrier vehicle 110 can be an autonomous vehicle or self-driving vehicle.

In certain embodiments, the carrier vehicle 110 can be a private vehicle or vehicle not associated with a municipality or government entity.

As will be discussed in more detail in the following sections, the edge device 102 can be detachably or removably coupled to the carrier vehicle 110. For example, the edge device 102 can comprise an attachment arm 502 (see FIGS. 5A-5D) for securing or otherwise coupling the edge device 102 to a window or dashboard of the carrier vehicle 110. As a more specific example, the edge device 102 can be coupled to a front windshield, a rear windshield, a side window, a front dashboard, or a rear deck or dashboard of the carrier vehicle 110.

In some embodiments, the edge device 102 can be coupled to an exterior surface or side of the carrier vehicle 110 such as a front, lateral, or rear exterior surface or side of the carrier vehicle 110. In additional embodiments, the edge device 102 can be coupled to a component or arm extending from the carrier vehicle 110. For example, the edge device 102 can be coupled to a stop arm (i.e., an arm carrying a stop sign) of a school bus.

As previously discussed, the system 100 can comprise edge devices 102 installed in or otherwise coupled carrier vehicles 110 deployed within a geographic area or municipality. For example, an edge device 102 can be coupled to a front windshield or dash/deck of a bus driving around a city on its daily bus route. Also, for example, an edge device 102 can be coupled to a front windshield or dash/deck of a street sweeper on its daily sweeping route or a garbage/recycling truck on its daily collection route.

It is also contemplated by this disclosure that the edge device 102 can be carried by or otherwise coupled to a micro-mobility vehicle (e.g., an electric scooter). In other embodiments contemplated by this disclosure, the edge device 102 can be carried by or otherwise coupled to a UAV or drone.

FIGS. 5A and 5B illustrate front and right side views, respectively, of one embodiment of the edge device 102. The edge device 102 can comprise a device housing 500 and an attachment arm 502.

The device housing 500 can be substantially shaped as an elongate cuboid having rounded corners and edges. In other embodiments, the device housing 500 can be substantially shaped as a rectangular box, an ovoid, a truncated pyramid, a sphere, or any combination thereof.

In some embodiments, the device housing 500 can be made in part of a polymeric material, a metallic material, or a combination thereof. For example, the device housing 500 can be made in part of a rigid polymeric material such as polycarbonate, acrylonitrile butadiene styrene (ABS), or a combination thereof. The device housing 500 can also be made in a part of an aluminum alloy, stainless steel, titanium, or a combination thereof. In some embodiments, at least portions of the device housing 500 can be made of glass (e.g., the parts covering the image sensor lenses).

As shown in FIGS. 5A and 5B, when the device housing 500 is implemented as an elongate cuboid, the device housing 500 can have a housing length 504, a housing height 506, and a housing depth 508. In some embodiments, the housing length 504 can be between about 150 mm and about 250 mm. For example, the housing length 504 can be about 200 mm. The housing height 506 can be between about 50 mm and 100 mm. For example, the housing height 506 can be about 75 mm. The housing depth 508 can be between about 50 mm and 100 mm. For example, the housing depth 508 can be about 75 mm.

In some embodiments, the attachment arm 502 can extend from a top of the device housing 500. In other embodiments, the attachment arm 502 can also extend from a bottom of the device housing 500. As shown in FIG. 5B, at least one of the linkages of the attachment arm 502 can rotate with respect to one or more of the other linkage(s) of the attachment arm 502 to tilt the device housing 500. The device housing 500 can be tilted to allow a driver of the carrier vehicle 110 or an installer of the edge device 102 to obtain better camera angles or account for a slant or angle of the vehicle's windshield.

The attachment arm 502 can comprise a high bonding adhesive 510 at a terminal end of the attachment arm 502 to allow the attachment arm 502 to be adhered to a windshield (e.g., a front windshield or a rear windshield), window, or dashboard of the carrier vehicle 110. In some embodiments, the high bonding adhesive 510 can be a very high bonding (VHB) adhesive layer or tape, an ultra-high bonding (UHB) adhesive layer or tape, or a combination thereof. As shown in FIGS. 5B and 5E, in one example embodiment, the attachment arm 502 can be configured such that the adhesive 510 faces forward or in a forward direction above the device housing 500. In other embodiments not shown in the figures but contemplated by this disclosure, the adhesive 510 can face downward below the device housing 500 to allow the attachment arm 502 to be secured to a dashboard or deck of the carrier vehicle 110.

In other embodiments contemplated by this disclosure but not shown in the figures, the attachment arm 502 can be detachably or removably coupled to a windshield, window, or dashboard of the carrier vehicle 110 via a suction mechanism (e.g., one or more releasable high-strength suction cups), a magnetic connector, or a combination thereof with or without adhesives. In additional embodiments, the device housing 500 can be fastened or otherwise coupled to an exterior surface or interior surface of the carrier vehicle 110 via screws or other fasteners, clips, nuts and bolts, adhesives, suction cups, magnetic connectors, or a combination thereof.

In further embodiments contemplated by this disclosure but not shown in the figures, the attachment arm 502 can be detachably or removably coupled to a micro-mobility vehicle or a UAV or drone. For example, the attachment arm 502 can be detachably or removably coupled to a handrail/handlebar of an electric scooter. Also, for example, the attachment arm 502 can be detachably or removably coupled to a mount or body of a drone or UAV.

FIGS. 5A-5D illustrate that the device housing 500 can house or contain all of the electronic components (see, e.g., FIG. 2A) of the edge device 102 including the plurality of video image sensors 208. For example, the video image sensors 208 can comprise a first video image sensor 208A, a second video image sensor 208B, a third video image sensor 208C, and a fourth video image sensor 208D.

As shown in FIG. 5A, one or more of the video image sensors 208 can be angled outward or oriented in one or more peripheral directions relative to the other video image sensors 208 facing forward. The edge device 102 can be positioned such that the forward facing video image sensors (e.g., the second video image sensor 208B and the third video image sensor 208C) are oriented in a direction of forward travel of the carrier vehicle 110. In these embodiments, the angled video image sensors (e.g., the first video image sensor 208A and the fourth video image sensor 208D) can be oriented such that the environment surrounding the carrier vehicle 110 or to the periphery of the carrier vehicle 110 can be captured by the angled video image sensors. The first video image sensor 208A and the fourth video image sensor 208D can be angled with respect to the second video image sensor 208B and the third video image sensor 208C.

In the example embodiment shown in FIG. 5A, the device housing 500 can be configured such that the camera or sensor lenses of the forward-facing image video sensors (e.g., the second video image sensor 208B and the third video image sensor 208C) are exposed along the length or long side of the device housing 500 and each of the angled video image sensors (e.g., the first video image sensor 208A and the fourth video image sensor 208D) is exposed along an edge or side of the device housing 500.

When in operation, the forward-facing video image sensors can capture videos of the environment (e.g., the roadway, other vehicles, buildings, or other landmarks) mostly in front of the carrier vehicle 110 and the angled video image sensors can capture videos of the environment mostly to the sides of the carrier vehicle 110. As a more specific example, the angled video image sensors can capture videos of adjacent lane(s), vehicle(s) in the adjacent lane(s), a sidewalk environment including people or objects (e.g., fire hydrants or other municipal assets) on the sidewalk, and buildings facades.

At least one of the video image sensors 208 (e.g., the second video image sensor 208B) can be a license plate recognition (LPR) camera having a fixed-focal or varifocal telephoto lens. In some embodiments, the LPR camera can comprise one or more infrared (IR) filters and a plurality of IR light-emitting diodes (LEDs) that allow the LPR camera to operate at night or in low-light conditions. The LPR camera can capture video images at a minimum resolution of 1920×1080 (or 2 MP). The LPR camera can also capture video at a frame rate of between 1 frame per second and 120 FPS. In some embodiments, the LPR camera can also capture video at a frame rate of between 20 FPS and 80 FPS.

The other video image sensors 208 (e.g., the first video image sensor 208A, the third video image sensor 208C, and the fourth video image sensor 208D) can be ultra-low-light HDR image sensors. The HDR image sensors can capture video images at a minimum resolution of 1920×1080 (or 2MP). The HDR image sensors can also capture video at a frame rate of between 1 frame per second and 120 FPS. In certain embodiments, the HDR image sensors can also capture video at a frame rate of between 20 FPS and 80 FPS. In some embodiments, the video image sensors 208 can be or comprise ultra-low-light CMOS image sensors distributed by Sony Semiconductor Solutions Corporation.

FIG. 5C illustrates that the video image sensors 208 housed within the embodiment of the edge device 102 shown in FIG. 5A can have a combined field of view 512 of greater than 180 degrees. For example, the combined field of view 512 can be about 240 degrees. In other embodiments, the combined field of view 512 can be between 180 degrees and 240 degrees.

FIGS. 5D and 5E illustrate perspective and right side views, respectively, of another embodiment of the edge device 102 having a camera skirt 514. The camera skirt 514 can block or filter out light emanating from an interior of the carrier vehicle 110 to prevent the lights from interfering with the video image sensors 208. For example, when the carrier vehicle 110 is a municipal bus, the interior of the municipal bus can be lit by artificial lights (e.g., fluorescent lights, LED lights, etc.) to ensure passenger safety. The camera skirt 514 can block or filter out such excess light to prevent the excess light from degrading the video footage captured by the video image sensors 208.

As shown in FIG. 5D, the camera skirt 514 can comprise a tapered or narrowed end and a wide flared end. The tapered end of the camera skirt 514 can be coupled to a front portion of the device housing 500. The camera skirt 514 can also comprise a skirt distal edge 516 defining the wide flared end. The skirt distal edge 516 can be configured to contact or press against one portion of the windshield or window of the carrier vehicle 110 when the edge device 102 is adhered or otherwise coupled to another portion of the windshield or window via the attachment arm 502.

As shown in FIG. 5D, the skirt distal edge 516 can be substantially elliptical-shaped or stadium-shaped. In other embodiments, the skirt distal edge 516 can be substantially shaped as a rectangle or oval. For example, at least part of the camera skirt 514 can be substantially shaped as a flattened frustoconic or a trapezoidal prism having rounded corners and edges.

FIG. 5D also illustrates that the combined field of view 512 of the video image sensors 208 housed within the embodiment of the edge device 102 shown in FIG. 5D can be less than 180 degrees. For example, the combined field of view 512 can be about 120 degrees or between about 90 degrees and 120 degrees.

Figure 6:
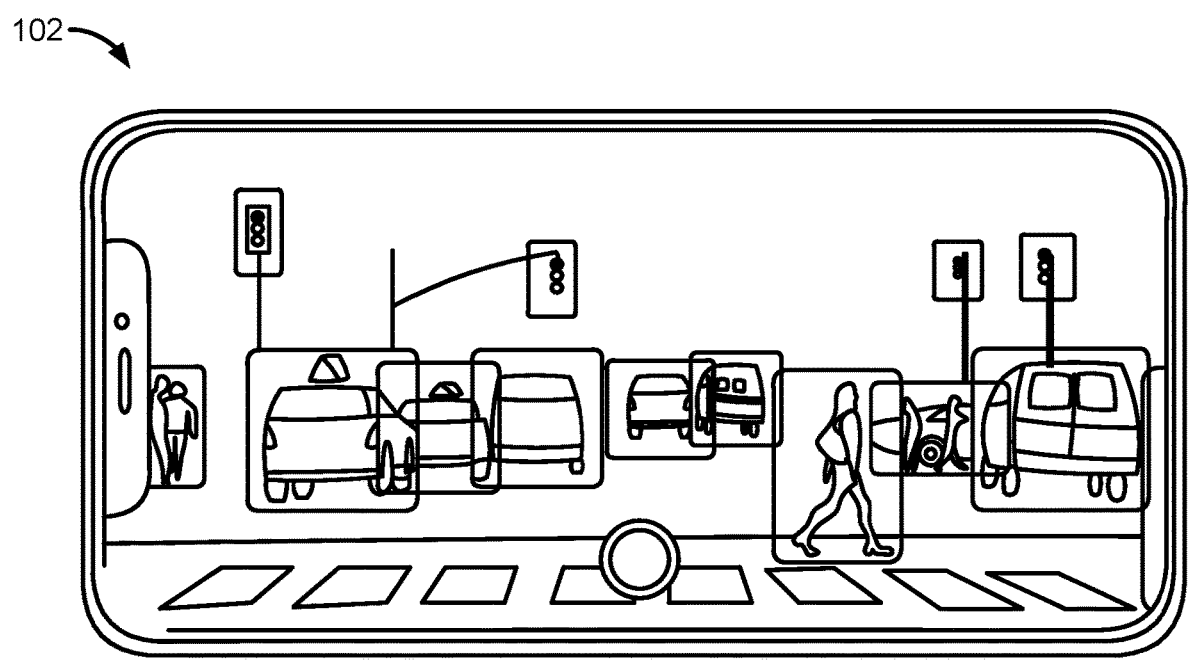
FIG. 6 illustrates another embodiment of an edge device implemented as a personal communication device such as a smartphone.

FIG. 6 illustrates an alternative embodiment of the edge device 102 where the edge device 102 is a personal communication device such as a smartphone or tablet computer. In this embodiment, the video image sensors 208 of the edge device 102 can be the built-in image sensors or cameras of the smartphone or tablet computer. Moreover, references to the one or more processors 200, the wireless communication modules 204, the positioning unit 210, the memory and storage units 202, and the IMUs 206 of the edge device 102 can refer to the same or similar components within the smartphone or tablet computer.

Also, in this embodiment, the smartphone or tablet computer serving as the edge device 102 can also wirelessly communicate or be communicatively coupled to the server 104 via the secure connection 108. The smartphone or tablet computer can also be positioned near a windshield or window of a carrier vehicle 110 via a phone or tablet holder coupled to the windshield, window, dashboard, deck, mount, or body of the carrier vehicle 110.

FIG. 7A illustrates one embodiment of a congestion policy editor user interface (UI) 700. The congestion policy UI interface 700 can be displayed as part of a web portal, desktop application, or mobile application running on the computing device 131 in communication with the server 104. A user of the system 100 can use the web portal, desktop application, or mobile application to transmit data or information to the server 104 concerning the traffic congestion pricing policy. The user can also access certain services provided by the server 104 via the web portal, desktop application, or mobile application.

In some embodiments, the user can be an employee of a municipal transportation department or traffic enforcement agency, and the computing device 131 can be a computing device used by the employee to administer, manage, or enforce a traffic congestion pricing policy established by the municipal transportation department or the traffic enforcement agency. In other embodiments, the user can be working on behalf of a third-party agency or entity tasked with administering, managing, or enforcing a traffic congestion pricing policy established by a municipal transportation department or traffic enforcement agency.

The congestion policy editor UI 700 can include at least one interactive map UI 702 and a control panel 704 allowing the user to set an enforcement period 706 and certain enforcement logic. In some embodiments, the control panel 704 can be implemented as a sidebar adjacent to the interactive map UI 702.

The interactive map UI 702 can comprise a zone boundary selection tool 708 overlaid or otherwise rendered on top of a digital map 710. The zone boundary selection tool 708 can be used to set the boundaries 130 of the enforcement zone 114.

In some embodiments, the digital map 710 can be one of the semantic annotated maps 336 stored as part of the semantic map layer 330. For example, the digital map 710 can comprise semantic objects or labels concerning a road environment such as lane lines, lane dividers, crosswalks, traffic lights, no parking signs or other types of street signs, fire hydrants, parking meters, colored-curbs, or a combination thereof. In other embodiments, the digital map 710 can be one of the geometric maps 334 stored as part of the geometric map layer 328.

In some embodiments, the zone boundary selection tool 708 can comprise a marquee tool 712 overlaid or otherwise rendered on top of a portion of the digital map 710. A user can adjust a location and size of the enforcement zone 114 by moving (e.g., by dragging and dropping) the entire marquee tool 712 to a desired location on the digital map 710 and adjusting a size of the marquee tool 712 (e.g., by enlarging or shrinking the size of the marquee tool 712 using certain user inputs) once the marquee tool 712 is at the desired location. For example, the user can adjust the size of the marquee tool 712 by applying certain user inputs (e.g., a touch input or click input) to a border or corner of the marquee tool 712 and dragging the border or corner to increase or decrease the size of the marquee tool 712.

As shown in FIG. 7A, the marquee tool 712 can be a circular marque tool. In other embodiments, the marque tool 712 can be an elliptical marque tool or a rectangular marquee tool. In further embodiments, the marquee tool 712 can be a lasso-type marque tool where the final shape of the marquee tool 712 is manipulatable by the user.

In certain embodiments, the lines (e.g., the broken or dotted lines) or borders of the marque tool 712 are considered the boundaries 130 of the enforcement zone 114. In these embodiments, the area of the digital map 710 encompassed by the marque tool 712 is considered the enforcement zone 114. More specifically, any roadways 713 or segments thereof included in the area of the digital map 710 encompassed by the marquee tool 712 are considered part of the enforcement zone 114.

In other embodiments, the marque tool 712 can encompass an area of the digital map 710 comprising a number of roadways intersections 714. The roadways intersections 714 can be locations on the digital map 710 where multiple roadways 713 meet or intersect. Another method of establishing the boundaries 130 of the enforcement zone 114 can comprise first determining all roadways intersections 714 that are included within the area of the digital map 710 encompassed by the marque tool 712 and then determining all roadways 713 or segments thereof that connect the roadways intersections 714 to one another. The enforcement zone 114, in these embodiments, is comprised of all of the aforementioned intersections 714 and all of the roadways 713 or segments thereof that connect such roadways intersections 714 to one another. For example, FIG. 7A illustrates one embodiment of an enforcement zone 114 established in this manner. As shown in FIG. 7A, four intersections 714 shown on the digital map 710 are encompassed by the marque tool 712 and the enforcement zone 114 is determined to be the four intersections 714 along with the roadways 713 or segments of such roadways 713 connecting these four intersections 714 to one another.

FIG. 7A also illustrates that the zone boundary selection tool 708 can comprise a plurality of boundary adjusters 716 or boundary adjustment tools that can be used by the user to extend or contract the boundaries 130 of the enforcement zone 114. For example, the boundary adjusters 716 can be used to extend the boundaries 130 of the enforcement zone 114 beyond an area of the digital map 710 initially selected or otherwise encompassed by the marque tool 712. Also, for example, the boundary adjusters 716 can be used to remove certain roadways 713 or segments thereof from the enforcement zone 114. The boundary adjusters 716 can be used to fine tune the boundaries 130 of the enforcement zone 114, for example, to cover areas or roadways 713 not easily capturable by the marquee tool 712 or to remove areas or roadways inadvertently captured by the marquee tool 712.

In some embodiments, the boundary adjusters 716 can be implemented as graphics or icons (e.g., circle icons or graphics) appearing at intersections 714 encompassed by the marquee tool 712. In other embodiments, the boundary adjusters 716 can be graphics or icons appearing along the lines or borders of the marquee tool 712. In further embodiments, the boundary adjusters 716 can appear as the user applies a user input to a location on the digital map 710.

Figure 7B:
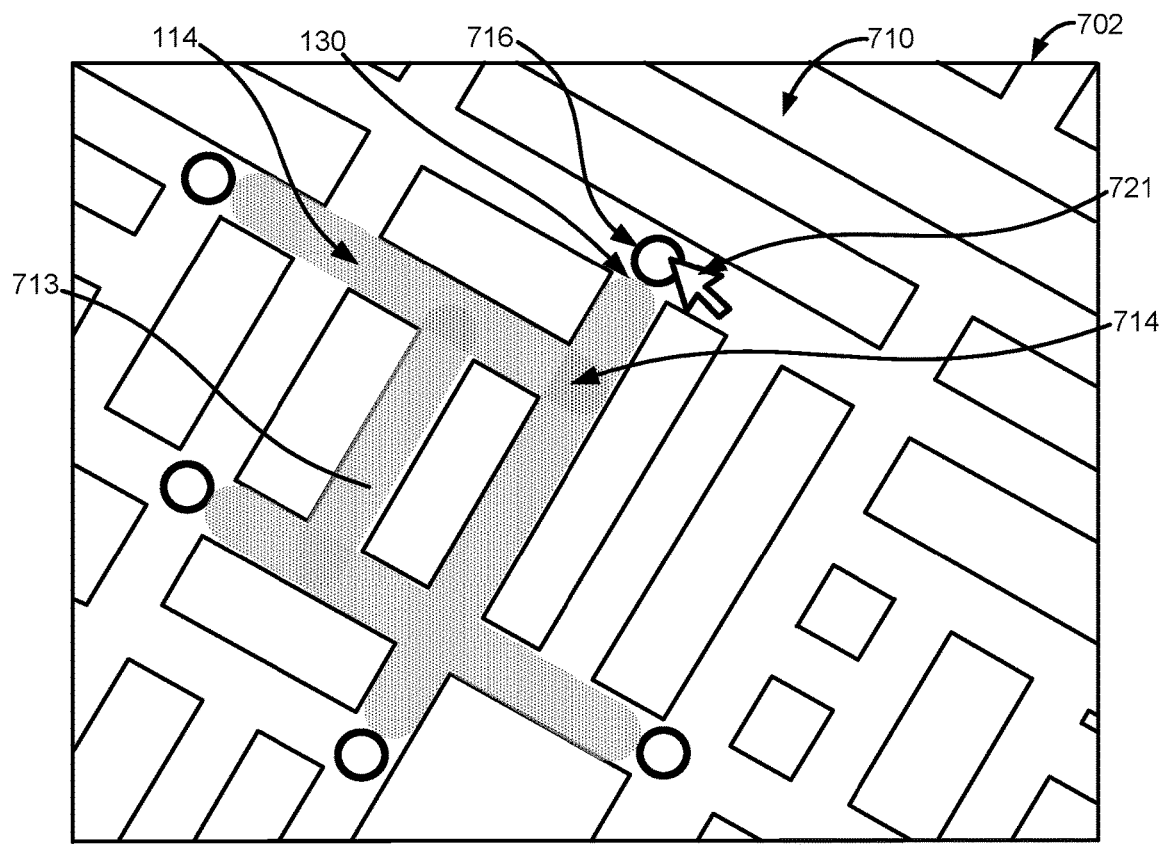
FIG. 7B illustrates one embodiment of an interactive map UI of the congestion policy editor UI.
Figure 7C:
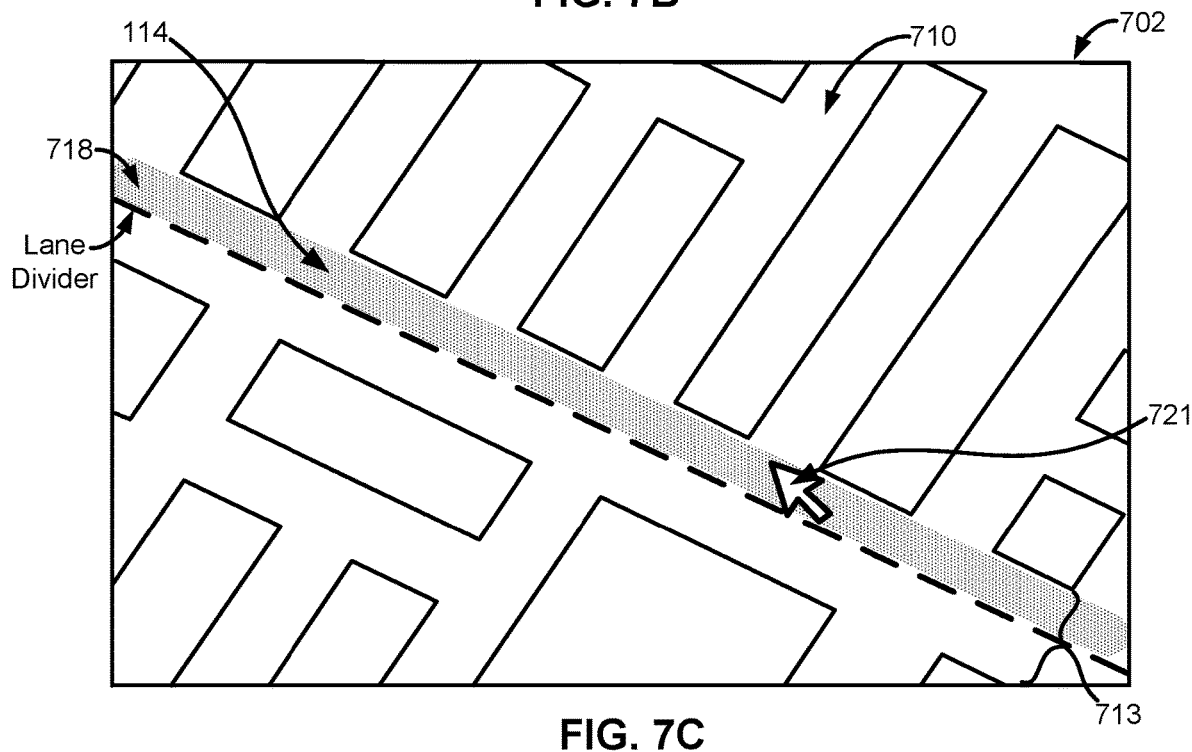
FIG. 7C illustrates another embodiment of the interactive map UI of the congestion policy editor UI.

FIG. 7B illustrates another embodiment of the interactive map UI 702. Although not shown in FIG. 7B, the interactive map UI 702 can be displayed as part of the congestion policy editor UI 700.

FIG. 7B illustrates that the boundary adjusters 716 can be used to adjust the boundaries 130 of an enforcement zone 114 displayed on a digital map 710. As shown in FIG. 7B, the user can utilize a cursor 721 or another type of pointer tool to select one of the boundary adjusters 716. The user can then move the selected boundary adjuster 716 along a roadway 713 away from the enforcement zone 114 displayed on the digital map 710 to extend the boundaries of the enforcement zone 114 or move the selected boundary adjuster 716 along the roadway 713 toward the enforcement zone 114 to remove the roadway 713 or a segment thereof from the enforcement zone 114.

As previously discussed, the enforcement zone 114 can initially be established using a marquee tool 712. The marquee tool 712 can be used by a user to quickly select an area or portion of the digital map 710 (including all roadways 713 within this area or portion) to include as part of the enforcement zone 114. A user can then use one or more boundary adjusters 716 to fine tune the boundaries 130 of the enforcement zone 114. This can be useful for cases where a user wants to include a longer segment of a high-traffic roadway 713 in an enforcement zone 114. This can also be useful for cases where the user wants to remove a low-traffic roadway 713, or a segment thereof, from the enforcement zone 114 or wants to exclude certain roadways 713, or a segment thereof, due to certain buildings or institutions located along such roadways 713 (e.g., a hospital or government building).

In some embodiments, a boundary adjuster 716 can be used to extend or expand the enforcement zone 114 to a part of a roadway 713 or a partial segment of the roadway 713 but not the entire roadway 713. For example, the boundary adjuster 716 can be used to extend or expand the enforcement zone 114 to include part of a street, block, or boulevard.

One technical advantage of the boundary adjusters 716 is that it allows users to create enforcement zones 114 that are not easily captured by marquee tool 712 with a common polygonal shape such as a rectangle or circle.

FIG. 7C illustrates yet another embodiment of the interactive map UI 702. Although not shown in FIG. 7C, the interactive map UI 702 can be displayed as part of the congestion policy editor UI 700.

FIG. 7C illustrates that the enforcement zone 114 can be limited to one or more lanes 718 of a roadway 713. In the embodiment shown in FIG. 7C, the zone boundary selection tool 708 can be a cursor 721 or other type of pointer tool used to select one or more lanes 718 of a roadway 713 to include as part of the enforcement zone 114.

In some embodiments, the selected lane(s) 718 of the roadway 713 can be included in an enforcement zone 114 along with other roadways 713 (including entire roadways 713) shown on the digital map 710. In other embodiments, only the selected lane(s) 718 of the roadway 713 can serve as the enforcement zone 114. In all such embodiments, the enforcement zone 114 can include the selected lane(s) 718 of the roadway 713 but not all lanes of the roadway 713.

This can be useful where a user aims to relieve congestion along the roadway 713 by charging drivers or vehicle operators a fee for driving in certain lanes of the roadway 713. For example, the enforcement zone 114 can be a toll lane or a combination toll lane and high-occupancy vehicle (HOV)/carpool lane.

This can also be useful for municipalities that want to turn certain lane(s) 718 of a roadway 713 into bike lanes or public transportation lanes during commute hours.

As shown in FIGS. 7A-7C, the roadways 713 included as part of the enforcement zone 114 can be highlighted using certain colors or shading on the digital map 710. The roadways 713 that are highlighted can indicate to the user that the roadways 713 are part of the enforcement zone 114.

Moreover, as shown in FIG. 7A, the control panel 704 can be used by a user to set the enforcement period 706 for the enforcement zone 114. For example, the enforcement period 706 can be a period of time when the traffic congestion pricing policy is in effect. A user can set the enforcement period 706 by applying certain user inputs to certain icons or graphics representing times or days-of-the-week. The user can also set the enforcement period 706 by typing in a desired start and stop/end time via one or more text-entry boxes.

The user can also set multiple enforcement periods 706 with multiple start times and stop/end times throughout one day. As a more specific example, the enforcement period 706 for a certain enforcement zone 114 can be set as Monday to Friday during morning and afternoon commute hours.

FIG. 7A also illustrates that the control panel 704 can be used by a user to set an enforcement grace period 720. The enforcement grace period 720 can be a brief period of time after the start of the enforcement period 706 or before the end of the enforcement period 706 when the traffic congestion pricing policy is not enforced. The enforcement grace period 720 can be between several minutes (e.g., 1 minute, 2 minutes, 5 minutes, etc.) or several seconds (e.g., 30 seconds, 45 seconds, etc.). The enforcement grace period 720 can provide a measure of leniency to non-exempt vehicles 112 that might enter an enforcement zone 114 several minutes early or exit an enforcement zone 114 several minutes late due to time differences. The enforcement grace period 720 also gives non-exempt vehicles 112 that wish to leave the enforcement zone 114 enough time to do so safely.

As shown in FIG. 7A, a user can set an enforcement grace period 720 by applying a user input to a graphic or icon representing the enforcement grace period 720 or a length of the enforcement grace period 720. The user can also type in a desired length of the enforcement grace period 720 via a text-entry box.

FIG. 7A also illustrates that the control panel 704 can be used by a user to add one or more license plate numbers 122 to a vehicle whitelist 317. As previously discussed, the vehicle whitelist 317 can be a digital repository of license plate numbers where vehicles having such license plate numbers on their license plates 128 are exempt from or not subject to the traffic congestion pricing policy. For example, certain municipal vehicles or public safety vehicles can have their license plate numbers included as part of the vehicle whitelist 317.

In one embodiment, a user can add a license plate number to the vehicle whitelist 317 by applying a user input (e.g., a click input or touch input) to a whitelisted vehicle drop-down menu 722 and typing in the license plate number 122 directly into a text-entry box that appears within the whitelisted vehicle drop-down menu 722 or uploading a file containing a list of license plate numbers of whitelisted vehicles via an upload graphic that appears within the whitelisted vehicle drop-down menu 722.

Once the user has at least set the enforcement zone 114 via the interactive map UI 702 and set the enforcement period 706 and the enforcement grace period 720 via the control panel 704, the user can apply a user input to a save button 724 to save the various enforcement parameters of the traffic congestion pricing policy.

In some embodiments, geospatial coordinate data concerning the boundaries 130 of the enforcement zone 114 and date/time values concerning the enforcement period 706 as well as the enforcement grace period 720 can be saved as a JSON file on the server 104. In these embodiments, the JSON file containing the coordinate data concerning the boundaries 130 of the enforcement zone 114 and the date/time values concerning the enforcement period 706 (as well as the enforcement grace period 720) can be transmitted from the server 104 to the edge devices 102.

Figure 8A:
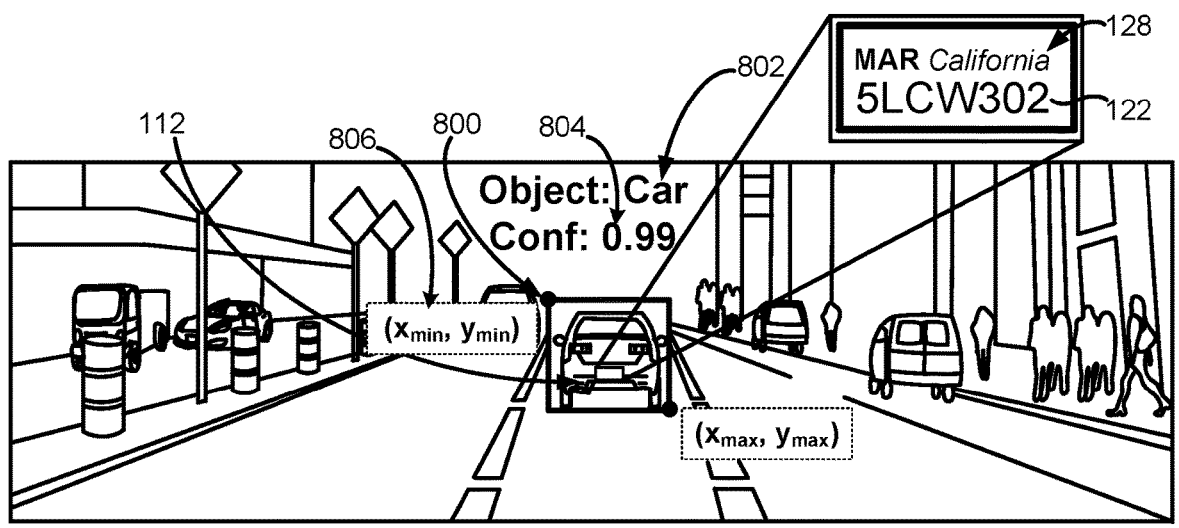
FIG. 8A illustrates an example of a video frame showing a non-exempt vehicle bounded by a vehicle bounding box.

FIG. 8A illustrates an example of a video frame showing a non-exempt vehicle 112 bounded by a vehicle bounding box 800. The video frame can be one of the video frames grabbed or otherwise retrieved from the videos 118 captured by one or more video image sensors 208 of the edge device 102. The event detection engine 300 of the edge device 102 can periodically or continuously pass video frames from the videos 118 to a plurality of deep learning models including at least the object-detection neural network 314 and the LPR neural network 315 running on the edge device 102 (see FIG. 3).

As shown in FIG. 8A, the object-detection neural network 314 can bound the non-exempt vehicle 112 in the vehicle bounding box 800. The event detection engine 300 can obtain as outputs from the object-detection neural network 314, predictions concerning the objects detected within the video frame including at least an object class 802, a confidence score 804 related to the object detected, and a set of image coordinates 806 for the vehicle bounding box 800.

The confidence score 804 can be between 0 and 1.0. In some embodiments, the object-detection neural network 314 can bound a vehicle within a vehicle bounding box 800 only if the confidence score 804 is above a preset confidence threshold. For example, the confidence threshold can be set at between 0.65 and 0.90 (e.g., at 0.70). The confidence threshold can be adjusted based on an environmental condition (e.g., a lighting condition), a location, a time-of-day, a day-of-the-week, or a combination thereof.

The event detection engine 300 can also obtain a set of image coordinates 806 for the vehicle bounding box 800. The image coordinates 806 can be coordinates of corners of the vehicle bounding box 800. For example, the image coordinates 806 can be x- and y-coordinates for an upper left corner and a lower right corner of the vehicle bounding box 800. In other embodiments, the image coordinates 806 can be x- and y-coordinates of all four corners or the upper right corner and the lower=left corner of the vehicle bounding box 800.

In some embodiments, the vehicle bounding box 800 can bound the entire two-dimensional (2D) image of the non-exempt vehicle 112 captured in the video frame. In other embodiments, the vehicle bounding box 800 can bound at least part of the 2D image of the non-exempt vehicle 112 captured in the video frame such as a majority of the pixels making up the 2D image of the non-exempt vehicle 112.

The event detection engine 300 can also obtain as an output from the object-detection neural network 314 predictions concerning a set of vehicle attributes 124 such as a color, make and model, and vehicle type of the vehicle shown in the video frames. The vehicle attributes 124 can be used by the event detection engine 300 to make an initial determination as to whether the vehicle shown in the video frames is subject to the traffic congestion pricing policy (i.e., whether the vehicle is exempt or non-exempt).

The edge device 102 can also pass the video frame to the LPR neural network 315 running on the edge device 102. The LPR neural network 315, can be specifically trained to recognize license plate numbers from video frames or images. By feeding the video frame into the LPR neural network 315, the edge device 102 can obtain as an output from the LPR neural network 315, a prediction concerning the license plate number 122 of the non-exempt vehicle 112. The prediction can be in the form of an alphanumeric string representing the license plate number 122.

The edge device 102 can then compare the recognized license plate number 122 against at least one of the license plate whitelist 317 and the license plate blacklist 318 stored on the edge device 102 to determine if the vehicle captured in the video frame is indeed a non-exempt vehicle. As previously mentioned, the edge device 102 can also use the vehicle attributes 124 predicted by the object-detection neural network 314 as part of this initial determination.

Figure 12:
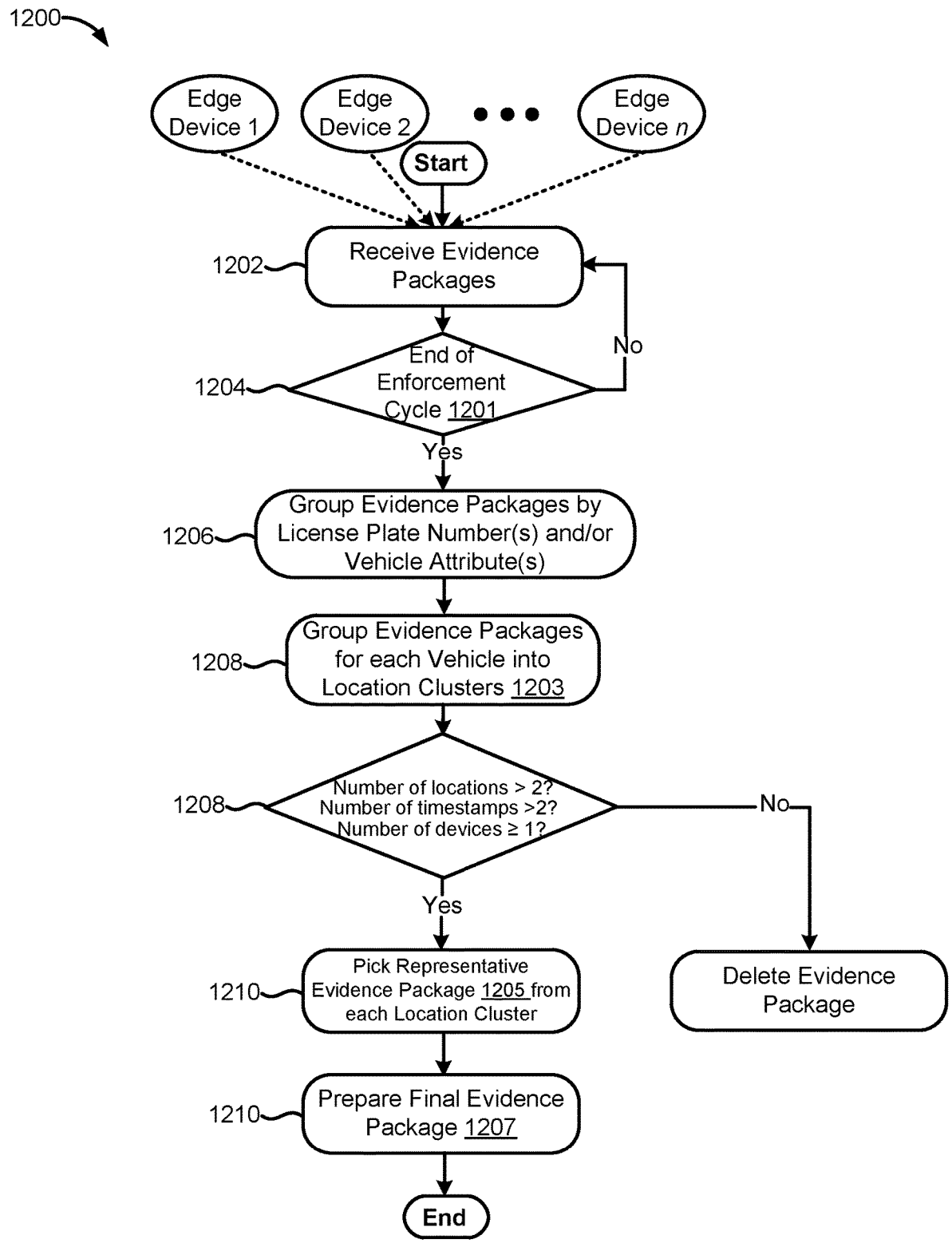
FIG. 12 is a flowchart illustrating one embodiment of a method undertaken by the server to prepare a final evidence package.

In some embodiments, the selection module 344 of the server 104 can select a representative evidence package 1205 from each location cluster 1203 based on the video frames included in the evidence packages 116 grouped into the location cluster 1203 (see, also, FIG. 3 and FIG. 12). The representative evidence package 1205 can be selected based in part on whether the video frames included as part of the evidence packages 116 show the non-exempt vehicle 112 and the license plate 128 of the non-exempt vehicle 112 as being unobstructed by other objects in the video frames.

For example, the selection module 344 can select one of the evidence packages 116 from the location cluster 1203 as the representative evidence package 1205 if at least one video frame from the evidence package 116 shows the non-exempt vehicle 112 and/or the license plate 128 of the non-exempt vehicle 112 with the least amount of obstruction by other objects in the video frames relative to the video frames from the other evidence packages 116 in the location cluster 1203. As a more specific example, the selection module 344 can select the representative evidence package 1205 by calculating a vehicle obstruction score based on a degree to which the vehicle bounding box 800 bounding the non-exempt vehicle 112 in the video frame is obstructed by other object(s) in the video frame. The selection module 344 can calculate vehicle obstruction scores for all video frames from all evidence packages 116 making up one location cluster 1203. Moreover, the selection module 344 can also calculate a license plate obstruction score based on a degree to which the license plate 128 shown in the video frame is obstructed by other object(s) in the video frame. The selection module 344 can select an evidence package 116 as the representative evidence package 1205 if a video frame from the evidence package 116 is determined to have the lowest vehicle obstruction score or the lowest combined vehicle obstruction score and license plate obstruction score out of all video frames from all evidence packages 116 making up a location cluster 1203.

Figure 8B:
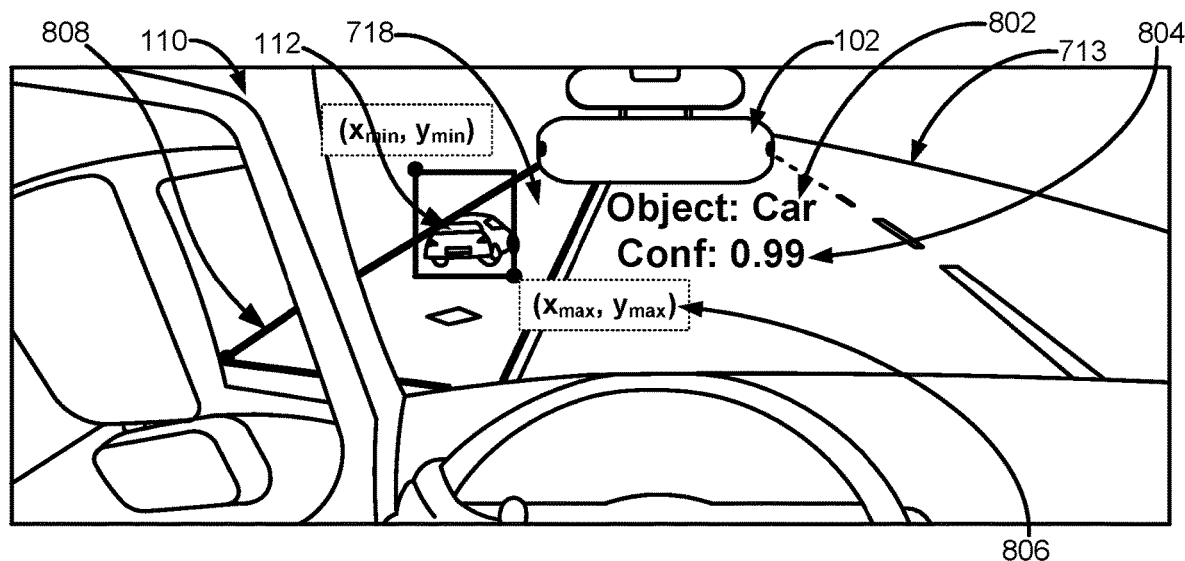
FIG. 8B illustrates an example of a video frame showing a non-exempt vehicle bounded by a vehicle bounding box and a lane of a roadway bounded by a polygon.

FIG. 8B illustrates an example of a video frame showing a non-exempt vehicle 112 bounded by a vehicle bounding box 800 and a lane 718 of a roadway 713 bounded by a polygon 808. The video frame can be one of the video frames grabbed or otherwise retrieved from the videos 118 captured by one or more video image sensors 208 of the edge device 102. The event detection engine 300 of the edge device 102 can periodically or continuously pass video frames from the videos 118 to a plurality of deep learning models including at least the object-detection neural network 314, the LPR neural network 315, and the lane detection neural network 322 running on the edge device 102 (see FIG. 3). As discussed above in relation to FIG. 8A, the object-detection neural network 314 can bound the non-exempt vehicle 112 in the vehicle bounding box 800 and can obtain as outputs from the object-detection neural network 314, predictions concerning the object class 802, the confidence score 804 related to the object detected, and a set of image coordinates 806 for the vehicle bounding box 800.

The event detection engine 300 can also pass or feed video frames to the lane detection neural network 322 to detect one or more lanes 718 shown in the video frames. Lane detection is needed when the enforcement zone 114 set by a user includes one or more lanes 718 of a roadway 713 but not all lanes of the roadway 713 (see, also, FIG. 7C). For example, the user can set one or more restricted lanes such as one or more bus lanes, bike lanes, fire lanes, toll lanes, high-occupancy vehicle (HOV) lanes, or carpool lanes as part of an enforcement zone 114.

The one or more lanes 718 can be marked by certain insignia, text, nearby signage, road or curb coloration, or a combination thereof. In other embodiments, the one or more lanes 718 can be designated or indicated in a private or public database (e.g., a municipal GIS database) accessible by the edge device 102, the server 104, or a combination thereof.

As shown in FIG. 8B, the lane detection neural network 322 can bound the lane 718 in a polygon 808. The lane detection neural network 322 can also output image coordinates 806 associated with the polygon 808.

In some embodiments, the polygon 808 can be a quadrilateral. More specifically, the polygon 808 can be shaped substantially as a trapezoid.

The event detection engine 300 can determine that the non-exempt vehicle 112 is in motion in the lane 718 included as part of the enforcement zone 114 (i.e., the non-exempt vehicle 112 is driving in the lane 718) based on the amount of overlap between the vehicle bounding box 800 bounding the non-exempt vehicle 112 and the polygon 808 bounding the lane 718. The image coordinates 806 associated with the vehicle bounding box 800 can be compared with the image coordinates 806 associated with the polygon 808 to determine an amount of overlap between the vehicle bounding box 800 and the polygon 808. As a more specific example, the event detection engine 300 can calculate a lane occupancy score to determine whether the non-exempt vehicle 112 is driving in the lane 718. A higher lane occupancy score can be equated with a higher degree of overlap between the vehicle bounding box 800 and the polygon 808.

In some embodiments, the selection module 344 can select one of the evidence packages 116 from a location cluster 1203 as a representative evidence package 1205 if at least one video frame from the evidence package 116 shows the non-exempt vehicle 112, the license plate 128 of the non-exempt vehicle 112, and the lane 718 occupied by the non-exempt vehicle 112 with the least amount of obstruction by other objects in the video frames relative to the video frames from the other evidence packages 116 in the location cluster 1203. As a more specific example, the selection module 344 can select the representative evidence package 1205 by calculating a vehicle obstruction score, a license plate obstruction score, and a lane obstruction score based on a degree to which the lane 718 shown in the video frame is obstructed by other object(s) in the video frame. The selection module 344 can select an evidence package 116 as the representative evidence package 1205 if a video frame from the evidence package 116 is determined to have the lowest combined vehicle obstruction score, license plate obstruction score, and lane obstruction score out of all video frames from all evidence packages 116 making up a location cluster 1203.

Although FIGS. 8A and 8B illustrate only one instance of a vehicle bounding box 800 and one instance of a polygon 808, it is contemplated by this disclosure that multiple vehicles (including multiple non-exempt vehicles 112) can be bounded by vehicle bounding boxes 800 and multiple lanes 718 can be bounded by polygons 808 in the same video frame. Moreover, although FIGS. 8A and 8B illustrate a visual representation of the vehicle bounding box 800 and the polygon 808, it should be understood by one of ordinary skill in the art that the image coordinates 806 of the vehicle bounding box 800 and the polygon 808 and can be used as inputs for further processing by the edge device 102 or the server 104 or stored in the database 107 without the actual vehicle bounding box 800 or polygon 808 being visualized.

Figure 9:
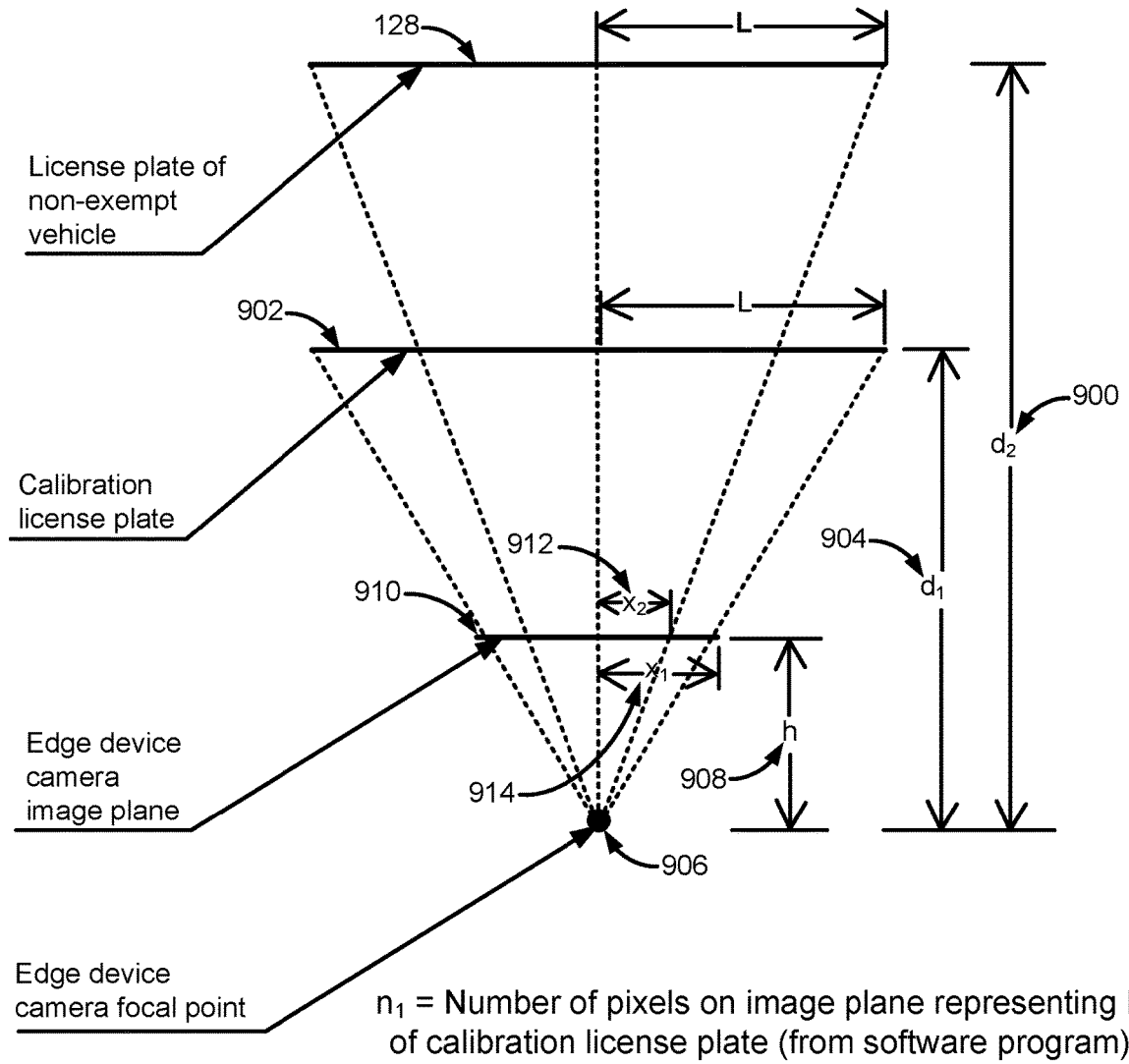
FIG. 9 is a schematic diagram illustrating certain parameters used to calculate a distance separating the non-exempt vehicle from the edge device.

FIG. 9 is a schematic diagram illustrating certain parameters used to calculate a separation distance 900 separating the non-exempt vehicle 112 from the edge device 102. As previously discussed, in some embodiments, the separation distance 900 can be used by the distance calculation engine 320 to determine the location 126 of the non-exempt vehicle 112 by adding the separation distance 900 to a present location of the edge device 102. The present location of the edge device 102 can be determined in part from geospatial coordinates obtained from the positioning unit 210 of the edge device 102, inertial measurement data obtained from the IMU 206 of the edge device 102, and wheel odometry data 216 obtained from the carrier vehicle 110 carrying the edge device 102.

As shown in FIG. 9, the separation distance 900 (also shown as $d_2$) can be calculated using an image depth analysis algorithm based in part on real-time measurements of the license plate 128 and previous measurements made on a calibration license plate 902 placed at a known calibration distance 904 (also shown as $d_1$) from a focal point 906 of a video image sensor 208 of the edge device 102 (the video image sensor 208 can be any one of the video image sensors 208 shown in FIG. 5A). The separation distance 900 can be calculated based on a known size or standardized size of the license plate 128 of the non-exempt vehicle 112 in real-space, a known distance 908 (also shown as h) between the focal point 906 of the video image sensor 208 and an image plane 910 of the video image sensor 208, a projected size 912 (also shown as $x_2$) of the license plate 128 on the image plane 910 of the video image sensor 208, the known size of a calibration license plate 902 in real space (which is the same size as the license plate 128 of the non-exempt vehicle 112 given that license plate sizes are normally standardized), the known calibration distance 904 separating the calibration license plate 902 from the focal point 906 of the video image sensor 208, and a projected size 914 (also shown as $x_1$) of the calibration license plate 902 on the image plane 910 of the video image sensor 208.

For example, both the calibration license plate 902 and the license plate 128 of the non-exempt vehicle 112 can have a known length of 2 L and a known half-length of L. Moreover, in some embodiments, the distance calculation engine 320 can obtain the number of pixels (shown as $n_1$ in FIG. 9) on the image plane 910 of the video image sensor 208 representing the half-length (L) of the calibration license plate 902 from a software program operating the video image sensor 208 or a camera pixel length calculator program. Furthermore, the distance calculation engine 320 can also obtain the number of pixels (shown as $n_2$ in FIG. 9) on the image plane 910 of the video image sensor 208 representing the half-length (L) of the license plate 128 of the non-exempt vehicle 112 from a software program operating the video image sensor 208 or a camera pixel length calculator program.

The image depth analysis algorithm can calculate $d_2$ by relying on certain geometric properties and formulas related to triangles. For example, $x_1$ can be calculated using the following formula derived from certain properties of similar triangles: $x_1=(h*L)/d_1$. Next, the unit length (p) of a pixel on the image plane 910 can be calculated using the expression: $p=x_1/n_1=(h*L)/(d_1*n_1)$. After calculating the unit length of a pixel (p), $x_2$ can be calculated using the expression: $x_2=p*n_2$. With $x_2$ calculated, $d_2$ can be calculated using an additional formula derived from certain properties of similar triangles: $d_2=(h*L)/x_2$. This formula can also be expressed as $d_2=d_1*(n_1/n_2)$. Using the formula $d_2=d_1*(n_1/n_2)$, the separation distance 900 ($d_2$) can easily be calculated with the known calibration distance 904 ($d_1$), the number of pixels ($n_1$) on the image plane 910 representing the half-length (L) of the calibration license plate 902, and the number of pixels ($n_2$) on the image plane 910 representing the half-length (L) of the license plate 128. The known calibration distance 904 ($d_1$) and the number of pixels ($n_1$) on the image plane 910 representing the half-length (L) of the calibration license plate 902 can be stored locally on the edge device 102. The number of pixels ($n_2$) on the image plane 910 representing the half-length (L) of the license plate 128 can be obtained in real-time or near-real-time from a software program operating the video image sensor 208 or a camera pixel length calculator program.

As previously discussed, the separation distance 900 can be used by the distance calculation engine 320 to determine the location 126 of the non-exempt vehicle 112 by adding the separation distance 900 to a present location of the edge device 102 and obtaining the orientation and/or heading of the carrier vehicle 110. Determining an accurate location of the non-exempt vehicle 112 is important because one technical problem faced by the applicants is that certain non-exempt vehicles 112 can be in motion near the boundaries 130 of the enforcement zone 114 such that even small differences in distance can separate an accurate detection from a false-positive detection. When the edge device 102 (carried by a carrier vehicle 110) encounters such a non-exempt vehicle 112 near the boundaries 130 of the enforcement zone 114, it is important for the edge device 102 to be able to accurately determine the location 126 of the non-exempt vehicle 112. One technical solution discovered and developed by the applicants is the image depth analysis algorithm disclosed above where the edge device 102 uses its own present location and a separation distance 900 calculated using a video frame or image of the license plate 128 of the non-exempt vehicle 112 to more accurately determine the location 126 of the non-exempt vehicle 112.

FIG. 10 illustrates that the edge device 102 can mark the time when the non-exempt vehicle 112 was detected using a plurality of timestamps 120. In some embodiments, the plurality of timestamps 120 can comprise a GPS timestamp 1002 obtained by the edge device 102 from one or more GPS satellites, an NTP timestamp 1004 obtained by the edge device 102 from an NTP server 1000, and a local timestamp 1006 obtained from a clock running locally on the edge device 102 (referred to in this disclosure as a local clock 1008).

The NTP server 1000 can synchronize all connected computers or devices to within a few milliseconds (ms) of Coordinate Universal Time (UTC). The edge device 100 can obtain the NTP timestamps 1004 by constantly communicating with the NTP server 1000 over a WiFi or cellular network connection.

As previously discussed, the edge device 102 can generate an evidence package 116 to be transmitted to the server 104 when the edge device 102 determines that a non-exempt vehicle 112 is in motion within the enforcement zone 114 during the enforcement period 706. The edge device 102 can include the GPS timestamp 1002, the NTP timestamp 1004, and the local timestamp 1006 in the evidence package 116 when all three timestamps are available. The edge device 102 can include the GPS timestamp 1002 and the local timestamp 1006 in the evidence package 116 if the NTP timestamp 1004 is unavailable. Alternatively, the edge device 102 can include the NTP timestamp 1004 and the local timestamp 1006 in the evidence package 116 if the GPS timestamp 1002 is unavailable. The edge device 102 can record timestamps 120 from multiple sources in case one of the timestamps 120 is inaccurate.

In some embodiments, the edge device 102 can record a GPS timestamp 1002 at a frequency of 20 Hz or every 50 ms. In other embodiments, the edge device 102 can record a GPS timestamp 1002, an NTP timestamp 1004, or a combination thereof at a frequency of once per second.

In certain embodiments, one or more processors of the edge device 102 can generate an interrupt at a rising edge of each pulse per second (PPS) signal of a GPS receiver of the edge device 102 and execute a time synchronization function as a result of the interrupt. For example, the time synchronization function can comprise determining whether the time on the local clock 1008 is synchronized with a time received from one or more GPS satellites. As a more specific example, the time synchronization function can compare a GPS timestamp 1002 with a local timestamp 1006 as part of this determination. Additionally, or alternatively, the time synchronization function can also comprise determining whether the time on the local clock 1008 is synchronized with a time received from the NTP server 1000. The time synchronization function can further comprise synchronizing or adjusting the local clock 1008 to within one second of the time received from the one or more GPS satellites or the time received from the NTP server 1000.

As previously discussed, in some cases, the edge device 102 may be unable to obtain the GPS timestamp 1002 or the NTP timestamp 1004 when the carrier vehicle 110 carrying the edge device 102 drives into an area where GPS signals from the one or more GPS satellites are blocked or become unavailable and there is no network connection that allows the edge device 102 to communicate with the NTP server 1000. In these cases, the edge device 102 can record local timestamps 1006 based on the local clock 1008 running on the edge device 102. In some embodiments, the local clock 1008 is a local NTP clock running on the edge device 102.

However, the local clock 1008 can deviate from the more accurate clocks kept by the NTP server 1000 and the GPS satellites, thereby affecting the accuracy of the local timestamps 1006. This can be an issue if the edge device 102 generates one or more evidence packages 116 to the server 104 during a period of time when the edge device 102 can only mark the time using local timestamps 1006 and such local timestamps 1006 are included as part of the evidence packages 116 transmitted to the server 104. This can be especially problematic if the local clock 1008 running on the edge device 102 is inaccurate, thereby affecting the accuracy of the local timestamps 1006 and, ultimately, the accuracy of the evidence packages 116 transmitted to the server 104 during this period of time.

One technical solution to this technical problem involves having the edge device 102 stream or transmit hashed signature packets 326 to the server 104 at fixed time intervals (e.g., every minute, every five minutes, every 10 minutes, every 15 minutes, every 20 minutes, etc.). For example, the edge device 102 can stream or transmit hashed signature packets 326 to the server 104 at fixed time intervals according to a local clock 1008 running on the edge device 102. The hashed signature packets 326 can be streamed or transmitted separate from the evidence packages 116 such that the hashed signature packets 326 are transmitted at fixed time intervals regardless of whether an evidence package 116 is transmitted to the server 104.

Each of the hashed signature packets 326 can comprise at least one of the GPS timestamp 1002 (if available), the NTP timestamp 1004 (if available), and the local timestamp 1006. In some embodiments, when a hashed signature packet 326 includes either a GPS timestamp 1002 or an NTP timestamp 1004 received from the NTP server 1000, the server 104 assumes that the edge device 102 is able to receive a GPS signal from one or more GPS satellites and is able to communicate with the NTP server 1000. As such, the server 104 can consider the hashed signature packet 326 containing the GPS timestamp 1002 or the NTP timestamp 1004 to be accurate. However, if the server 104 (e.g., the timestamp review module 348 of the server 104) receives one or more hashed signature packets 326 containing only a local timestamp 1006, the server 104 can treat the one or more hashed signature packets 326 as potentially being inaccurate until the server 104 receives another hashed signature packet 326 comprising either a GPS timestamp 1002 or an NTP timestamp 1004.

When the edge device 102 once again obtains a GPS signal from the one or more GPS satellites or regains connection to the NTP server 1000, the edge device 102 can once again obtain a GPS timestamp 1002 or an NTP timestamp 1004. The edge device 102 can then compare the newly obtained GPS timestamp 1002 or NTP timestamp 1004 against a local timestamp 1006. If a time difference is detected between the local timestamp 1006 and either the GPS timestamp 1002 or the NTP timestamp 1004, this time difference 1104 (see FIG. 11) can be included as part of the next hashed signature packet 326 transmitted to the server 104. This hashed signature packet 326 can also comprise the GPS timestamp 1002 or the NTP timestamp 1004. Upon receiving the hashed signature packet 326 containing the time difference 1104, the server 104 can work backwards to correct the local timestamps 1006 included as part of the previously received hashed signature packets 326. For example, as will be discussed in more detail in relation to FIG. 11, the server 104 can calculate a series of corrected timestamps 1100 to replace the inaccurate local timestamps 1006 received previously. For example, the timestamp review module 348 of the server 104 can use the previously received GPS timestamp 1002 or the previously received NTP timestamp 1004 as a starting point to calculate the corrected timestamps 1100 to replace the inaccurate local timestamps 1006. As a more specific example, the timestamp review module 348 can calculate the corrected timestamps 1100 based at least in part on the time difference 1104 received in the hashed signature packet 326 and the number of recently received hashed signature packets 326 where only a local timestamp 1006 was included.

The streaming hashed signature packets 326 can also be used to correct an inaccurate timestamp 120 included as part of the evidence package 116. For example, when an evidence package 116 is generated and transmitted from the edge device 102 to the server 104 during a period of time when the edge device 102 was unable to obtain a GPS timestamp 1002 or an NTP timestamp 1004, the edge device 102 can include a local timestamp 1006 as part of the evidence package 116. If the server 104 determines that local timestamps 1006 transmitted as part of streamlining hashed signature packets 326 were inaccurate, the server 104 can also determine that the local timestamp 1006 included as part of the evidence package 116 is also inaccurate. In this case, the server 104 can calculate a corrected timestamp 1100 to replace the inaccurate local timestamp 1006 included as part of the evidence package 116

The hashed signature packets 326 can serve both a time-correction function and an authentication function. As previously discussed, the authentication module 340 of the server 104 can authenticate the hashed signature packets 326 received at fixed intervals from the edge devices 102. Moreover, the authentication module 340 can also authenticate the hashed signature packet 326 included as part of the evidence package 116.

Each of the hashed signature packets 326 can comprise a hashed signature 1010 and the inputs required to generate the hashed signature. The hashed signature 1010 can be generated, by the edge device 102, by applying a hash algorithm to an alphanumeric string obtained by concatenating or linking together a timestamp marking a present date/time and data outputted by multiple electronic components running on the edge device 102, the carrier vehicle 110 carrying the edge device 102, or a combination thereof.

For example, the hashed signature 1010 can be generated on the edge device 102 by applying a cryptographic hash algorithm to an alphanumeric or numeric string obtained by concatenating or linking together a local timestamp 1006 marking a present date/time, a present odometer reading of the carrier vehicle 110, one or more present IMU readings from the IMU 206 of the edge device 102, one or more present parameters from a Controller Area Network (CAN) bus of the carrier vehicle 110, or a combination thereof.

In some embodiments, the hash algorithm can be the SHA-2 or SHA-256 cryptographic algorithm or function. In other embodiments, the hash algorithm can be the message-digest 5 (MD5) algorithm or function.

In addition to the hashed signature 1010, each of the hashed signature packets 326 can also comprise the timestamp (e.g., the local timestamp 1006) recorded by the edge device 102 and the data outputted by the multiple electronic components (e.g., the odometer on the carrier vehicle 110, the IMU value(s) from the IMU 206, values(s) from the CAN bus, etc.). Upon receiving the hashed signature packet 326, the authentication module 340 can authenticate the hashed signature packet 326 by applying the same hash algorithm (the hash algorithm used by the edge devices 102) to the timestamp and the data outputted by the multiple electronic components (e.g., the odometer on the carrier vehicle 110, the IMU value(s) from the IMU 206, value(s) from the CAN bus, etc.) to yield a reconstructed hash signature. The authentication module 340 can then compare the reconstructed hash signature against the hashed signature 1010 received as part of the hashed signature packet 326 as part of the authentication process. If the reconstructed hash signature differs from the hashed signature 1010, the server 104 can discard the hashed signature packet 326 or the evidence package 116 containing the hashed signature packet 326 as being inauthentic.

As a more specific example to illustrate the hashed signature generation process, the hash signature generation engine 305 can obtain an odometer reading of 1535 miles from the carrier vehicle 110 carrying the edge device 102 on Tuesday, Feb. 1, 2022 at 5:43:28 AM GMT. At this time, the hash signature generation engine 305 can also obtain an IMU reading of x=13.4 m/s$^2$, y=0.1 m/s$^2$, and z=0.05 m/s$^2$ from the three-axis accelerometer of one of the IMUs 206 of the edge device. The time/date of Feb. 1, 2022 at 5:43:28 AM GMT can be expressed using a Unix epoch timestamp of 1643694208. In this example, the hashed signature generation engine can generate the hashed signature 1010 as hash_function("1643694208:1535:13.4:0.1:0.05").

The reason that the odometer reading and the IMU parameters are selected is because these data parameters represent a unique status of the carrier vehicle 110 and the edge device 102 at a particular point in time. In the above example, the output of the cryptographic hash function can be transmitted as part of the hashed signature packet 326 along with the timestamp and the selected data parameters (e.g., the odometer reading and the IMU parameters). The authentication module 340 can then authenticate the hashed signature packet 326 received from the edge device 102 by applying the same cryptographic hash algorithm to an alphanumeric or numeric string obtained by concatenating or linking together the timestamp, the odometer reading, and the IMU parameters received as part of the hashed signature packet 326 to yield a reconstructed hash signature. The authentication module 340 can then compare the reconstructed hash signature against the hashed signature 1010. If the reconstructed hash signature differs from the hashed signature 1010, the server 104 can discard the hashed signature packet 326 or the evidence package 116 containing the hashed signature packet 326 as being inauthentic.

FIG. 11 is a table illustrating an example method of calculating a corrected timestamp 1100 to replace an inaccurate timestamp 1102 included as part of an evidence package 116. In the example scenario shown in FIG. 11, an edge device 102 can generate and transmit the evidence package 116 during a period of time when the edge device 102 coupled to a carrier vehicle 110 is unable to obtain a GPS timestamp 1002 or an NTP timestamp 1004. For example, the edge device 102 can be unable to obtain the GPS timestamp 1002 or the NTP timestamp 1004 due to the carrier vehicle 110 traveling in an area that blocks or otherwise obstructs the GPS signal or network connection. During this period, the edge device 102 can mark the time using local timestamps 1006 (timestamps recorded using a clock running locally on the edge device 102).

In the example scenario shown in FIG. 11, the local timestamps 1106 can begin to drift or deviate from a more accurate time kept by the NTP server 1000 (see FIG. 10) or a GPS-based clock starting with a first hashed signature packet 326 (represented by Packet Count 1 in FIG. 11) transmitted to the server 104. The local timestamps 1006 can gradually become more inaccurate over the next 40 minutes. During this period, the evidence package 116 containing the inaccurate timestamp 1102 can be generated in between the time that a second hashed signature packet 326 was transmitted (represented by Packet Count 2 in FIG. 11) and a third hashed signature packet 326 was transmitted (represented by Packet Count 3 in FIG. 11).

In this example scenario, the edge device 102 can regain a GPS signal or regain a connection to the NTP server 1000 after the fourth hashed signature packet 326 was transmitted (represented by Packet Count 4 in FIG. 11) to the server 104. When the edge device 102 once again obtains a GPS signal from the one or more GPS satellites or regains a network connection to the NTP server 1000, the edge device 102 can once again obtain a GPS timestamp 1002 or an NTP timestamp 1004 and calculate a difference in time (referred to as a time difference 1104) between a current local timestamp 1006 and the newly received GPS timestamp 1002 or NTP timestamp 1004. In the example scenario shown in FIG. 11, the time difference 1104 can be five minutes. This time difference 1104 can be included as part of a fifth hashed signature packet 326 transmitted by the edge device 102 along with the GPS timestamp 1002 or the NTP timestamp 1004.

Upon receiving the hashed signature packet 326 containing the time difference 1104, the server 104 (e.g., the timestamp review module 348) can work backwards to correct the local timestamps 1006 included as part of the previously received hashed signature packets 326. For example, the server 104 can calculate a series of corrected timestamps to replace the inaccurate local timestamps 1006 received previously including calculating a corrected timestamp 1100 to replace the inaccurate timestamp 1102 included as part of the evidence package 116.

As a more specific example, the timestamp review module 348 can calculate the corrected timestamp 1100 based at least in part on the time difference 1104 received in the most recent hashed signature packet 326 (represented by Packet Count 5 in FIG. 11), the number of periodically transmitted or streamed hashed signature packets 326 received during the period when the edge device 102 lost its connection to the NTP server 1000 or lost the GPS signal, and an elapsed time 1106 between the inaccurate timestamp 1102 in the evidence package 116 and the local timestamp 1006 in the immediately preceding hashed signature packet 326 (in this case, the second hashed signature packet 326, represented by Packet Count 2 in FIG. 11).

The timestamp review module 348 can first calculate an average drift time by dividing the time difference 1104 by the number of hashed signature packets 326 received during the period when the edge device 102 lost its connection to the NTP server 1000 or lost the GPS signal. This assumes that the time shift follows a linear model. For example, as shown in FIG. 11, the average drift time can be 1 minute per hashed signature packet 326 (e.g., 5 minutes divided by 5 packets=1 minute per packet). The timestamp review module 348 can then calculate a corrected timestamp (e.g., 8:22) for the hashed signature packet 326 immediately preceding the evidence package 116. The timestamp review module 348 can then calculate the corrected timestamp 1100 by adding the elapsed time 1106 (e.g., 8:23−8:20=3 minutes) to the corrected timestamp (e.g., 8:22+3 minutes=8:25).

As shown in FIG. 11, a corrected timestamp 1100 can be calculated to replace the inaccurate timestamp 1102 included as part of an evidence package 116 generated during a period of time when the edge device 102 lost its network connection to the NTP server 1000 and when a GPS signal was blocked. The corrected timestamp 1100 can be generated based on hashed signature packets 326 streamed or periodically transmitted from the edge device 102 to the server 104. The hashed signature packets 326 can act as an additional safeguard to maintain the accuracy of timestamps transmitted from the edge device 102 to the server 104.

FIG. 12 is a flowchart illustrating one embodiment of a method 1200 undertaken by the server 104 to prepare a final evidence package 1207. Certain steps of the method 1200 can be executed by one or more processors 200 or controllers of the edge device 102. It should be understood by one of ordinary skill in the art that certain method steps can be omitted for the sake of brevity and the method 1200 need not be applied in the specific order shown and recited herein.

The method 1200 can comprise the server 104 receiving evidence packages 116 from a plurality of edge devices 102 in step 1202. Each of the edge devices 102 can be coupled to a carrier vehicle 110 deployed in an area covered by a traffic congestion pricing policy.

The method 1200 can also comprise determining whether an enforcement cycle 1201 has ended in step 1204. For example, the clustering module 342 (see FIG. 3) of the server 104 can determine whether the enforcement cycle 1201 has ended. In one embodiment, the enforcement cycle 1201 can be every 24 hours. In other embodiments, the enforcement cycle 1201 can be every 8 hours, every 4 hours, or every hour. In some embodiments, the end of an enforcement cycle 1201 can be timed to coincide with the end of an enforcement period 706. By only grouping or reviewing the evidence packages 116 at the end of an enforcement cycle 1201 (e.g., every 24 hours, every 8 hours, every 4 hours, or every hour), the server 104 can ensure that the same non-exempt vehicle 112 is not deemed to be in violation of the traffic congestion pricing policy multiple times in one enforcement cycle 1201.

Once the clustering module 342 determines that the enforcement cycle 1201 has ended, the clustering module 342 can first group the evidence packages 116 by license plate number 122 and/or vehicle attributes 124 in step 1206. The clustering module 342 can then group the evidence packages 116 for each non-exempt vehicle 112 into location clusters 1203 in step 1208. The clustering module 342 can group the evidence packages 116 for each of the non-exempt vehicles 112 into location clusters 1203 based on a geographic proximity of the detected locations 126 of the non-exempt vehicle 112 relative to one another.

In some embodiments, the clustering module 342 can group the evidence packages 116 based on a proximity threshold such as 10 meters, 20 meters, 50 meters, etc. The clustering module 342 can group the evidence packages 116 using a spatial clustering algorithm or a location-based clustering algorithm (e.g., K-means clustering algorithm, DBSCAN clustering algorithm, etc.). For example, when the proximity threshold is 10 meters, the clustering module 342 can group the evidence packages 116 into a location cluster 1203 where the detected locations 126 of the non-exempt vehicle 112 from such evidence packages 116 are all within 10 meters of one another. The proximity threshold can be adjusted based on the amount of evidence packages 116 received. For example, the proximity threshold can be increased (e.g., from 10 meters to 50 meters) when the amount of evidence packages 116 received by the server 104 from the edge devices 102 increases.

The method 1200 can further comprise determining whether each of the non-exempt vehicles 112 identified from the evidence packages 116 meets certain minimum detection requirements in step 1210. For example, the logic reasoning module 346 can determine whether each of the non-exempt vehicles 112 was detected at a minimum of two different locations within the enforcement zone 114 at two different times. As more specific example, the logic reasoning module 346 can determine that a non-exempt vehicle 112 was indeed detected at a minimum of two different locations within the enforcement zone 114 if there are at least two location clusters 1203 associated with the non-exempt vehicle 112. As previously discussed, each of the non-exempt vehicles 112 can be detected by one edge device 102 or multiple edge devices 102 (including at least a first edge device 102A and a second edge device 102B). As part of step 1210, the server 104 can delete or discard any evidence package 116 related to a non-exempt vehicle 112 that was not detected at two different locations within the enforcement zone 114.

The method 1200 can further comprise selecting one representative evidence package 1205 from each location cluster 1203 to be included as part of a final evidence package 1207 in step 1210. In some embodiments, the selection module 344 of the server 104 can select the one representative evidence package 1205 from each location cluster 1203 based on the video frames included in the evidence packages 116 grouped in each location cluster 1203. The representative evidence package 1205 can be selected based in part on whether the video frames from the evidence packages 116 show the non-exempt vehicle 112 and the license plate 128 of the non-exempt vehicle 112 as being unobstructed by other objects in the video frames. For example, the selection module 344 can select one of the evidence packages 116 from the location cluster 1203 as the representative evidence package 1205 if at least one video frame from the evidence package 116 shows the non-exempt vehicle 112 and/or the license plate 128 of the non-exempt vehicle 112 with the least amount of obstruction by other objects in the video frames relative to the video frames from the other evidence packages 116 in the same location cluster 1203.

As a more specific example, the selection module 344 can select the representative evidence package 1205 by calculating a vehicle obstruction score based on a degree to which the vehicle bounding box 800 (see FIGS. 8A and 8B) bounding the non-exempt vehicle 112 in the video frame is obstructed by other object(s) in the video frame. The selection module 344 can calculate vehicle obstruction scores for all video frames from all evidence packages 116 making up one location cluster 1203. Moreover, the selection module 344 can also calculate a license plate obstruction score based on a degree to which the license plate 128 shown in the video frame is obstructed by other object(s) in the video frame. The selection module 344 can select an evidence package 116 as the representative evidence package 1205 from a location cluster 1203 if a video frame from the evidence package 116 is determined to have the lowest vehicle obstruction score or the lowest combined vehicle obstruction score and license plate obstruction score out of all video frames from all evidence packages 116 making up the location cluster 1203.

The method 1200 can also comprise preparing a final evidence package 1207 for each non-exempt vehicle 112 using the representative evidence packages 1205 in step 1212. For example, the final evidence package 1207 can be composed of a plurality of representative evidence packages 1205 from the location clusters 1203. As a more specific example, the final evidence package 1207 can be composed of at least a first representative evidence package from a first location cluster and a second representative evidence package from a second location cluster.

The final evidence package 1207 can be transmitted to one or more computing devices for further processing or review. For example, at least one of the computing devices can be a computing device of a government entity or transportation department responsible for administering the traffic congestion pricing policy. The government entity or transportation department can review the final evidence package 1207 and levy fines or fees on the non-exempt vehicles 112 for driving within the enforcement zone 114 during the enforcement period 706. As another example, at least one of the computing devices can be a computing device of a third-party entity responsible for administering the traffic congestion pricing policy on behalf of a government entity or transportation department.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to ±0.1%, ±1%, ±5%, or ±10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

The term "engine" or "module" as used herein can refer to software, firmware, hardware, or a combination thereof. In the case of a software implementation, for instance, these may represent program code that performs specified tasks when executed on a processor (e.g., CPU, GPU, or processor cores therein). The program code can be stored in one or more computer-readable memory or storage devices. Any references to a function, task, or operation performed by an "engine" or "module" can also refer to one or more processors of a device or server programmed to execute such program code to perform the function, task, or operation.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

The invention claimed is:

1. A method for alleviating traffic congestion within an enforcement zone, the method comprising:
   capturing one or more videos of a vehicle using at least one video image sensor of an edge device,
   using one or more processors of the edge device to pass video frames from the one or more videos to an object-detection neural network running on the edge device to detect at least one vehicle attribute of the vehicle from the video frames and pass the video frames to a license plate-recognition neural network running on the edge device to recognize a license plate number of the vehicle from the video frames;
   determining, using the one or more processors of the edge device, that the vehicle is not exempt from a policy or rule concerning the enforcement zone based in part on the at least one vehicle attribute detected and the license plate number recognized;
   determining, using one or more processors of the edge device, that the vehicle is at a first location within the enforcement zone during an enforcement period;
   transmitting, from the edge device to a server, a first evidence package comprising the first location, a first timestamp marking when the vehicle was detected at the first location, the license plate number, and at least a portion of the one or more videos;
   determining, using one or more processors of the edge device, that the vehicle is at a second location within the enforcement zone during the enforcement period;
   transmitting, from the edge device to the server, a second evidence package comprising the second location, a second timestamp marking when the vehicle was detected at the second location, the license plate number, and at least another portion of the one or more videos; and
   determining, at the server, that the vehicle was in motion within the enforcement zone during the enforcement period based on data and information from the first evidence package and the second evidence package.

2. The method of claim 1, further comprising:
   receiving, at the server, boundaries of the enforcement zone and the enforcement period as a result of user inputs applied to an interactive map user interface displayed on a computing device; and
   transmitting, from the server to the edge device, coordinate data concerning the boundaries of the enforcement zone and the enforcement period to the edge device.

3. The method of claim 2, wherein the enforcement zone is one lane of a roadway.

4. The method of claim 2, wherein the enforcement zone comprises a partial segment of a roadway but not an entire segment of the roadway.

5. The method of claim 2, wherein the enforcement zone comprises at least part of a carrier route of a carrier vehicle, and wherein the edge device is coupled to the carrier vehicle.

6. The method of claim 1, wherein determining that the vehicle is at the first location within the enforcement zone further comprises:
   calculating a separation distance representing a distance separating the edge device from a license plate of the vehicle using an image depth analysis algorithm;
   adding the separation distance to a present location of the edge device obtained from a positioning unit of the edge device to yield the first location; and
   comparing the first location against certain boundaries of the enforcement zone to determine that the first location is within the enforcement zone.

7. The method of claim 6, wherein the separation distance is calculated using the image depth analysis algorithm based in part on a known size of the license plate in real-space, a known distance between a focal point of a video image sensor of the edge device and an image plane of the video image sensor, a projected size of the license plate on the image plane of the video image sensor, a known size of a calibration license plate in real space, a known calibration distance separating the calibration license plate from the focal point of the video image sensor, and a projected size of the calibration license plate on the image plane of the video image sensor.

8. The method of claim 1, wherein the first evidence package further comprises at least one of a global positioning system (GPS) timestamp obtained by the edge device from one or more GPS satellites, a network time protocol (NTP) timestamp obtained by the edge device from a NTP server, and a local timestamp obtained from a clock running locally on the edge device.

9. The method of claim 8, further comprising:
   generating, using the one or more processors of the edge device, an interrupt at a rising edge of each pulse per second (PPS) signal of a GPS receiver of the edge device; and
   executing a time synchronization function as a result of the interrupt, wherein the time synchronization function further comprises:
      determining whether a local clock running on the edge device is synchronized with a time received from one or more GPS satellites or determining whether the clock running locally on the edge device is synchronized with a time received from the NTP server, and
      synchronizing the clock running locally on the edge device to within one second of the time received from the one or more GPS satellites or the time received from the NTP server.

10. The method of claim 8, wherein both the GPS timestamp and the NTP timestamp are transmitted to the server as part of the first evidence package if both the GPS timestamp and the NTP timestamp are available, and wherein only the local timestamp is transmitted to the server as part of the first evidence package if the edge device loses network connection with the NTP server and a GPS signal from the GPS satellite is unavailable.

11. The method of claim 1, further comprising:
   transmitting hashed signature packets from the edge device to the server at fixed time intervals;
   determining, at the server, that the first timestamp received from the edge device as part of the first evidence package is inaccurate or the second timestamp received from the edge device as part of the second evidence package is inaccurate; and
   calculating, at the server, a corrected timestamp to replace either the first timestamp or the second timestamp using the hashed signature packets.

12. The method of claim 1, further comprising:
transmitting, from the edge device to the server, a first hashed signature packet along with the first evidence package; and
authenticating, at the server, the first evidence package using a first hashed signature from the first hashed signature packet.

13. The method of claim 12, wherein the first hashed signature is generated at the edge device by applying a hash algorithm to a first alphanumeric string obtained by concatenating the first timestamp and data outputted by multiple electronic components running on at least one of the edge device and a carrier vehicle carrying the edge device, wherein the first hashed signature packet further comprises the first timestamp and the data outputted by the multiple electronic components, wherein the server authenticates the first evidence package by applying the hash algorithm to the first timestamp and the data outputted by the multiple electronic components to yield a first reconstructed hash signature, and wherein the server compares the first reconstructed hash signature against the first hashed signature received from the edge device to authenticate the first evidence package.

14. The method of claim 1, further comprising:
receiving, at the server, a plurality of evidence packages including the first evidence package and the second evidence package;
grouping at least some of the evidence packages into a first location cluster, wherein the first evidence package is grouped into the first location cluster due to a geographic proximity of the first location to other vehicle locations within the other evidence packages included as part of the first location cluster; and
grouping at least some of the other evidence packages into a second location cluster, wherein the second evidence package is grouped into the second location cluster due to a geographic proximity of the second location to other vehicle locations within the other evidence packages included as part of the second location cluster.

15. The method of claim 1, wherein the edge device is coupled to a carrier vehicle, wherein the one or more videos are captured while both the vehicle and the carrier vehicle are in motion.

16. A method for alleviating traffic congestion within an enforcement zone, the method comprising:
capturing a first video of a vehicle using at least one video image sensor of a first edge device coupled to a first carrier vehicle;
using one or more processors of the first edge device to pass video frames from the first video to a first object-detection neural network running on the first edge device to detect at least one vehicle attribute of the vehicle from the video frames and pass the video frames to a first license plate-recognition neural network running on the first edge device to recognize a license plate number of the vehicle from the video frames;
determining, using the one or more processors of the first edge device, that the vehicle is not exempt from a policy or rule concerning the enforcement zone based in part on the at least one vehicle attribute detected and the license plate number recognized;
determining, using the one or more processors of the first edge device, that the vehicle is at a first location within the enforcement zone during an enforcement period;
transmitting, from the first edge device to a server, a first evidence package comprising the first location, a first timestamp marking when the vehicle was detected at the first location, the license plate number, and at least a portion of the first video;
capturing a second video of the vehicle using at least one video image sensor of a second edge device coupled to a second carrier vehicle;
using one or more processors of the second edge device to pass video frames from the second video to a second object-detection neural network running on the second edge device to detect at least one vehicle attribute of the vehicle from the video frames and pass the video frames to a second license plate-recognition neural network running on the second edge device to recognize a license plate number of the vehicle from the video frames;
determining, using the one or more processors of the second edge device, that the vehicle is not exempt from a policy or rule concerning the enforcement zone based in part on the at least one vehicle attribute detected and the license plate number recognized;
determining, using the one or more processors of the second edge device, that the vehicle is at a second location within the enforcement zone during the enforcement period;
transmitting, from the second edge device to the server, a second evidence package comprising the second location, a second timestamp marking when the vehicle was detected at the second location, the license plate number, and at least a portion of the second video; and
determining, at the server, that the vehicle was in motion within the enforcement zone during the enforcement period based on data and information from the first evidence package and the second evidence package.

17. The method of claim 16, wherein determining that the vehicle is at the first location within the enforcement zone further comprises:
calculating a separation distance representing a distance separating the first edge device from a license plate of the vehicle using an image depth analysis algorithm, wherein the separation distance is calculated using the image depth analysis algorithm based in part on a known size of the license plate in real-space, a known distance between a focal point of a video image sensor of the first edge device and an image plane of the video image sensor, a projected size of the license plate on the image plane of the video image sensor, a known size of a calibration license plate in real space, a known calibration distance separating the calibration license plate from the focal point of the video image sensor, and a projected size of the calibration license plate on the image plane of the video image sensor;
adding the separation distance to a present location of the first edge device obtained from a positioning unit of the first edge device to yield the first location; and
comparing the first location against certain boundaries of the enforcement zone to determine that the first location is within the enforcement zone.

18. The method of claim 16, further comprising:
transmitting hashed signature packets from the first edge device to the server and from the second edge device to the server at fixed time intervals;
determining, at the server, that the first timestamp received from the first edge device as part of the first evidence package is inaccurate or the second timestamp received from the second edge device as part of the second evidence package is inaccurate; and calculating, at the server, a corrected timestamp to replace either the first timestamp or the second timestamp using the hashed signature packets.

19. A system for alleviating traffic congestion within an enforcement zone, comprising:
an edge device comprising video image sensors configured to capture one or more videos of a vehicle, wherein the edge device comprises one or more processors programmed to:
pass video frames from the one or more videos to an object-detection neural network running on the edge device to detect at least one vehicle attribute of the vehicle from the video frames and pass the video frames to a license plate-recognition neural network running on the edge device to recognize a license plate number of the vehicle from the video frames,
determine that the vehicle is not exempt from a policy or rule concerning the enforcement zone based in part on the at least one vehicle attribute detected and the license plate number recognized,
determine that the vehicle is at a first location within the enforcement zone during an enforcement period,
transmit, to a server, a first evidence package comprising the first location, a first timestamp marking when the vehicle was detected at the first location, the license plate number, and at least a portion of the one or more videos,
determine that the vehicle is at a second location within the enforcement zone during the enforcement period, and
transmit, to the server, a second evidence package comprising the second location, a second timestamp marking when the vehicle was detected at the second location, the license plate number, and at least another portion of the one or more videos; and
wherein the server is communicatively coupled to the edge device, wherein the server comprises one or more server processors programmed to determine that the vehicle was in motion within the enforcement zone during the enforcement period based on data and information from the first evidence package and the second evidence package.

20. A system for alleviating traffic congestion within an enforcement zone, comprising:
a first edge device comprising one or more video image sensors configured to capture a first video of a vehicle, wherein the first edge device comprises one or more processors programmed to:
pass video frames from the first video to a first object-detection neural network running on the first edge device to detect at least one vehicle attribute of the vehicle from the video frames and pass the video frames to a first license plate-recognition neural network running on the first edge device to recognize a license plate number of the vehicle from the video frames,
determine that the vehicle is not exempt from a policy or rule concerning the enforcement zone based in part on the at least one vehicle attribute detected and the license plate number recognized,
determine that the vehicle is at a first location within the enforcement zone during an enforcement period, and
transmit, to a server, a first evidence package comprising the first location, a first timestamp marking when the vehicle was detected at the first location, the license plate number, and at least a portion of the first video;
a second edge device comprising one or more video image sensors configured to capture a second video of the vehicle, wherein the second edge device comprises one or more processors programmed to:
pass video frames from the second video to a second object-detection neural network running on the second edge device to detect at least one vehicle attribute of the vehicle from the video frames and pass the video frames to a second license plate-recognition neural network running on the second edge device to recognize the license plate number of the vehicle from the video frames,
determine that the vehicle is not exempt from a policy or rule concerning the enforcement zone based in part on the at least one vehicle attribute detected and the license plate number recognized,
determine that the vehicle is at a second location within the enforcement zone during the enforcement period, and
transmit, to the server, a second evidence package comprising the second location, a second timestamp marking when the vehicle was detected at the second location, the license plate number, and at least a portion of the second video; and
wherein the server is communicatively coupled to the first edge device and the second edge device, wherein the server comprises one or more server processors programmed to determine that the vehicle was in motion within the enforcement zone during the enforcement period based on data and information from the first evidence package and the second evidence package.

* * * * *